US012651034B2

(12) United States Patent
Sankaran et al.

(10) Patent No.: US 12,651,034 B2
(45) Date of Patent: Jun. 9, 2026

(54) DATA-DRIVEN DISCOVERY OF RESERVOIR PHYSICS FOR RESERVOIR SURVEILLANCE

(71) Applicant: XECTA INTELLIGENT PRODUCTION SERVICES, Houston, TX (US)

(72) Inventors: Sathish Sankaran, Spring, TX (US);
Wenyue Sun, Houston, TX (US);
Masahiro Nagao, College Station, TX (US)

(73) Assignee: Xecta Intelligent Production Services, Houston, TX (US)

( * ) Notice: Subject to any disclaimer, the term of this patent is extended or adjusted under 35 U.S.C. 154(b) by 91 days.

(21) Appl. No.: 18/092,971

(22) Filed: Jan. 4, 2023

(65) Prior Publication Data

US 2023/0342413 A1     Oct. 26, 2023

Related U.S. Application Data

(60) Provisional application No. 63/333,438, filed on Apr. 21, 2022.

(51) Int. Cl.
| | |
|---|---|
| *G06F 17/10* | (2006.01) |
| *E21B 43/12* | (2006.01) |
| *E21B 47/06* | (2012.01) |
| *G06N 20/00* | (2019.01) |

(52) U.S. Cl.
CPC .............. *G06F 17/10* (2013.01); *E21B 43/12* (2013.01); *E21B 47/06* (2013.01); *G06N 20/00* (2019.01); *E21B 2200/20* (2020.05)

(58) Field of Classification Search
CPC .......... G06F 17/10; E21B 43/12; E21B 47/06; E21B 2200/20; G06N 20/00
See application file for complete search history.

(56) References Cited

U.S. PATENT DOCUMENTS

2009/0276156 A1* 11/2009 Kragas .................... E21B 43/12
                                                                702/6
2023/0114088 A1*  4/2023 Gryzlov .................. E21B 43/00
                                                                703/10

OTHER PUBLICATIONS

Chaudhry, Amanat. Oil well testing handbook. Elsevier, 2004. (Year: 2004).*
Bao, Anqi. "Physics Constrained Data-Driven Technique for Reservoir Proxy Model and Model Order Reduction." PhD diss. Texas A&M University, 2019. <https://oaktrust.library.tamu.edu/bitstream/handle/1969.1/186540/BAO-DISSERTATION-2019.pdf> (Year: 2019).*

(Continued)

*Primary Examiner* — Emerson C Puente
(74) *Attorney, Agent, or Firm* — Baker Botts L.L.P.

(57) ABSTRACT

A method of determining average reservoir pressure for a subterranean formation is provided. The method includes shutting in a well in the subterranean formation; measuring a plurality of buildup pressures during a period of time wherein the well is shut in via a downhole pressure gauge; performing an eigen expansion of the plurality of buildup pressures to generate a plurality of eigenvalues; determining an estimated average reservoir pressure based, at least in part, on the plurality of eigenvalues; and producing fluids from the well based, at least in part, on the estimated average reservoir pressure.

10 Claims, 46 Drawing Sheets

(56) References Cited

OTHER PUBLICATIONS

Sankaran, Sathish, David Wright, Huan Gamblin, and Dhilip Kumar. "Creating Value by Implementing an Integrated Production Surveillance and Optimization System—An Operator's Perspective." In SPE Annual Technical Conference and Exhibition. OnePetro, 2017. (Year: 2017).*

Gryzlov, Anton, Sergey Safonov, Muqbil Alkhalaf, and Muhammad Arsalan. "Novel methods for production data forecast utilizing machine learning and dynamic mode decomposition." In Abu Dhabi International Petroleum Exhibition & Conference. OnePetro, 2020. (Year: 2020).*

Piccinini, Rodrigo Badia. "Buildup-Pressure Extrapolation of a Heterogeneous Reservoir: Application of the Crump and Hite Method to a Real Field Case." SPE Reservoir Evaluation & Engineering 22, No. 01 (2019): 351-363. (Year: 2019).*

Vogel, J. V. "Inflow performance relationships for solution-gas drive wells." Journal of petroleum technology 20, No. 01 (1968): 83-92. (Year: 1968).*

Liu, Yang, and Roland N. Horne. "Interpreting pressure and flow-rate data from permanent downhole gauges by use of data-mining approaches." SPE Journal 18, No. 01 (2013): 69-82. (Year: 2013).*

Crump, James G., and Robert Henry Hite. "A new method for estimating average reservoir pressure: The Muskat plot revisited." SPE Reservoir Evaluation & Engineering 11, No. 02 (2008): 298-306. (Year: 2008).*

Haider, M. L. "The productivity index." Transactions of the AIME 123, No. 01 (1937): 112-119. (Year: 1937).*

Tian, Chuan, and Roland N. Horne. "Machine learning applied to multiwell test analysis and flow rate reconstruction." In SPE Annual Technical Conference and Exhibition?, p. D021S013R006. SPE, 2015. (Year: 2015).*

Ali, Aliyuda, and Lingzhong Guo. "Data-driven based investigation of pressure dynamics in underground hydrocarbon reservoirs." Energy Reports 7 (2021): 104-110. (Year: 2021).*

Jovanovic, Mihailo R., Peter J. Schmid, and J. W. Nichols. "Low-rank and sparse dynamic mode decomposition." Center for Turbulence Research Annual Research Briefs 2012 (2012): 139-152. (Year: 2012).*

Guddeti, Ravikishan, and Sathish Sankaran. "A self-learning process modeling method to optimize upstream operations." In SPE Annual Technical Conference and Exhibition?, p. D021S006R003. SPE, 2020. (Year: 2020).*

Zalavadia, Hardikkumar, Sathish Sankaran, Mustafa Kara, Wenyue Sun, and Eduardo Gildin. "A hybrid modeling approach to production control optimization using dynamic mode decomposition." In SPE Annual Technical Conference and Exhibition?, p. D022S090R002. SPE, 2019. (Year: 2019).*

Chen, Kevin K., Jonathan H. Tu, and Clarence W. Rowley. "Variants of dynamic mode decomposition: boundary condition, Koopman, and Fourier analyses." Journal of nonlinear science 22 (2012): 887-915. (Year: 2012).*

Dylewsky, D. Data-Driven Methods for Physics-Constrained Dynamical Systems. (2020) University of Washington. https://search.proquest.com/openview/93825f22cd58856fcc64381f0b7156c0/1?pq-origsite=gscholar&cbl=44156 (Year: 2020).*

Kutz, J. Nathan, Steven L. Brunton, Bingni W. Brunton, and Joshua L. Proctor. Dynamic mode decomposition: data-driven modeling of complex systems. Society for Industrial and Applied Mathematics, 2016. (Year: 2016).*

Grosek, Jacob, and J. Nathan Kutz. "Dynamic mode decomposition for real-time background/foreground separation in video." arXiv preprint arXiv:1404.7592 (2014). (Year: 2014).*

Proctor, Joshua L., Steven L. Brunton, and J. Nathan Kutz. "Dynamic mode decomposition with control." SIAM Journal on Applied Dynamical Systems 15, No. 1 (2016): 142-161. (Year: 2016).*

Bramburger, Jason J., Daniel Dylewsky, and J. Nathan Kutz. "Sparse identification of slow timescale dynamics." Physical Review E 102, No. 2 (2020): 022204. (Year: 2020).*

Brunton, Steven L., Joshua L. Proctor, and J. Nathan Kutz. "Sparse identification of nonlinear dynamics with control (SINDYc)." IFAC—PapersOnLine 49, No. 18 (2016): 710-715. (Year: 2016).*

Fasel, Urban, Eurika Kaiser, J. Nathan Kutz, Bingni W. Brunton, and Steven L. Brunton. "Sindy with control: A tutorial." In 2021 60th IEEE conference on decision and control (CDC), pp. 16-21. IEEE, 2021. (Year: 2021).*

Askham, Travis, and J. Nathan Kutz. 2017. Variable projection methods for an optimized dynamic mode decomposition. arXiv:1704.02343. Accessed Apr. 1, 2017.

Bourdet, Dominique, J.A. Ayoub, and Y.M. Pirard. 1989. "Use of Pressure Derivative in Well Test Interpretation." SPE Formation Evaluation 4 (02):293-302.

Bourgeois, M., and R.N. Horne. 1993. "Well Test Model Recognition Using LaPlace Space Type Curves." SPE Formation Evaluation 8 (01): 17-25.

Brunton, Steven L., Joshua L. Proctor, and J. Nathan Kutz. 2016. "Discovering governing equations from data by sparse identification of nonlinear dynamical systems." Proceedings of the National Academy of Science 113:3932.

Chacon, Abel, Abdelghani Djebrouni, and Djebbar Tiab. 2004. "Determining the Average Reservoir Pressure from Vertical and Horizontal Well Test Analysis Using the Tiab's Direct Synthesis Technique." SPE Asia Pacific Oil and Gas Conference and Exhibition.

Champion, Kathleen, Peng Zheng, Aleksandr Y. Aravkin, Steven L. Brunton, and J. Nathan Kutz. 2019. A unified sparse optimization framework to learn parsimonious physics-informed models from data. arXiv:1906.10612. Accessed Jun. 1, 2019.

Chen, Kevin K., Jonathan H. Tu, and Clarence W. Rowley. 2012. "Variants of Dynamic Mode Decomposition: Boundary Condition, Koopman, and Fourier Analyses." Journal of Nonlinear Science 22 (6):887-915.

Crump, James G., and Robert Henry Hite. 2006. "A New Method for Estimating Average Reservoir Pressure: The Muskat Plot Revisited." SPE Annual Technical Conference and Exhibition.

Cumming, J. A., D. A. Wooff, T.. Whittle, R. J. Crossman, and A. C. Gringarten. 2013. "Assessing the Non-Uniqueness of the Well Test Interpretation Model Using Deconvolution." EAGE Annual Conference & Exhibition incorporating SPE Europec.

Dietz, D.N. 1965. "Determination of Average Reservoir Pressure From Build-Up Surveys." Journal of Petroleum Technology 17 (08):955-959.

Erichson, N. Benjamin, Steven L. Brunton, and J. Nathan Kutz. 2015. Compressed Dynamic Mode Decomposition for Background Modeling. arXiv:1512.04205. Accessed Dec. 1, 2015.

Frank, Jordan, Shie Mannor, and Doina Precup. 2010. Activity and Gait Recognition with Time-Delay Embeddings.

Grosek, Jacob, and J. Nathan Kutz. 2014. Dynamic Mode Decomposition for Real-Time Background/Foreground Separation in Video. arXiv:1404.7592. Accessed Apr. 1, 2014.

Hasan, A. Rashid, and C. Shahjahan Kabir. 1983. "Pressure Buildup Analysis: A Simplified Approach (includes associated papers 11862 and 11867 and 11925 and 11926 and 13676 )." Journal of Petroleum Technology 35 (01):178-188.

Horner, D. R. 1951. "Pressure Build-up in Wells." 3rd World Petroleum Congress.

Kuchuk, Fikri J. 1999. "A New Method for Determination of Reservoir Pressure." SPE Annual Technical Conference and Exhibition.

Kuchuk, Fikri J. 1999. "A New Method for Determination of Reservoir Pressure." SPE Annual Technical Conference and Exhibition.

Kutz, J. Nathan, and Steven L. Brunton. 2019. "Data-Driven Dynamical Systems." In Data-Driven Science and Engineering: Machine Learning, Dynamical Systems, and Control, 229-275. Cambridge: Cambridge University Press.

Evitan, Michael M. 2005. "Practical Application of Pressure-Rate Deconvolution to Analysis of Real Well Tests." SPE Reservoir Evaluation & Engineering 8 (02):113-121.

Liu, Yang, and Roland N. Horne. 2013a. "Interpreting Pressure and Flow Rate Data from Permanent Downhole Gauges Using Convolution-Kernel-Based Data Mining Approaches." SPE Western Regional & AAPG Pacific Section Meeting 2013 Joint Technical Conference.

(56)                    References Cited

OTHER PUBLICATIONS

Liu, Yang, and Roland N. Horne. 2013b. "Interpreting Pressure and Flow Rate Data from Permanent Downhole Gauges with Convolution-Kernel-Based Data Mining Approaches." SPE Annual Technical Conference and Exhibition.

Matthews, C.S., F. Brons, and P. Hazebroek. 1954. "A Method for Determination of Average Pressure in a Bounded Reservoir." Transactions of the AIME 201 (01):182-191.

Mead, Homer N. 1981. "A Practical Approach To Transient Pressure Behavior." SPE California Regional Meeting.

Miller, C.C., A.B. Dyes, and C.A. Hutchinson, Jr. 1950. "The Estimation of Permeability and Reservoir Pressure From Bottom Hole Pressure Build-Up Characteristics." Journal of Petroleum Technology 2 (04):91-104.

Odeh, A.S., and R. Al-Hussainy. 1971. "A Method for Determining the Static Pressure of a Well from Buildup Data." Journal of Petroleum Technology 23 (05):621-624.

Onur, Mustafa, and Fikri J. Kuchuk. 2011. "A New Deconvolution Technique Based on Pressure-Derivative Data for Pressure-Transient-Test Interpretation." SPE Journal 17 (01):307-320.

Pendergrass, S., S. L. Brunton, J. N. Kutz, N. B. Erichson, and T. Askham. 2017. "Dynamic Mode Decomposition for Background Modeling." 2017 IEEE International Conference on Computer Vision Workshops (ICCVW), Oct. 22-29, 2017.

Piccinini, R. B. 2018. "Buildup-Pressure Extrapolation of a Heterogeneous Reservoir: Application of the Crump and Hite Method to a Real Field Case." SPE Reservoir Evaluation & Engineering 22 (01):351-363.

Proctor, Joshua L., Steven L. Brunton, and J. Nathan Kutz. 2014. Dynamic mode decomposition with control. arXiv:1409.6358. Accessed Sep. 1, 2014.

Roumboutsos, A., and G. Stewart. 1988. "A Direct Deconvolution or Convolution Algorithm for Well Test Analysis." SPE Annual Technical Conference and Exhibition.

Rowley, Clarence W., Igor Mezić, Shervin Bagheri, Philipp Schlatter, and Dan S. Henningson. 2009. "Spectral analysis of nonlinear flows." Journal of Fluid Mechanics 641:115-127.

Sankaran, Sathish, David Wright, Huan Gamblin, and Dhilip Kumar. 2017. "Creating Value by Implementing an Integrated Production Surveillance and Optimization System—An Operator's Perspective." SPE Annual Technical Conference and Exhibition.

Schmid, Peter, and Joern Sesterhenn. 2008. "Dynamic Mode Decomposition of numerical and experimental data." Nov. 1, 2008.

Tian, Chuan, and Roland N. Horne. 2015. "Machine Learning Applied to Multiwell Test Analysis and Flow Rate Reconstruction." SPE Annual Technical Conference and Exhibition.

Tian, Chuan, and Roland N. Horne. 2017. "Recurrent Neural Networks for Permanent Downhole Gauge Data Analysis." SPE Annual Technical Conference and Exhibition.

Tian, Chuan, and Roland N. Horne. 2019. "Applying Machine-Learning Techniques To Interpret Flow-Rate, Pressure, and Temperature Data From Permanent Downhole Gauges." SPE Reservoir Evaluation & Engineering 22 (02):386-401.

Tu, Jonathan H., Clarence W. Rowley, Dirk M. Luchtenburg, Steven L. Brunton, and J. Nathan Kutz. 2013. On Dynamic Mode Decomposition: Theory and Applications. arXiv:1312.0041. Accessed Nov. 1, 2013.

Von Schroeter, Thomas, Florian Hollaender, and Alain C. Gringarten. 2002. "Analysis of Well Test Data From Permanent Downhole Gauges by Deconvolution." SPE Annual Technical Conference and Exhibition.

Wongpattananukul, Kongphop, and Roland Horne. 2020. "Revisiting Machine Learning Approaches For Pressure Data Deconvolution." SPE Annual Technical Conference and Exhibition.

Zheng, Peng, Travis Askham, Steven L. Brunton, J. Nathan Kutz, and Aleksandr Y. Aravkin. 2018. A Unified Framework for Sparse Relaxed Regularized Regression: SR3. arXiv:1807.05411. Accessed Jul. 1, 2018.

\* cited by examiner

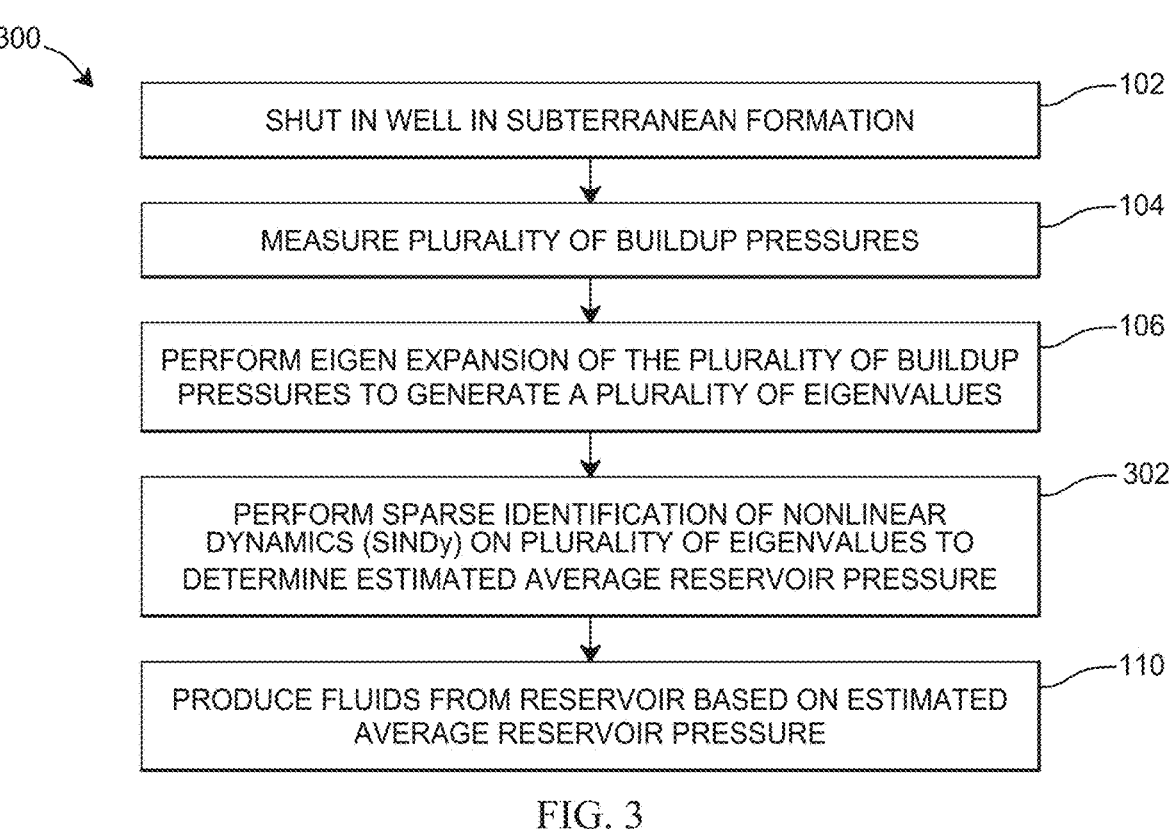

300

102 — SHUT IN WELL IN SUBTERRANEAN FORMATION

104 — MEASURE PLURALITY OF BUILDUP PRESSURES

106 — PERFORM EIGEN EXPANSION OF THE PLURALITY OF BUILDUP PRESSURES TO GENERATE A PLURALITY OF EIGENVALUES

302 — PERFORM SPARSE IDENTIFICATION OF NONLINEAR DYNAMICS (SINDy) ON PLURALITY OF EIGENVALUES TO DETERMINE ESTIMATED AVERAGE RESERVOIR PRESSURE

110 — PRODUCE FLUIDS FROM RESERVOIR BASED ON ESTIMATED AVERAGE RESERVOIR PRESSURE

FIG. 3

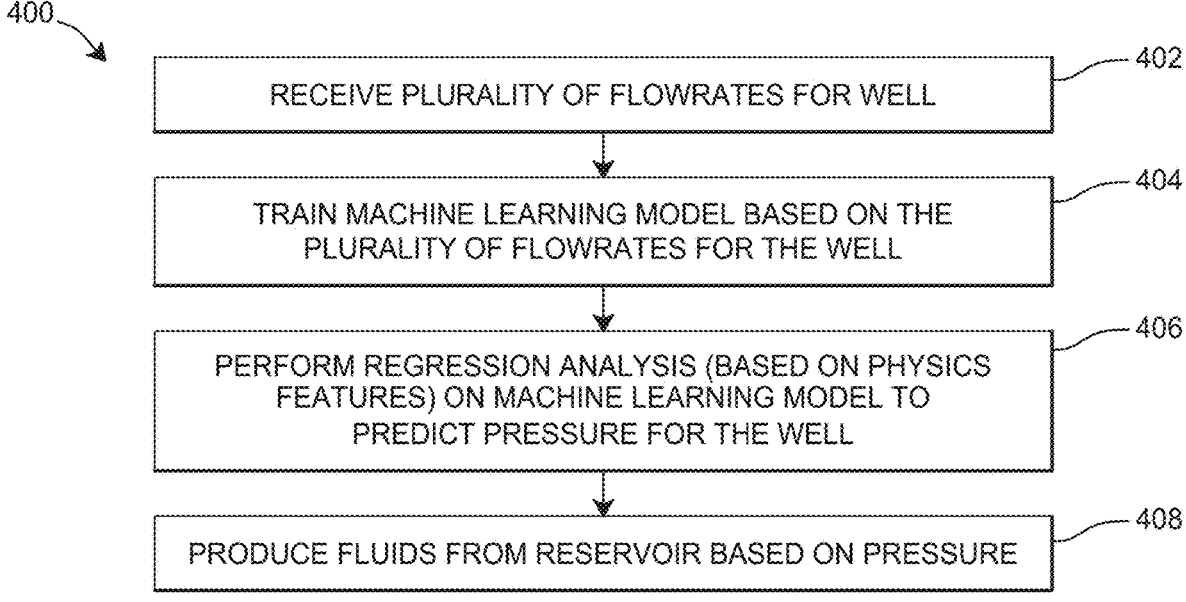

400

402 — RECEIVE PLURALITY OF FLOWRATES FOR WELL

404 — TRAIN MACHINE LEARNING MODEL BASED ON THE PLURALITY OF FLOWRATES FOR THE WELL

406 — PERFORM REGRESSION ANALYSIS (BASED ON PHYSICS FEATURES) ON MACHINE LEARNING MODEL TO PREDICT PRESSURE FOR THE WELL

408 — PRODUCE FLUIDS FROM RESERVOIR BASED ON PRESSURE

FIG. 4

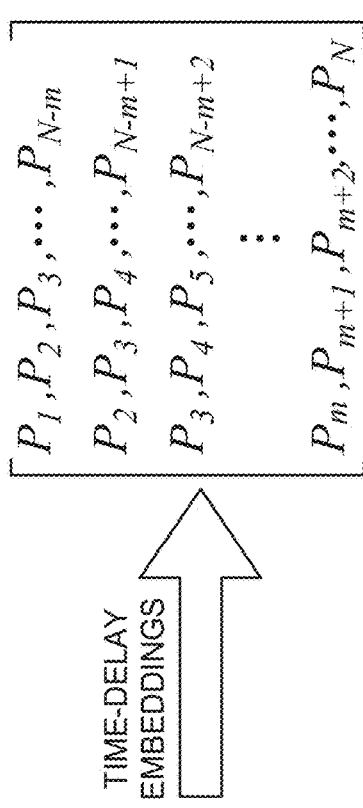
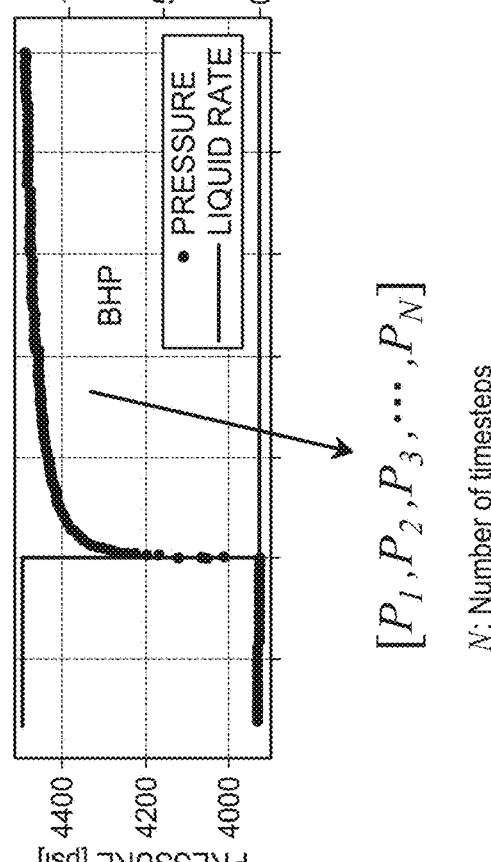
FIG. 8

FIG. 26
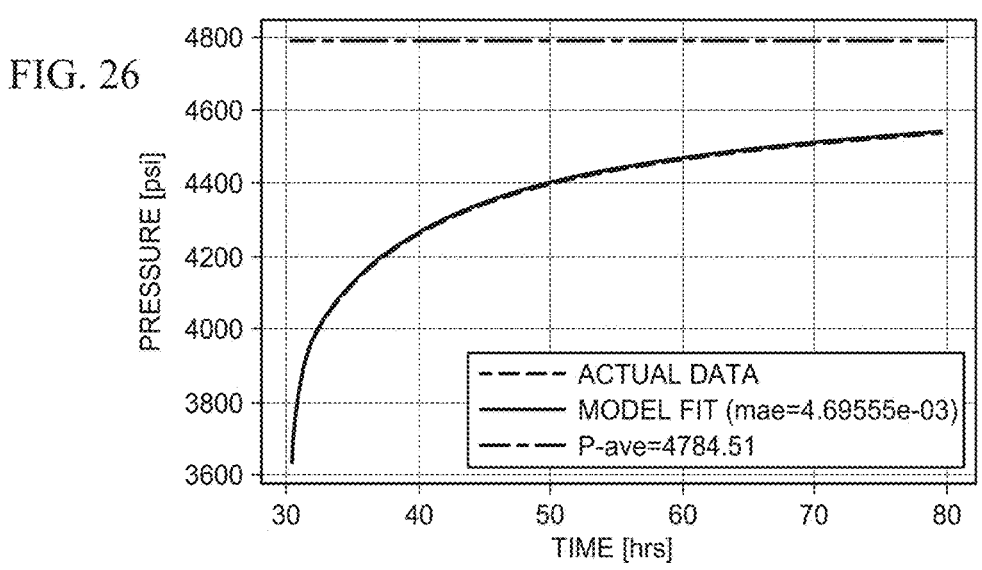
DATASET: LIQUID RATE AND BHP
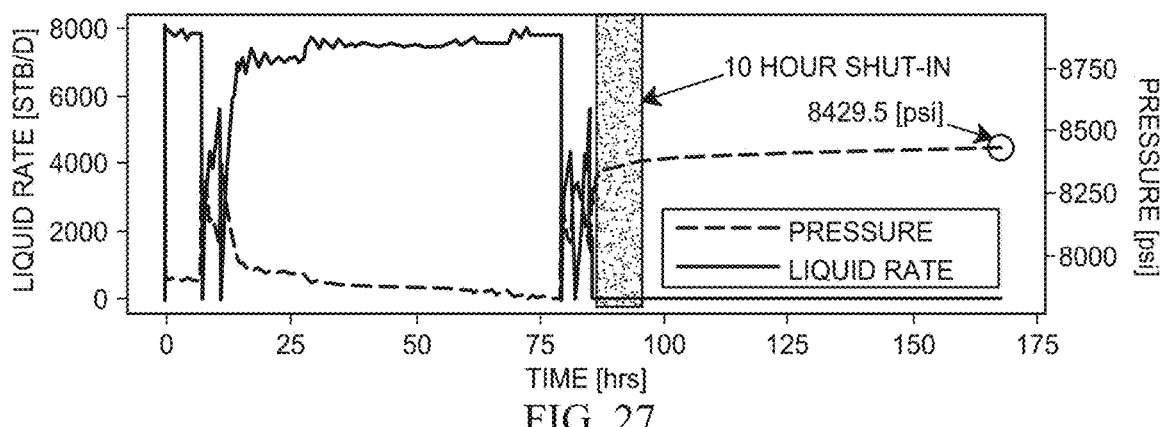
FIG. 27
FIG. 28A
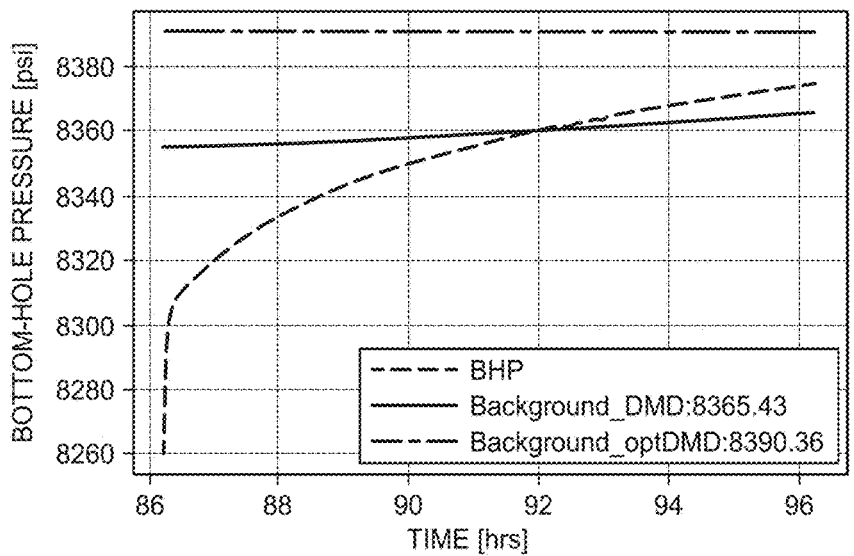

FLOWRATE PREDICTION $$x^{(i)} = \begin{bmatrix} 1 \\[4pt] \sum_{j=1}^{i}\left[p^{(j)}-p^{(j-1)}\right] \\[4pt] \sum_{j=1}^{i}\left[p^{(j)}-p^{(j-1)}\right]\left[t^{(i)}-t^{(j-1)}\right] \\[4pt] \sum_{j=1}^{i}\left[p^{(j)}-p^{(j-1)}\right]\log\left[t^{(i)}-t^{(j-1)}\right] \\[4pt] \sum_{j=1}^{i}\left[p^{(j)}-p^{(j-1)}\right]\sqrt{t^{(i)}-t^{(j-1)}} \\[4pt] \sum_{j=1}^{i}\left[p^{(j)}-p^{(j-1)}\right]\sqrt[4]{t^{(i)}-t^{(j-1)}} \\[4pt] \sum_{j=1}^{i}\left[p^{(j)}-p^{(j-1)}\right]/\sqrt{t^{(i)}-t^{(j-1)}} \\[4pt] \sum_{j=1}^{i}p^{(j)} \\[4pt] \sum_{j=1}^{i}\left[p^{(j)}-p^{(j-1)}\right]/\left[t^{(i)}-t^{(j-1)}\right] \\[4pt] \sum_{j=1}^{i}\left[p^{(j)}-p^{(j-1)}\right]\left[t^{(i)}-t^{(j-1)}\right]^2 \\[4pt] \sum_{j=1}^{i}\left[p^{(j)}-p^{(j-1)}\right]/\left[t^{(i)}-t^{(j-1)}\right]^2 \end{bmatrix}$$

Row labels:
- RATE SUPERPOSITION
- WELLBORE STORAGE, BOUNDARY EFFECT
- RADIAL FLOW
- LINEAR FLOW
- BILINEAR FLOW
- SPHERICAL FLOW
- CUMULATIVE PRODUCTION
- SMOOTHING FUNCTION

PRESSURE PREDICTION $$x^{(i)} = \begin{bmatrix} 1 \\[4pt] \sum_{j=1}^{i}\left[q^{(j)}-q^{(j-1)}\right] \\[4pt] \sum_{j=1}^{i}\left[q^{(j)}-q^{(j-1)}\right]\left[t^{(i)}-t^{(j-1)}\right] \\[4pt] \sum_{j=1}^{i}\left[q^{(j)}-q^{(j-1)}\right]\log\left[t^{(i)}-t^{(j-1)}\right] \\[4pt] \sum_{j=1}^{i}\left[q^{(j)}-q^{(j-1)}\right]\sqrt{t^{(i)}-t^{(j-1)}} \\[4pt] \sum_{j=1}^{i}\left[q^{(j)}-q^{(j-1)}\right]\sqrt[4]{t^{(i)}-t^{(j-1)}} \\[4pt] \sum_{j=1}^{i}\left[q^{(j)}-q^{(j-1)}\right]/\sqrt{t^{(i)}-t^{(j-1)}} \\[4pt] \sum_{j=1}^{i}q^{(j)} \\[4pt] \sum_{j=1}^{i}\left[q^{(j)}-q^{(j-1)}\right]/\left[t^{(i)}-t^{(j-1)}\right] \\[4pt] \sum_{j=1}^{i}\left[q^{(j)}-q^{(j-1)}\right]\left[t^{(i)}-t^{(j-1)}\right]^2 \\[4pt] \sum_{j=1}^{i}\left[q^{(j)}-q^{(j-1)}\right]/\left[t^{(i)}-t^{(j-1)}\right]^2 \end{bmatrix}$$

FIG. 29

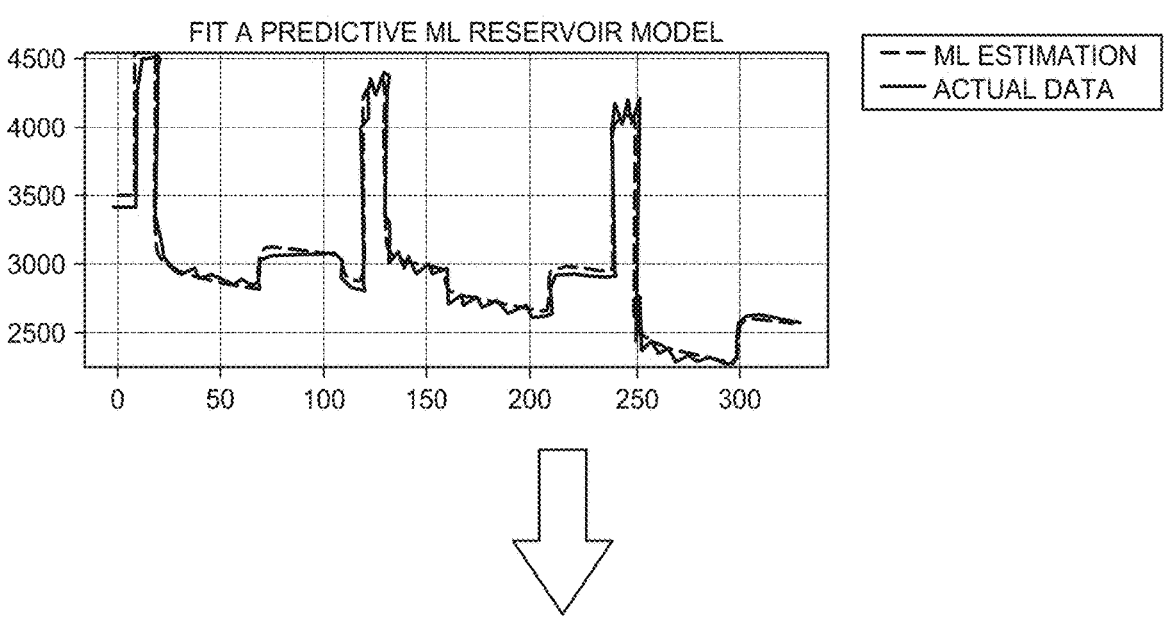
VIRTUAL SHUT-IN SIMULATION
ASSIGN ZERO FLOW RATE AND PREDICT THE PRESSURE RESPONSE
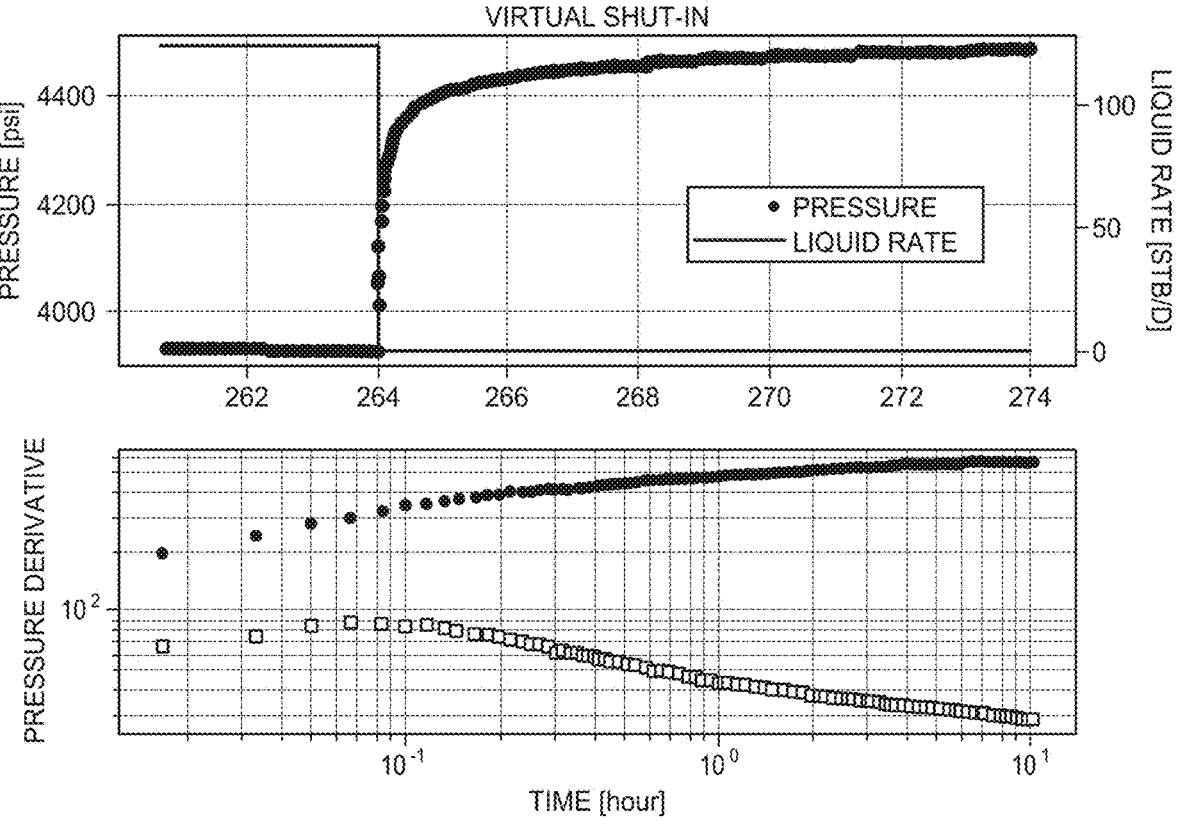
FIG. 42

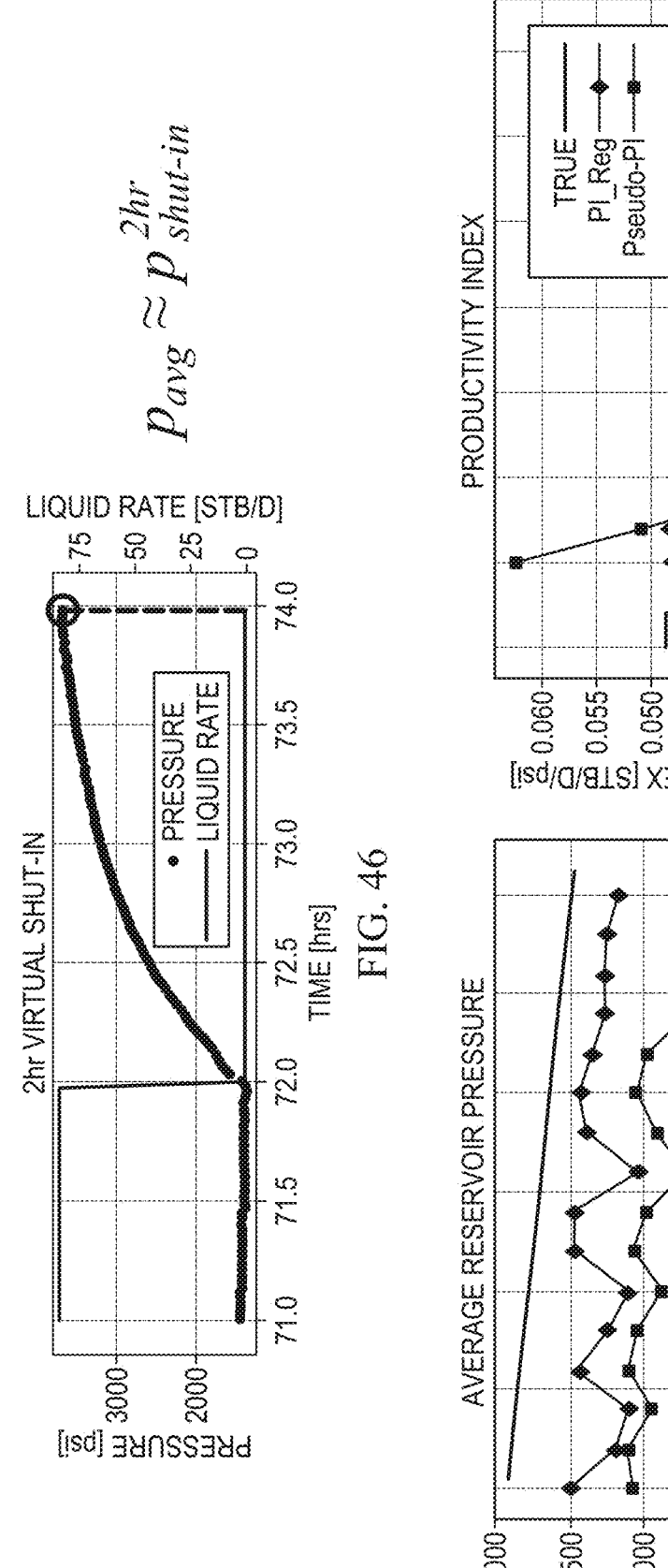
$$p_{avg} \cong p^{\,2hr}_{shut\text{-}in}$$
FIG. 46
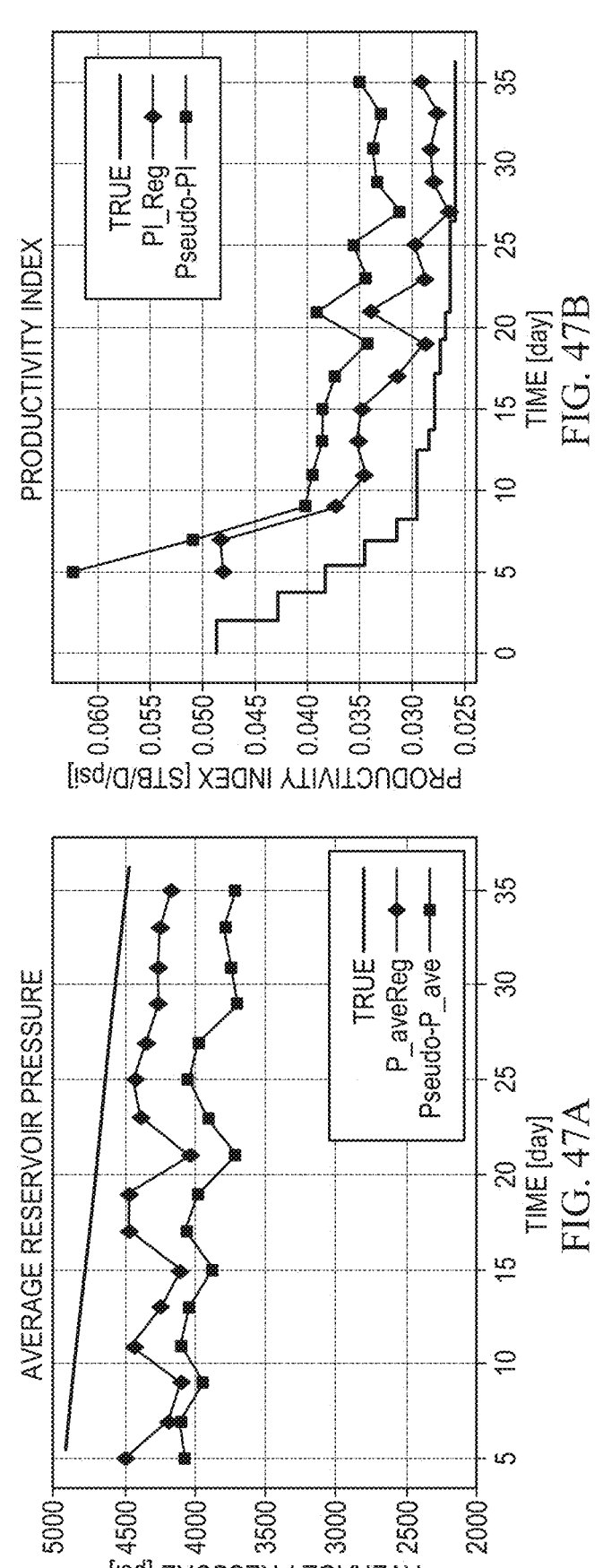
FIG. 47B
FIG. 47A

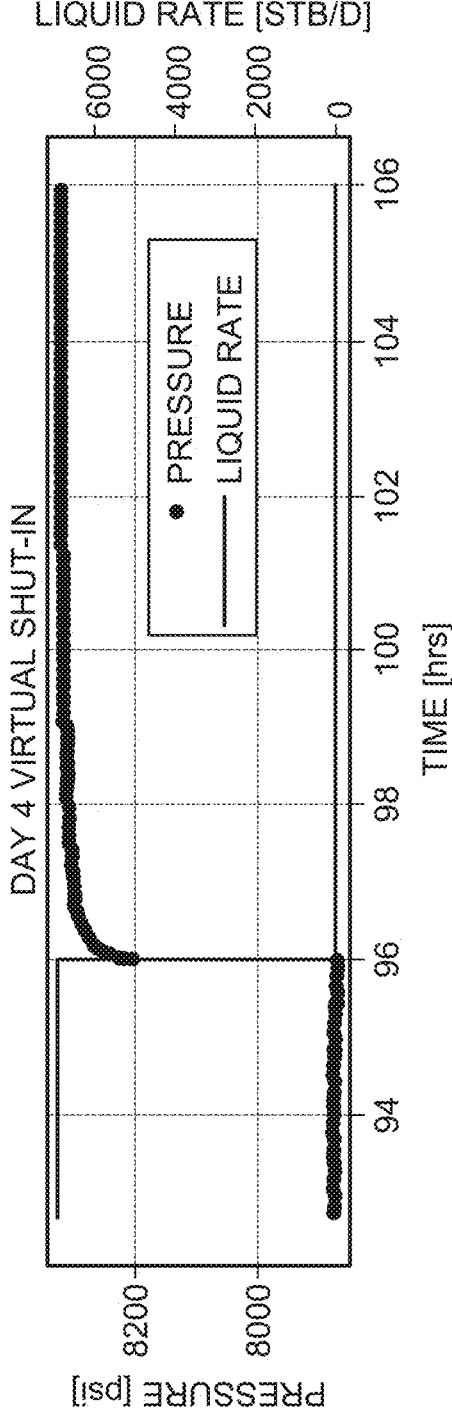
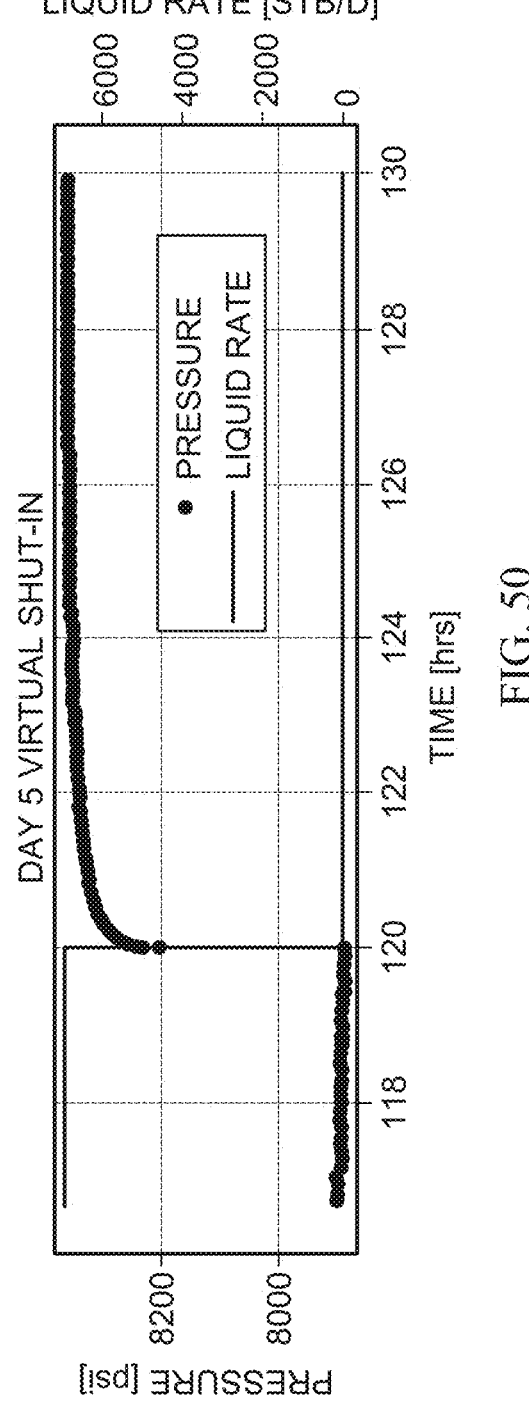
FIG. 50

$$PI = \frac{q_{shut}}{p_{avg} - p_{wf}}$$

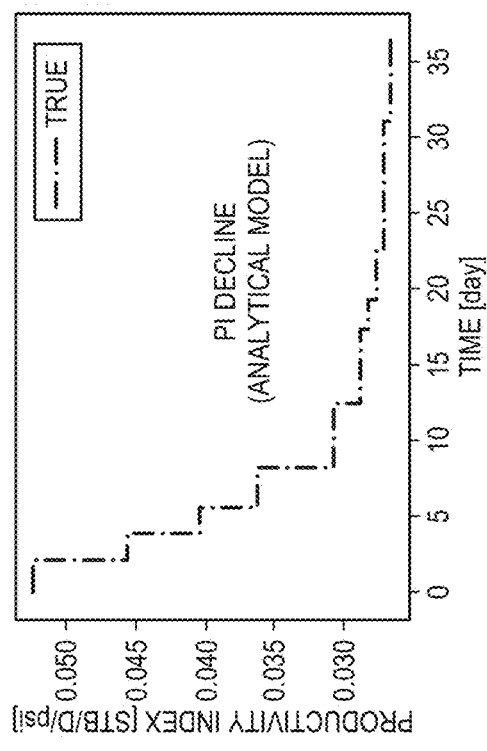
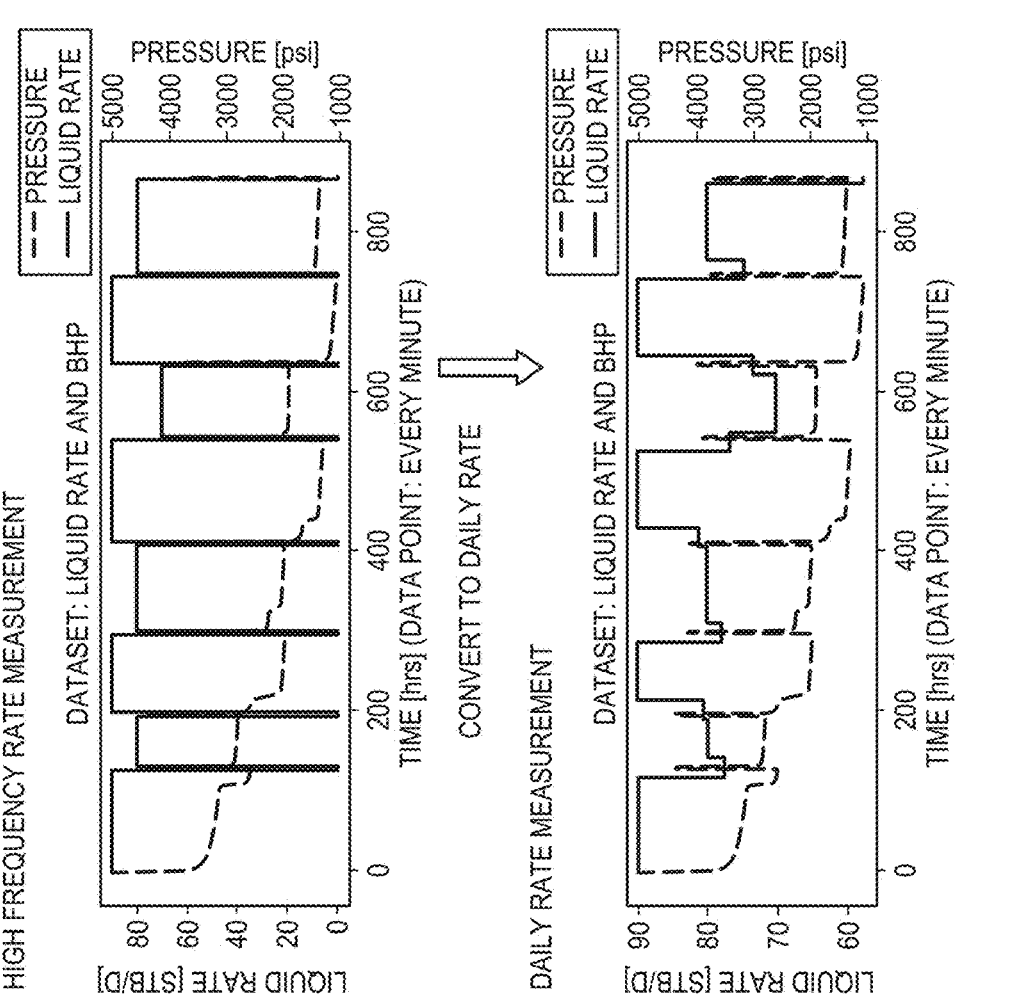
FIG. 53

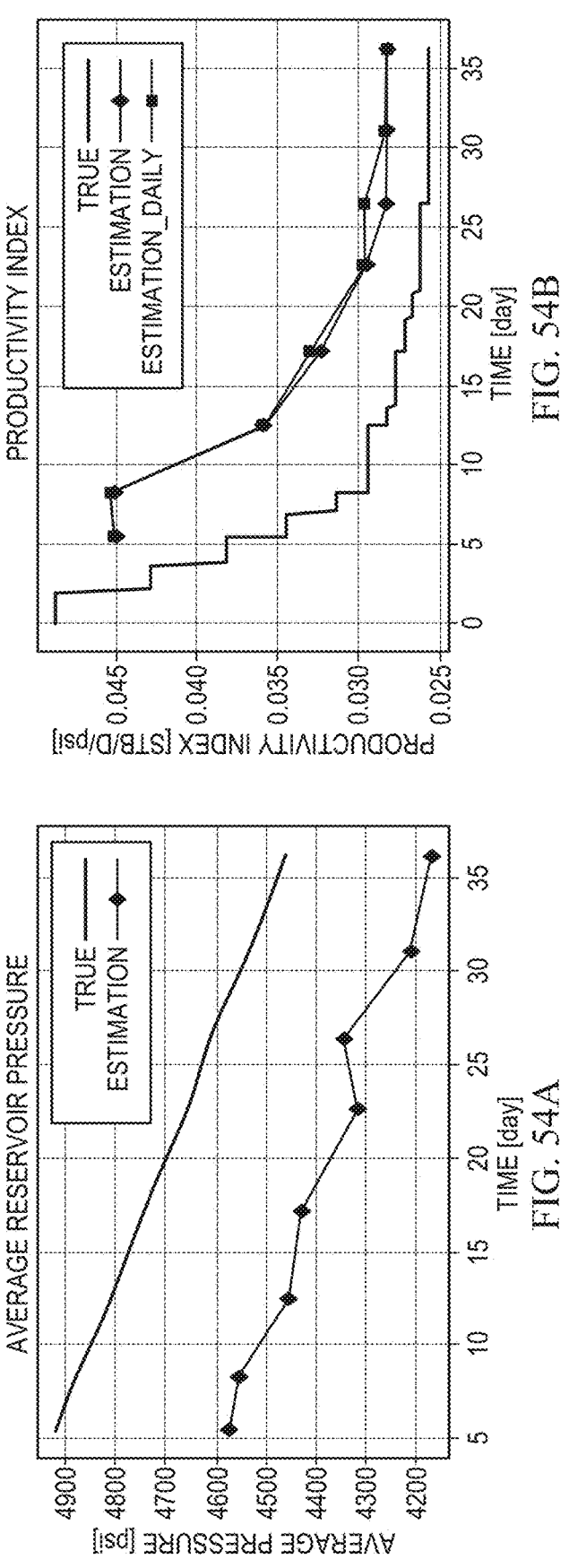
FIG. 54B
FIG. 54A
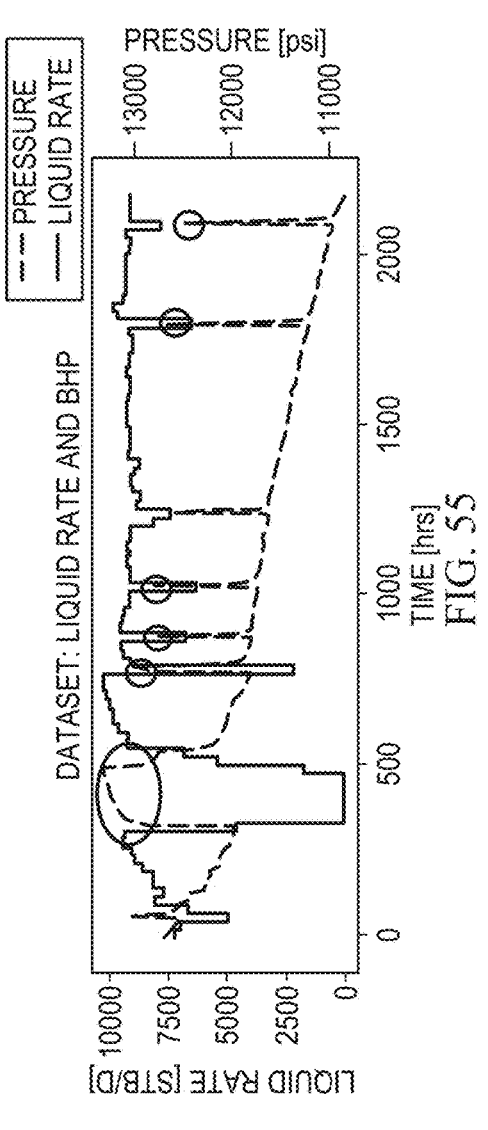
FIG. 55

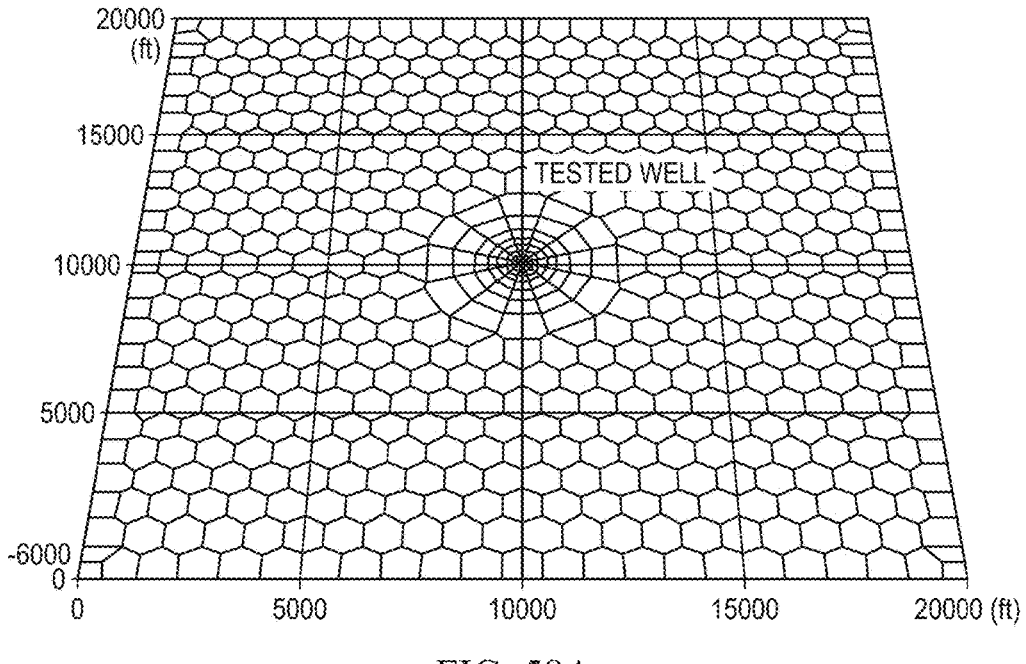
FIG. 58A
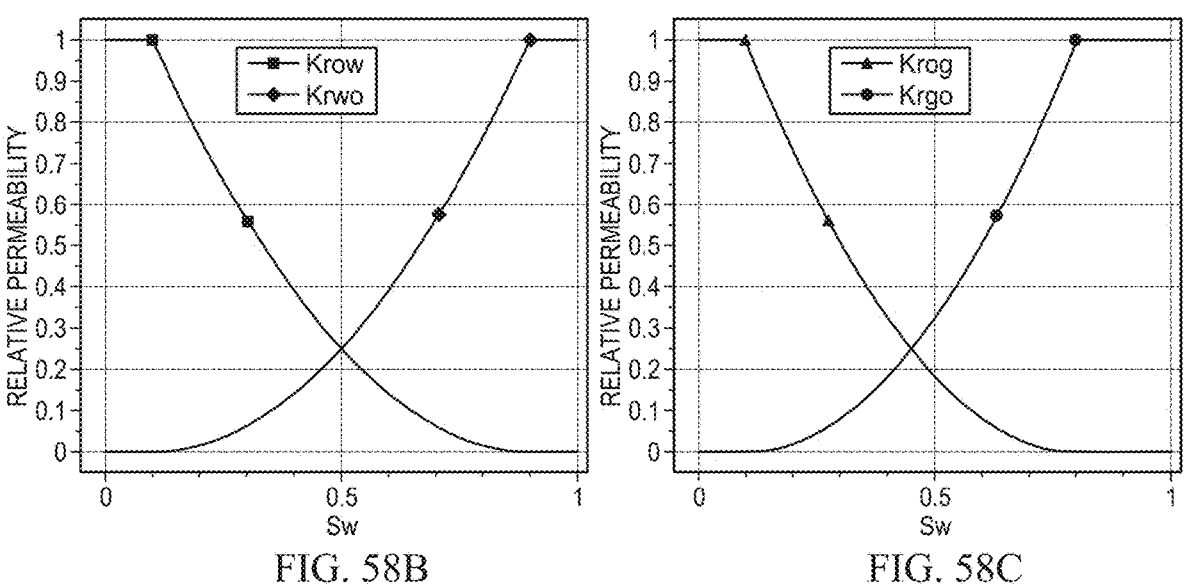
FIG. 58B                    FIG. 58C

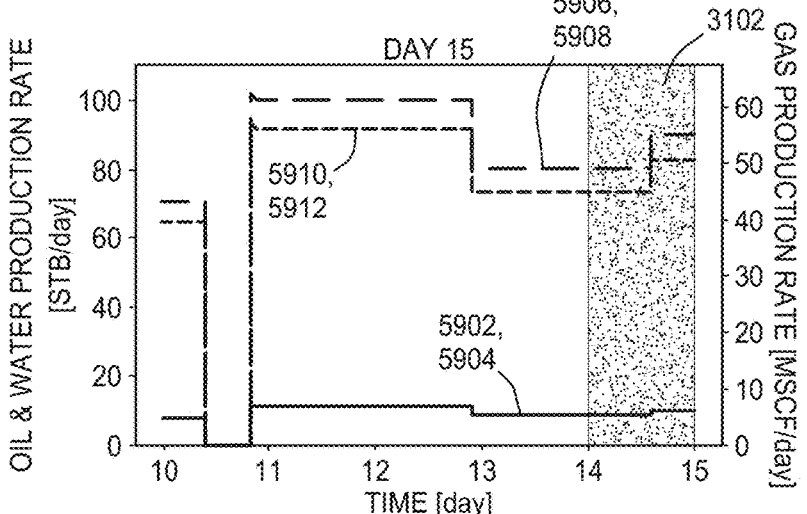
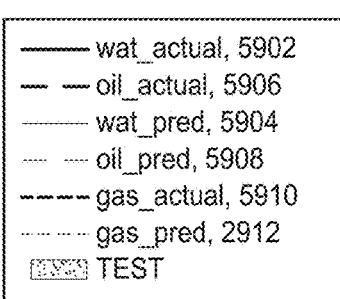
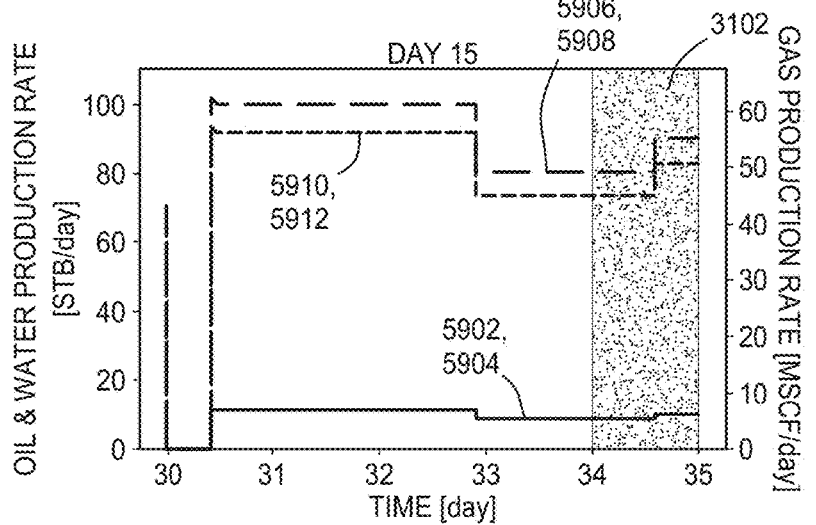
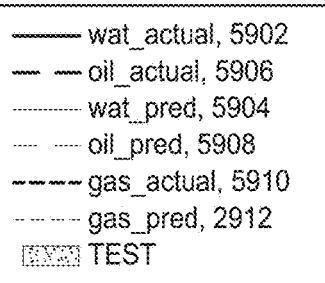
FIG. 59B

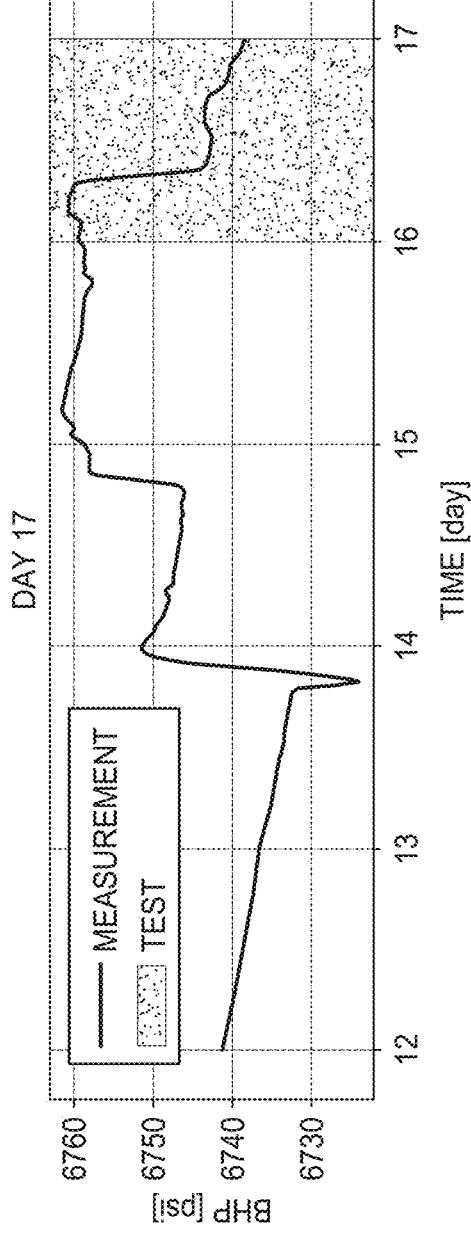
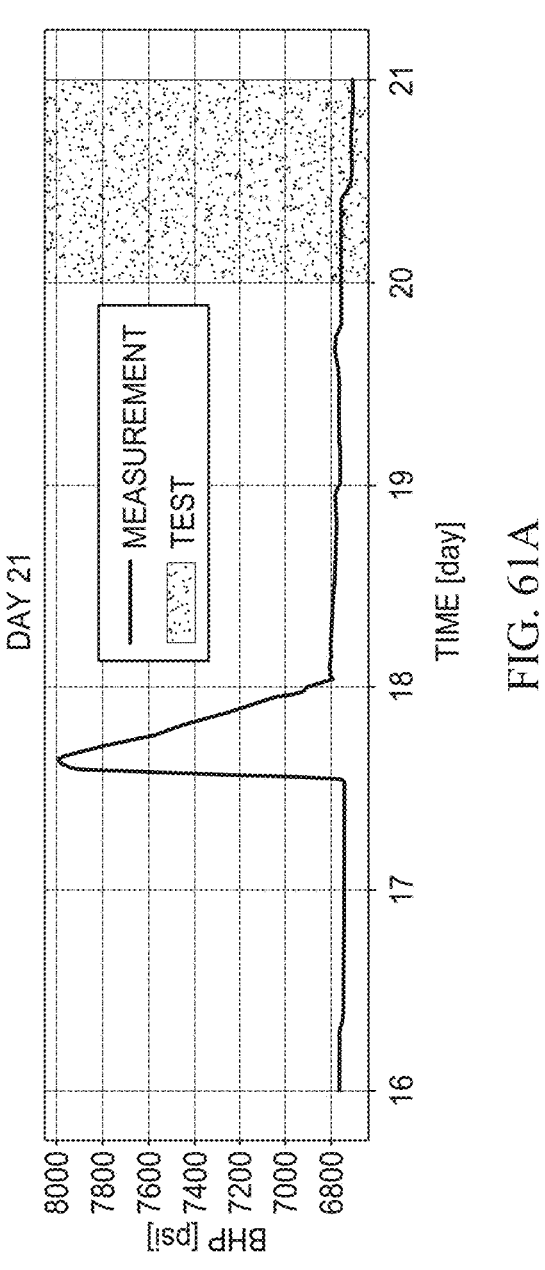
FIG. 61A

DATA-DRIVEN DISCOVERY OF RESERVOIR PHYSICS FOR RESERVOIR SURVEILLANCE

CROSS-REFERENCE TO RELATED APPLICATION

This application claims priority to U.S. Provisional Application No. 63/333,438 filed Apr. 21, 2022 entitled "DATA-DRIVEN DISCOVERY OF RESERVOIR PHYSICS FOR RESERVOIR SURVEILLANCE" by Sathish Sankaran, Wenyue Sun, and Masahiro Nagao, which is incorporated herein by reference as if reproduced in its entirety.

TECHNICAL FIELD

This present disclosure relates to determining estimations of reservoir or well performance characteristics and, more particularly, to methods for estimating average reservoir pressure, well productivity index, and prediction of pressures or flowrates for current and future operating conditions.

BACKGROUND

Understanding well production performance in hydrocarbon reservoirs in a timely manner is essential for closed loop reservoir management, improving operational efficiency, and maximizing value. As operations extend to more complex reservoirs, the industry is faced with challenges to effectively assess and develop these fields. Early understanding of reservoir performance and mitigating remaining uncertainties are important to earning the maximum possible benefit from the assets. However, there is a lack of robust methods for tracking and detecting well performance degradation for optimal reservoir management. In common practice, well productivity is often evaluated through manual interpretations of planned well events (e.g., shut-ins, well tests, etc.). However, traditional surveillance methods are interpretive and do not scale for manual surveillance of either large fields or wells that have large data volumes.

It is now recognized that a need exists for a robust and scalable method for estimating reservoir pressure and well productivity index, which can be applied in a practical and automated manner.

BRIEF DESCRIPTION OF THE DRAWINGS

FIGS. 1-3 are flow charts of example methods to determine average reservoir pressure for a subterranean formation.

FIGS. 4 and 5 are flow charts of example methods to determine bottom-hole pressure in a well for a reservoir in a subterranean formation.

FIG. 8 is a flow chart of an example time-delay embeddings workflow.

FIG. 26 is a plot of average reservoir pressure estimation results of the SINDy-based method for the reservoir model of FIGS. 25A and 25B.

FIG. 27 is a plot representing a well history of liquid flowrate and pressure response for an offshore field reservoir model.

FIGS. 28A and 28B are a set of plots of average reservoir pressure estimation results for the reservoir model of FIG. 27 using the optDMD-based method and the SINDy-based method.

FIG. 29 is a list of physics-inspired features ("physics features") in a regression library for machine learning reservoir models.

FIG. 42 is a flow chart of an example well performance analysis workflow.

FIG. 46 is a plot of a pseudo average reservoir pressure calculation for the reservoir model of FIGS. 43A-43B.

FIGS. 47A and 47B are plots of average reservoir pressure and productivity index results for the reservoir model of FIGS. 43A-43B.

FIG. 50 is a set of plots representing virtual shut-in simulation results for the reservoir model of FIG. 48.

FIG. 53 is a set of plots showing a conversion from high frequency flowrate measurements to daily flowrate measurements and a decline in productivity index in a synthetic reservoir model.

FIGS. 54A and 54B are a set of plots of average reservoir pressure and productivity index results for the reservoir model of FIG. 53.

FIG. 55 is a plot of daily flowrate measurement and high-frequency pressure measurement for an offshore field reservoir model.

FIGS. 58A-58C are plots representing a reservoir map and multiphase flow properties associated with the reservoir model of FIG. 57.

FIGS. 59A and 59B are a set of plots representing the multiphase virtual metering result for the reservoir model of FIG. 57.

FIGS. 61A and 61B are a set of plots representing the multiphase virtual metering result for the reservoir model of FIG. 60.

Figures 1, 2:
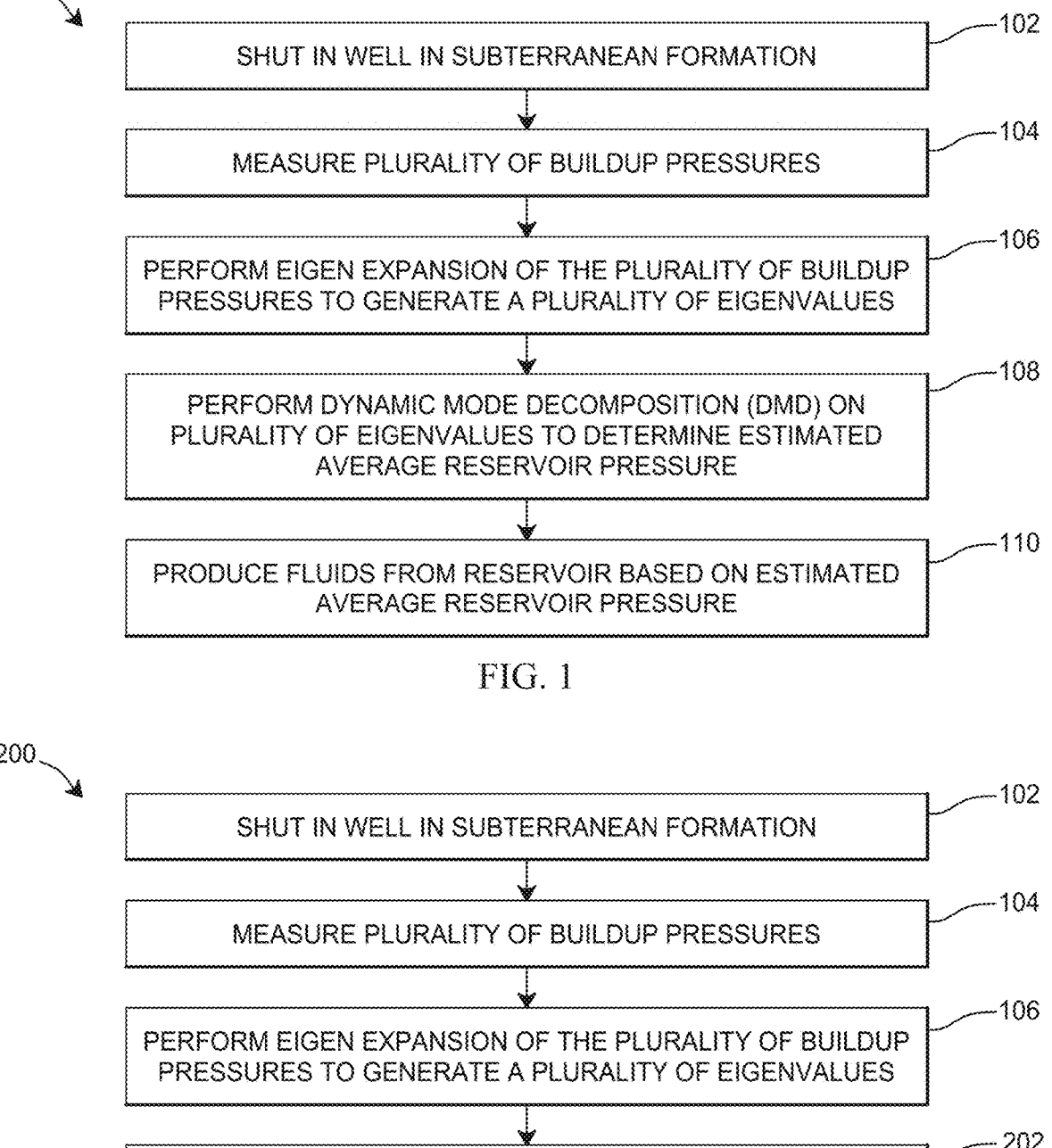

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to systems and methods for estimating reservoir characteristics or well performance characteristics.

More specifically, the present disclosure provides a system and method of determining average reservoir pressure for a subterranean formation, including: shutting in a well in the subterranean formation; measuring a plurality of buildup pressures during a period of time wherein the well is shut in via a downhole pressure gauge; performing an eigen expansion of the plurality of buildup pressures to generate a plurality of eigenvalues; determining an estimated average reservoir pressure based, at least in part, on the plurality of eigenvalues; and producing fluids from the well based, at least in part, on the estimated average reservoir pressure.

In addition, the present disclosure provides a system and method of determining bottom-hole pressure in a well for a reservoir in a subterranean formation, including: receiving a plurality of flowrates for the well; training a machine learning model based on the plurality of flowrates for the well; determining a pressure for the well by performing an analysis on the machine learning model; and producing fluids from the reservoir based, at least in part, on the bottom-hole pressure.

In addition, the present disclosure provides a system and method of determining a flowrate for a well for a reservoir in a subterranean formation, including: receiving a plurality of bottomhole pressures for the well; training a machine learning model based on the plurality of bottomhole pressures for the well; determining the flowrate for the well by performing an analysis on the machine learning model; and producing fluids from the reservoir based, at least in part, on the determine flowrate for the well.

Among the many potential advantages to the methods and systems of the present disclosure, only some of which are alluded to herein, the systems and methods of the present disclosure may provide improved methods for estimation of average reservoir pressure (e.g., reservoir pressure depletion) and well productivity index, and prediction of pressures or flowrates for current and future operating conditions. For example, in certain embodiments, the systems and methods of the present disclosure may provide a machine learning approach to discover reservoir physics that is based, at least in part, on routine field measurements (downhole pressure and flowrates) and used for estimating well productivity, real-time production flowrates, pressure depletion, and short-term forecasts.

The flexibility of machine learning algorithms allows for their application to various data types, offering the ability to handle large amounts of collected data effectively. However, traditional data-driven approaches often have limitations in their application to reservoir engineering and management for reasons such as interpretability, physical consistency, range of validity, and availability of suitable training data. In certain embodiments, the present disclosure provides methods for average reservoir pressure estimation from routine pressure buildup data, which can overcome the limitations of traditional approaches and is applicable in a practical and automated manner to oil and gas reservoirs. In addition, in certain embodiments, the present disclosure provides machine learning-based pressure and flowrate interpretation methods for bottom-hole pressure prediction. Combining the pressure prediction and the average reservoir pressure estimation methods may, in some embodiments, yield a well performance analysis workflow for tracking the productivity index of the well. The same machine learning methods used to predict bottom-hole pressure may be applied in other embodiments for virtual metering of multiphase production flowrate forecasting.

The disclosed methods may automate routine surveillance at field scale with high computational efficiency. In some embodiments, these methods may decrease planned downtime and associated production loss and enable detection of well performance issues much earlier to plan timely remedial actions. In certain embodiments, the present disclosure provides a practical way of combining data-driven methods with our understanding of physics, while keeping the analysis interpretable and enabling closed loop reservoir management.

Estimation of Average Reservoir Pressure

Conventional data-driven methods for average reservoir pressure estimation, in general, often require prior knowledge of a well drainage configuration and a relatively long shut-in data. In addition, conventional methods typically have poor estimation performance for heterogeneous reservoir cases. Thus, conventional techniques may work under limited conditions and may not be sufficiently robust for complex reservoir architecture.

The methods disclosed with reference to FIGS. 1-3 for estimating average reservoir pressure utilize mathematical approaches that can be applied in a practical and automated manner to estimate eigenvalues for wells in field applications, thus providing more robust estimation techniques than conventional methods. The mathematical approaches may include: 1) dynamic mode decomposition (DMD), 2) optimized DMD (optDMD), and 3) sparse identification of nonlinear dynamics (SINDy).

FIG. 1 depicts a method 100 for determining average reservoir pressure for a subterranean formation using DMD.

At step 102, the method 100 may include shutting in a well in the subterranean formation.

At step 104, the method 100 may include measuring a plurality of buildup pressures. The plurality of buildup pressures are a series of bottomhole pressure measurements taken during a well shut in period. When a well is shut in, the bottomhole pressure builds up to the in-situ reservoir pressure given sufficiently long periods of time. As such, the plurality of buildup pressures may track this progression as the pressure builds up toward reservoir pressure. The plurality of buildup pressures may be measured via a downhole pressure gauge, which may be permanently or temporarily located downhole.

At step 106, the method 100 may include performing an eigen expansion of the plurality of buildup pressures to generate a plurality of eigenvalues. At step 106, an eigen expansion equation may be used to describe pressure buildup behavior in a heterogeneous reservoir as follows.

First, the well-known diffusivity equation for reservoir flow is given by:

$$\frac{\partial \Phi}{\partial t} = \frac{1}{\phi c_t} \nabla \cdot \left( \frac{K}{\mu} \cdot \nabla \Phi \right), \tag{1}$$

where $\Phi$ is bottom-hole pressure (BHP), $\phi$ is porosity, $c_t$ denotes total compressibility, K is permeability tensor, and $\mu$ represents fluid viscosity. Neither the permeability tensor K nor other reservoir properties are assumed to be homogeneous in this equation.

Without loss of generality, the no-flow Neumann boundary condition may be assumed for this case, given by:

$$\frac{K}{\mu} \cdot \nabla \Phi \cdot n = 0, \tag{2}$$

where n denotes unit outward normal vector.

Thus, the general solution for Eq. (1) with the boundary condition of Eq. (2) can be expressed using eigenfunctions as follows:

$$\Phi(t, x, y, z) = \Phi_0 + \sum_{i=1}^{\infty} c_i^0 \psi_i(x, y, z) e^{-\lambda_i t} \tag{3}$$

where $\psi_i$ are the eigenfunctions of the differential operator with the Neumann boundary condition, and $\lambda_i$ are the corresponding non-negative eigenvalues.

If we consider the transient pressure buildup behavior at a single point (e.g., the wellbore), then the eigenfunctions can be combined with the constant $$c_i^0.$$

$$\Phi(t) = \Phi_0 + \sum_{i=1}^{\infty} c_i e^{-\lambda_i t} \tag{4}$$

Here, the transient pressure buildup behavior can be described as a combination of a constant term and a sum of exponential decay terms. For a very large time t, the equation converges to the constant $\Phi_0$, which is the desired average reservoir pressure. This functional form may be a starting point in each of the methods of FIGS. 1-3.

At step 108, the method 100 may include performing a dynamic mode decomposition (DMD) on the plurality of eigenvalues to determine an estimated average reservoir pressure.

DMD utilizes proper orthogonal decomposition (POD) and singular value decomposition (SVD) to effectively reduce dimensionality in a high-dimensional system. The POD and SVD result in a hierarchy of modes based entirely on spatial information while largely ignoring temporal information. In contrast, DMD may provide a model decomposition, where each mode maintains spatially correlated structures with the same linear dynamic features in the time domain. DMD may be useful not only for dimensionality reduction in terms of a reduced set of modes but also for future prediction of a high-dimensional system in time. DMD may approximate the Koopman operator based purely on direct state measurements and identifies the best-fit linear dynamical system for high-dimensional nonlinear dynamics.

Several DMD variants have been developed. One such DMD variant is provided below. However, it should be noted that other types or variants of DMD may be used in the method 100 of FIG. 1 without departing from the scope of the present disclosure. A person of ordinary skill in the art would understand the variants of DMD that would be suitable for a given application. The first step of the algorithm is to collect the snapshot of the state as it evolves in time. From the collected snapshots, two data matrices X and X' are generated as follows.

$$X = \begin{bmatrix} | & | & & | \\ x(t_1) & x(t_2) & \dots & x(t_m) \\ | & | & & | \end{bmatrix} \quad (5)$$

$$X' = \begin{bmatrix} | & | & & | \\ x(t'_1) & x(t'_2) & \dots & x(t'_m) \\ | & | & & | \end{bmatrix} \quad (6)$$

where $$t'_k = t_k + \Delta t,$$

and each column is a long state vector. The DMD algorithm seeks the spectral decomposition of the best-fit linear operator A, which satisfies the following equation.

$$X' \approx AX \quad (7)$$

Mathematically, the linear operator A is given by:

$$A = \text{argmin} \|X' - AX\|_F = X'X^\dagger \quad (8)$$

where $X^\dagger$ is the pseudo-inverse of X. For a high-dimensional state vector $X \in \mathfrak{R}^n$, the matrix A has $n^2$ elements, and it may be intractable to compute spectral decomposition of A directly. Instead, the DMD algorithm leverages dimensionality reduction to compute the dominant eigenvalues and eigenvectors of A without performing explicit computation from A directly. The DMD algorithm may take the following steps to compute the dominant eigenvalues and eigenvectors of A.

First, the singular value decomposition of X is computed with the reduced number of modes r.

$$X \approx \tilde{U} \tilde{\Sigma} \tilde{V}^* \quad (9)$$

where $\tilde{U} \in \mathbb{C}^{n \times r}$, $\tilde{\Sigma} \in \mathbb{C}^{r \times r}$, and $\tilde{V} \in \mathbb{C}^{m \times r}$.

According to Eq. (8) and Eq. (9), the full matrix A is given by:

$$A = X'X^\dagger = X'\tilde{V}\tilde{\Sigma}^{-1}\tilde{U}^* \quad (10)$$

However, only the leading r eigenvalues and eigenvectors of A may be of interest. Thus, A may be projected onto POD modes in U.

$$\tilde{A} = \tilde{U}^* A \tilde{U} = \tilde{U}^* X' \tilde{V} \tilde{\Sigma}^{-1} \quad (11)$$

Next, the spectral decomposition of the reduced-order matrix $\tilde{A}$ is computed by $$\tilde{A}W = W\Lambda \quad (12)$$

where $\Lambda$ is a diagonal matrix consisting of DMD eigenvalues and W is a matrix consisting of eigenvectors of $\tilde{A}$ in each column.

Finally, the high-dimensional DMD modes P are computed as follows $$\Phi = X'\tilde{V}\tilde{\Sigma}^{-1}W \quad (13)$$

The present DMD modes may be eigenvectors of the high-dimensional A matrix corresponding to the eigenvalues in A.

$$A\Phi = \quad (14)$$
$$\left( X'\tilde{V}\tilde{\Sigma}^{-1}\tilde{U}^* \right)\left( X'\tilde{V}\tilde{\Sigma}^{-1}W \right) = X'\tilde{V}\tilde{\Sigma}^{-1}\tilde{A}W = X'\tilde{V}\tilde{\Sigma}^{-1}W\Lambda = \Phi\Lambda$$

The convenient feature of DMD may provide conversion of the eigenvalues to Fourier modes by defining $$\omega = \frac{\log(\lambda)}{\Delta t} \quad (15)$$

where $\lambda$ is an eigenvalue in matrix $\Lambda$.

Therefore, the DMD reconstruction forward in time can be computed as follows.

$$x(t) = \sum_{j=1}^{r} \phi_j e^{\omega_j t} b_j = \Phi\exp(\Omega t)b \quad (16)$$

where $\Omega$ is a diagonal matrix containing the continuous-time eigenvalues $\omega_j$.

DMD-based background separation algorithms may be used in real-time for separating background (low-rank) and foreground (sparse) components.

$$x(t) = \underbrace{\phi_p e^{\omega_p t} b_p}_{\text{Background mode}} + \underbrace{\sum_{j \neq p} \phi_j e^{\omega_j t} b_j}_{\text{Foreground modes}} \qquad (17)$$

In this equation, p satisfies $\|\omega_p\| \approx 0$ or $\|\lambda_p\| \approx 1$. The first term represents the stable background mode that hardly changes with time, and the second term represents the high-frequency foreground mode.

In the present techniques, this DMD background separation algorithm may be applied to the pressure buildup data for estimating average reservoir pressure. Noticeably, the eigen expansion equation for pressure buildup in Eq. (4) is very similar to DMD reconstruction in Eq. (16). The eigen expansion equation consists of a constant term and a hierarchy of decaying exponential terms. The constant term may be discovered from the stable background mode given by DMD, which provides the average reservoir pressure estimation.

However, DMD may only describe a linear relationship between current and future states. The diffusivity equation is non-linear, and thus may need to be accounted for using other strategies. Therefore, for generating the data matrices in Eq. (5), time-delay embeddings (TDE) may be performed for the pressure buildup data. The purpose of time-delay embeddings is, at least in part, to reconstruct the state of an unknown dynamical system from time series measurement. The time-delay embeddings may be performed, in certain embodiments, as shown in FIG. 8.

With reference to FIG. 8, N timesteps of pressure buildup data may be given, and a snapshot data matrix may be built by stacking the time series vector m times with delay embeddings. Each snapshot, which is the matrix column, may contain multiple timestep information. Reconstruction may be easier to perform by considering past m measurements.

Figure 9:
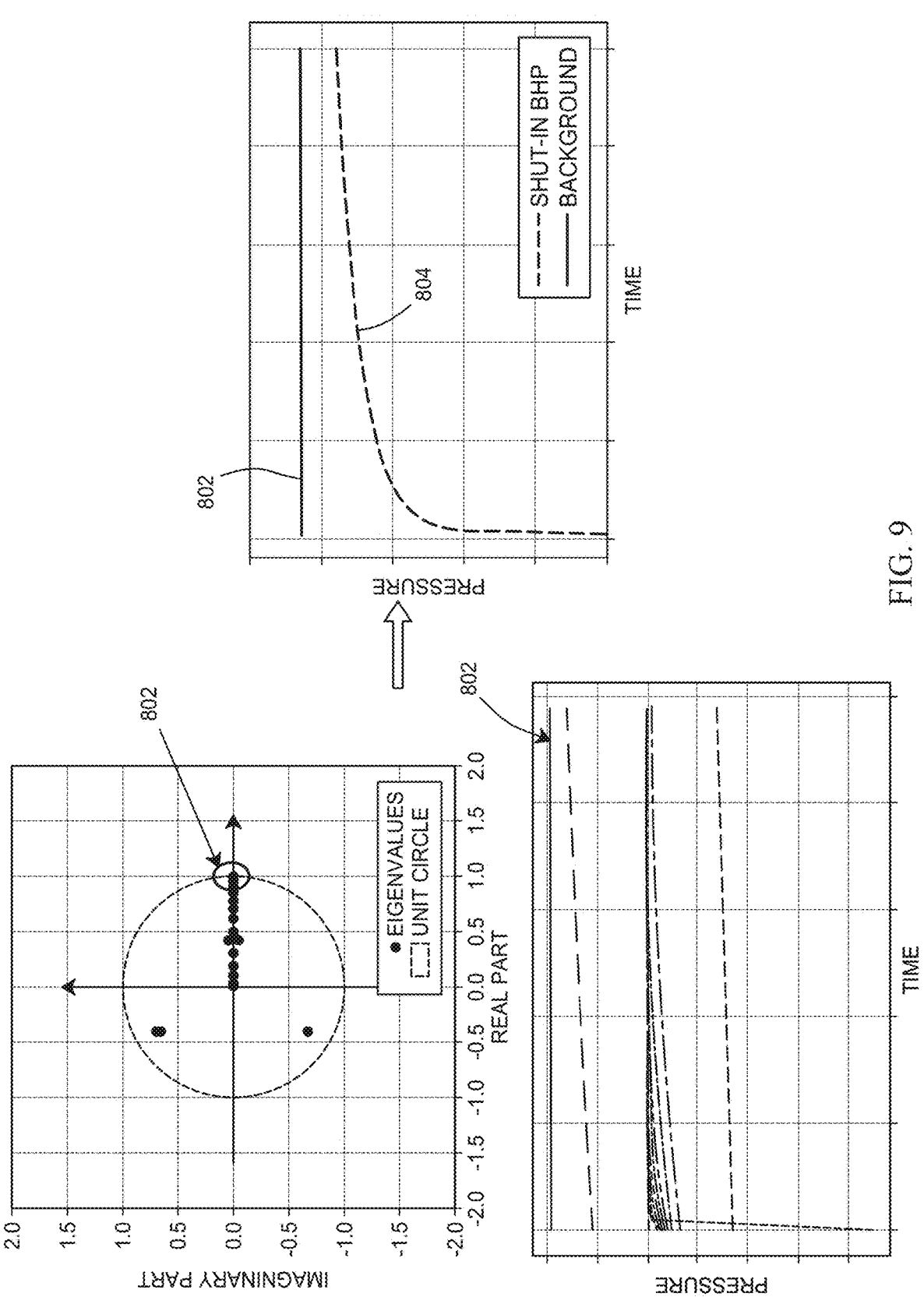
FIG. 9 is a flow chart of an example DMD-based average reservoir pressure estimation workflow.

FIG. 9 shows the procedures of a DMD-based average reservoir pressure estimation workflow. First, time-delay embedding may be performed for pressure buildup data, and the snapshot data matrices are generated. The DMD may be implemented for the data matrices, and it provides the decomposition of pressure buildup data. As depicted in FIG. 9, a background mode may be selected with the DMD eigenvalue that is nearest from the unit circle. The background mode 802 may provide a high constant value in the time domain, which provides the estimation of average reservoir pressure 804.

Turning back to FIG. 1, at step 110, the method 100 may include producing fluids from the well based, at least in part, on the estimated average reservoir pressure determined at step 108. For example, in some embodiments, the method 100 may include adjusting an amount of fluids being produced from certain portions of one or more wells based, at least in part, on the estimated average reservoir pressure. In some embodiments, the method 100 may include ceasing production of fluids to perform remedial actions on one or more wells based, at least in part, on the estimated average reservoir pressure. Step 110 may include producing fluids from the well based on the estimated average reservoir pressure determined at step 108 in addition to one or more other measurements or factors including, for example, the presence of or measurements taken from any other drive mechanisms (such as an external aquifer or neighboring well or field) that are connected to the reservoir.

The estimation of average reservoir pressure available through the method 100 may be useful for proactive reservoir management, including but not limited to producing fluids from the well (step 110). The method 100 may include managing the available fluid energy in draining hydrocarbons from a reservoir by controlling the production from one or a plurality of wells located in the subterranean formation. In addition, steps 102-108 of the method 100 may be repeated several times (e.g., at regular intervals) to provide continuous and/or improved estimation of original hydrocarbons in place for a reservoir. The method 100 may further include estimating the original hydrocarbons in place for the reservoir based on multiple average reservoir pressure estimates from step 108.

In the DMD-based workflow of average reservoir pressure estimation, it may be assumed that DMD always produces a stable mode that provides a high constant value in the real time domain. However, this assumption may not be guaranteed for highly nonlinear dynamical systems, and the DMD workflow may provide unstable DMD modes with eigenvalues larger than 1.0. Using the variable projection method for nonlinear least-squares problems, the DMD framework can be formulated as an optimization problem, which is called optimized dynamic mode decomposition (optDMD).

FIG. 2 depicts a method 200 for determining average reservoir pressure for a subterranean formation using optDMD.

The method 200 may include one or more of the steps 102, 104, 106, and 110 described above with reference to FIG. 1.

At step 202, the method 200 may include performing an optimized dynamic mode decomposition (optDMD) on the plurality of eigenvalues to determine the estimated average reservoir pressure.

In the optDMD framework, the regularization and constraint for parameters can be included so that it is guaranteed to provide a stable DMD mode to estimate reservoir pressure.

The form of the least-squares problem is given by:

$$\text{minimize} \|\eta - \Phi(\alpha)\beta\|_2 \text{ subject to } \alpha \in \mathbb{C}^k, \beta \in \mathbb{C}^l \qquad (18)$$

where $\eta \in \mathbb{C}^m$ and $\Phi(\alpha) \in \mathbb{C}^{m \times l}(m > l)$. Here, we set $\eta_i = \eta(t_i)$ and $\Phi(\alpha)_{i,j} = \phi_j(\alpha, t_i)$ for m samples times $t_i$.

For a fixed $\alpha$, the $\beta$ to minimize Eq. (18) is given by:

$$\beta = \Phi(\alpha)^\dagger \eta \qquad (19)$$

where $\Phi(\alpha)^\dagger$ is the pseudo-inverse of $\Phi(\alpha)$.

From this observation, the minimization problem Eq. (18) can be rewritten as follows in terms of a alone.

$$\text{minimize} \|\eta - \Phi(\alpha)\Phi(\alpha)^\dagger \eta\|_2 \text{ subject to } \alpha \in \mathbb{C}^k \qquad (20)$$

The Levenberg-Marquardt method may be used to solve this minimization problem, and the residual is defined as follows.

$$\rho(\alpha) = \eta - \Phi(\alpha)\Phi(\alpha)^\dagger \eta \qquad (21)$$

For the Levenberg-Marquardt algorithm, the Jacobian of $\rho(\alpha)$ may need to be computed. The Jacobian of $\rho(\alpha)$ can be computed by:

$$J(:,j) = \frac{\partial \rho}{\partial \alpha_j} = -\left(P_\Phi^\perp \frac{\partial \Phi}{\partial \alpha_j} \Phi^\dagger + \left(P_\Phi^\perp \frac{\partial \Phi}{\partial \alpha_j} \Phi^\dagger\right)^*\right)\eta \tag{22}$$

where $$P_\Phi^\perp = 1 - \Phi\Phi^\dagger,$$

and A* denotes the complex conjugate transpose of A. In this equation, $$\frac{\partial \Phi}{\partial \alpha_j}$$

is known because $\Phi_j(\alpha,t)=\exp(\alpha_j t)$ and the derivative of the exponential function may be computed.

All the terms in Eq. (22) can be computed by using the singular value decomposition (SVD) for $\Phi$.

$$\Phi = U\Sigma V^* \tag{23}$$

where $U \in \mathbb{C}^{m \times q}$, $V \in \mathbb{C}^{l \times q}$, and $\Sigma \in \mathbb{C}^{q \times q}$.

By making use of Eq. (23), the following equation provides $$P_\Phi^\perp \frac{\partial \Phi}{\partial \alpha_j} \Phi^\dagger \eta = (I - UU^*)\frac{\partial \Phi}{\partial \alpha_j}\beta \tag{24}$$

From Eq. (19), $\beta$ is computed by $$\beta = V\sum^{-1} U^* \eta \tag{25}$$

and $$\left(P_\Phi^\perp \frac{\partial \Phi}{\partial \alpha_j}\Phi^\dagger\right)^* \eta = U\sum^{-1} V^* \frac{\partial \Phi^*}{\partial \alpha_j}\rho \tag{26}$$

In the DMD formulation, $\alpha$ is the DMD eigenvalue. The optDMD may require the initial estimation of DMD eigenvalues since it uses a gradient-based minimization algorithm, which can be given from the exact DMD.

The optDMD algorithm may be useful for average reservoir pressure estimation when the exact DMD cannot provide a stable DMD high constant mode. The optDMD may improve the estimates of average reservoir pressure compared to regular DMD by improving the stability of the algorithm.

Figure 10A:
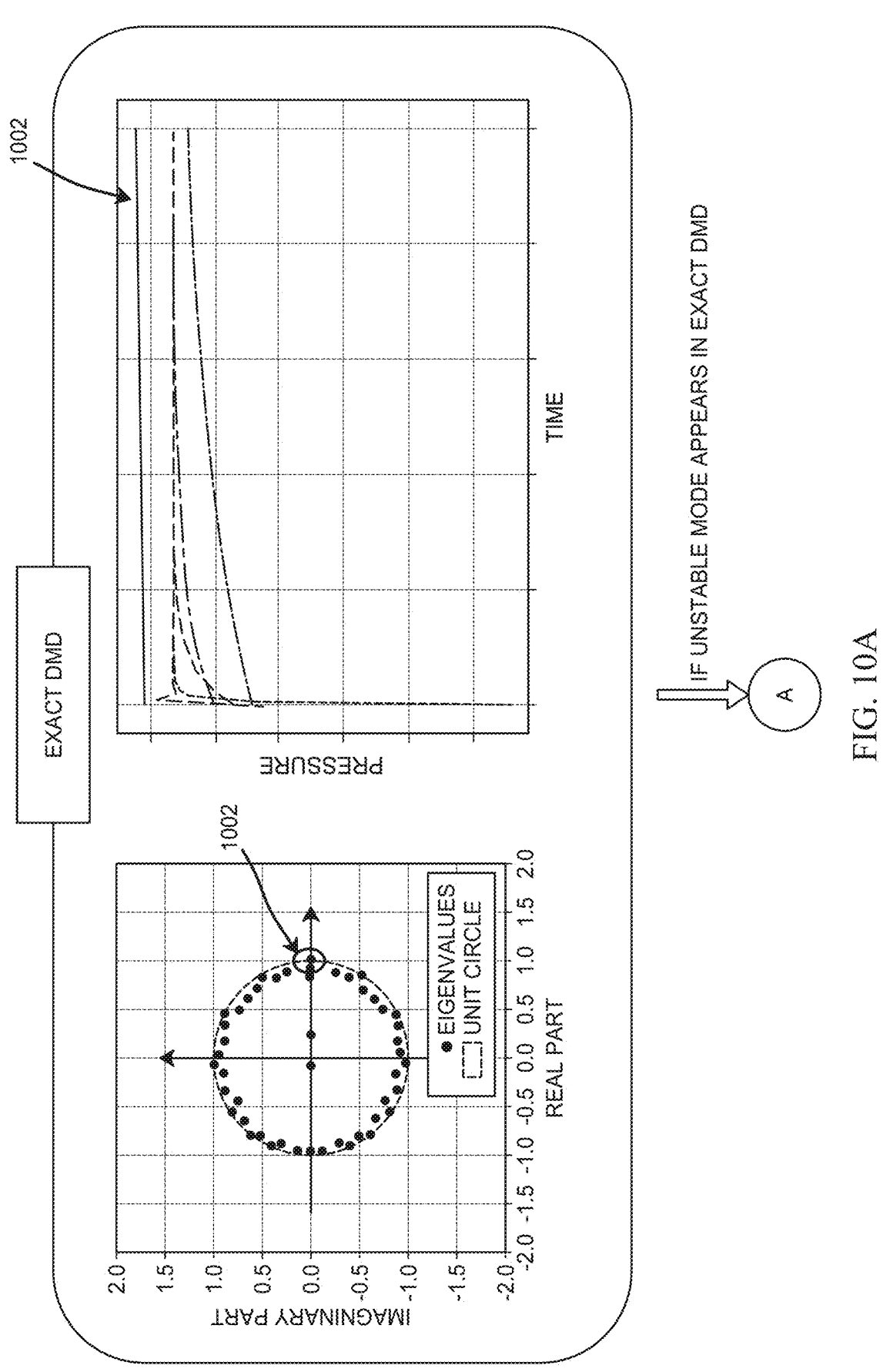
FIGS. 10A-10B is a flow chart of an example optDMD-based average reservoir pressure estimation workflow.
Figure 10B:
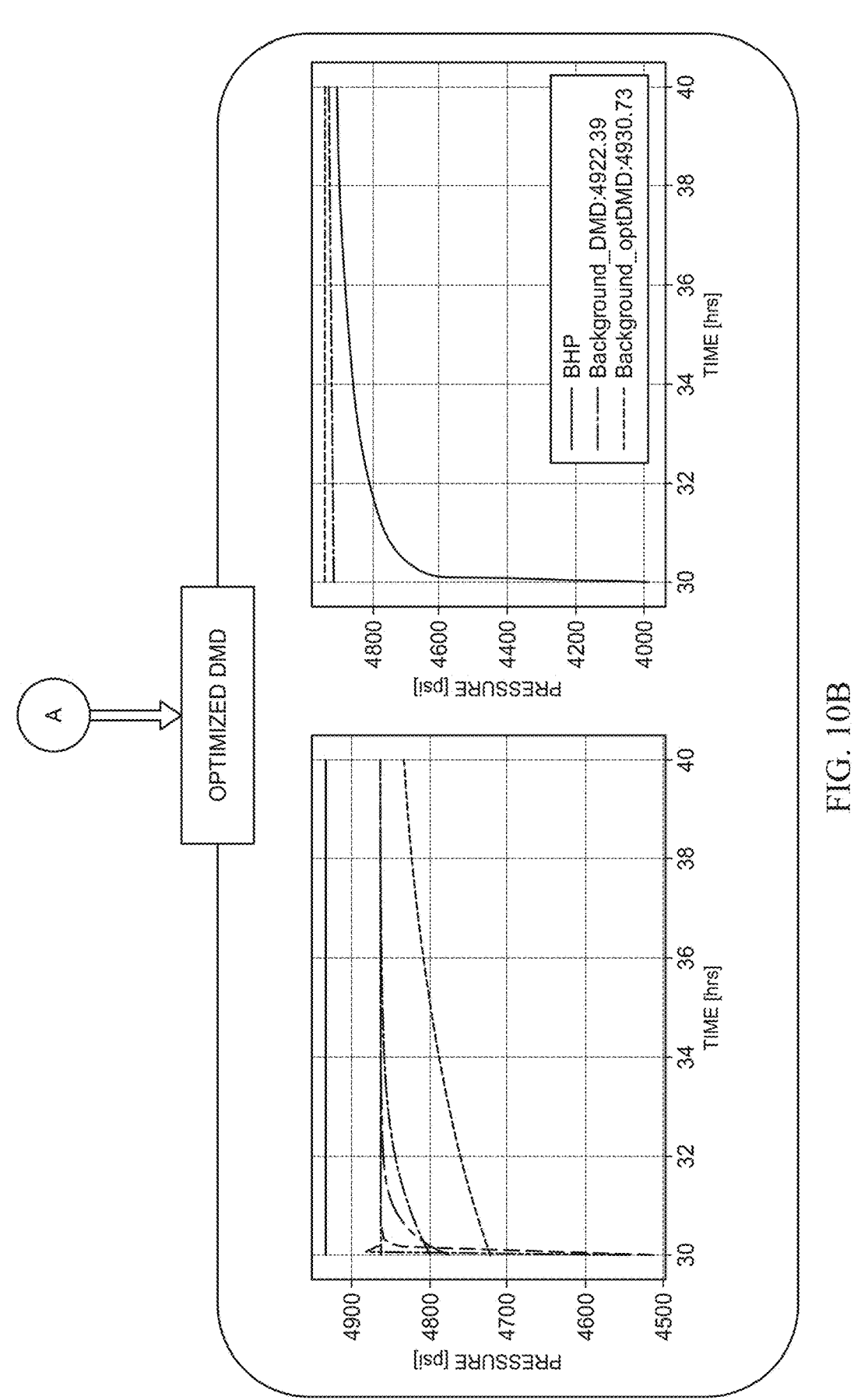

A workflow of optDMD reservoir pressure estimation is shown in FIGS. 10A-10B. The exact DMD for reservoir pressure estimation may first be implemented based on the data matrices from time-delay embeddings. If one of the eigenvalues appears to be larger than 1.0, which means that the DMD mode is unstable and eventually explodes forward in time, then the optDMD method may be applied based on the initial guesses obtained from the exact DMD results. The unstable mode may be illustrated as 1002 in FIG. 10A.

FIG. 3 depicts a method 300 for determining average reservoir pressure for a subterranean formation using SINDy.

The method 300 may include one or more of the steps 102, 104, 106, and 110 described above with reference to FIG. 1.

At step 302, the method 300 may include performing a sparse identification of nonlinear dynamics (SINDy) analysis on the plurality of eigenvalues to determine the estimated average reservoir pressure.

SINDy combines sparsity-promoting techniques and machine learning with nonlinear dynamical systems to discover governing physical equations based purely on measurements. At step 302, SINDy may be applied for average reservoir pressure estimation.

The primary motivation of SINDy is to identify the governing equations that underly a physical system based on data. The SINDy algorithm starts from the following formulation:

$$\dot{x}(t) = f(x(t)) \tag{27}$$

where the vector x(t) represents the state of the system at time t: $(x(t)=[x_1(t), x_2(t), \ldots, x_n(t)]^T \in \mathbb{R}^n)$, and the right-hand side nonlinear function $f(x(t))$ describes the equation of motion of the dynamical system. The key assumption in SINDy formulation may be that the nonlinear function $f(x(t))$ consists of a few terms, making the governing equations sparse in a high-dimensional nonlinear system. This assumption may hold true for many physical systems. Sparse regression methods may make this concept of sparsity favorable, since these algorithms can efficiently determine the right-hand side terms that are active in the regression library.

To determine the form of the nonlinear function $f$ based purely on data, the time-series measurements of the state x(t) and their derivatives with respect to time x(t) may initially be collected.

$$x(t) = \begin{bmatrix} x^T(t_1) \\ x^T(t_2) \\ \vdots \\ x^T(t_m) \end{bmatrix} = \begin{bmatrix} x_1(t_1) & x_2(t_1) & \ldots & x_n(t_1) \\ x_1(t_2) & x_2(t_2) & \ldots & x_n(t_2) \\ \vdots & \vdots & \ddots & \vdots \\ x_1(t_m) & x_2(t_m) & \ldots & x_n(t_m) \end{bmatrix} \tag{28}$$

$$\dot{x}(t) = \begin{bmatrix} \dot{x}^T(t_1) \\ \dot{x}^T(t_2) \\ \vdots \\ \dot{x}^T(t_m) \end{bmatrix} = \begin{bmatrix} \dot{x}_1(t_1) & \dot{x}_2(t_1) & \ldots & \dot{x}_n(t_1) \\ \dot{x}_1(t_2) & \dot{x}_2(t_2) & \ldots & \dot{x}_n(t_2) \\ \vdots & \vdots & \ddots & \vdots \\ \dot{x}_1(t_m) & \dot{x}_2(t_m) & \ldots & \dot{x}_n(t_m) \end{bmatrix} \tag{29}$$

Next, an augmented library $\Theta(x)$ may be constructed, consisting of candidate nonlinear functions in each column. For example, $\Theta(x)$ may consist of constant, polynomial, and trigonometric functions.

$$\Theta(x) = \begin{bmatrix} | & | & | & | & & | & | & | & | \\ 1 & x & x^{P_2} & x^{P_3} & \ldots & \sin(x) & \cos(x) & \sin(2x) & \cos(2x) & \ldots \\ | & | & | & | & & | & | & | & | \end{bmatrix} \tag{30}$$

where

-continued $$x^{P2} = \begin{bmatrix} x_1^2(t_1) & x_1(t_1)x_2(t_1) & \dots & x_2^2(t_1) & x_2(t_1)x_3(t_1) & \dots & x_n^2(t_1) \\ x_1^2(t_2) & x_1(t_2)x_2(t_2) & \dots & x_2^2(t_2) & x_2(t_2)x_3(t_2) & \dots & x_n^2(t_2) \\ \vdots & \vdots & \ddots & \vdots & \vdots & \ddots & \vdots \\ x_1^2(t_m) & x_1(t_m)x_2(t_m) & \dots & x_2^2(t_m) & x_2(t_m)x_3(t_m) & \dots & x_n^2(t_m) \end{bmatrix} \quad (31)$$

Each column of $\Theta(x)$ is a candidate function for the right-hand side of Eq. (27). According to the assumption of the sparsity of the governing physical equation, a sparse regression may be performed to determine the sparse vector of coefficients $\Xi=[\xi_1 \, \xi_2 \, \dots \, \xi_n]$.

$$\dot{x}(t) = \Theta(x)\Xi \quad (32)$$

where $\Xi$ represents a sparse vector of coefficients determining which terms are active in the regression library. Once the coefficients are computed, the governing equation of the physical system may be determined, and the discovered model can be used for future state prediction.

Figure 11:
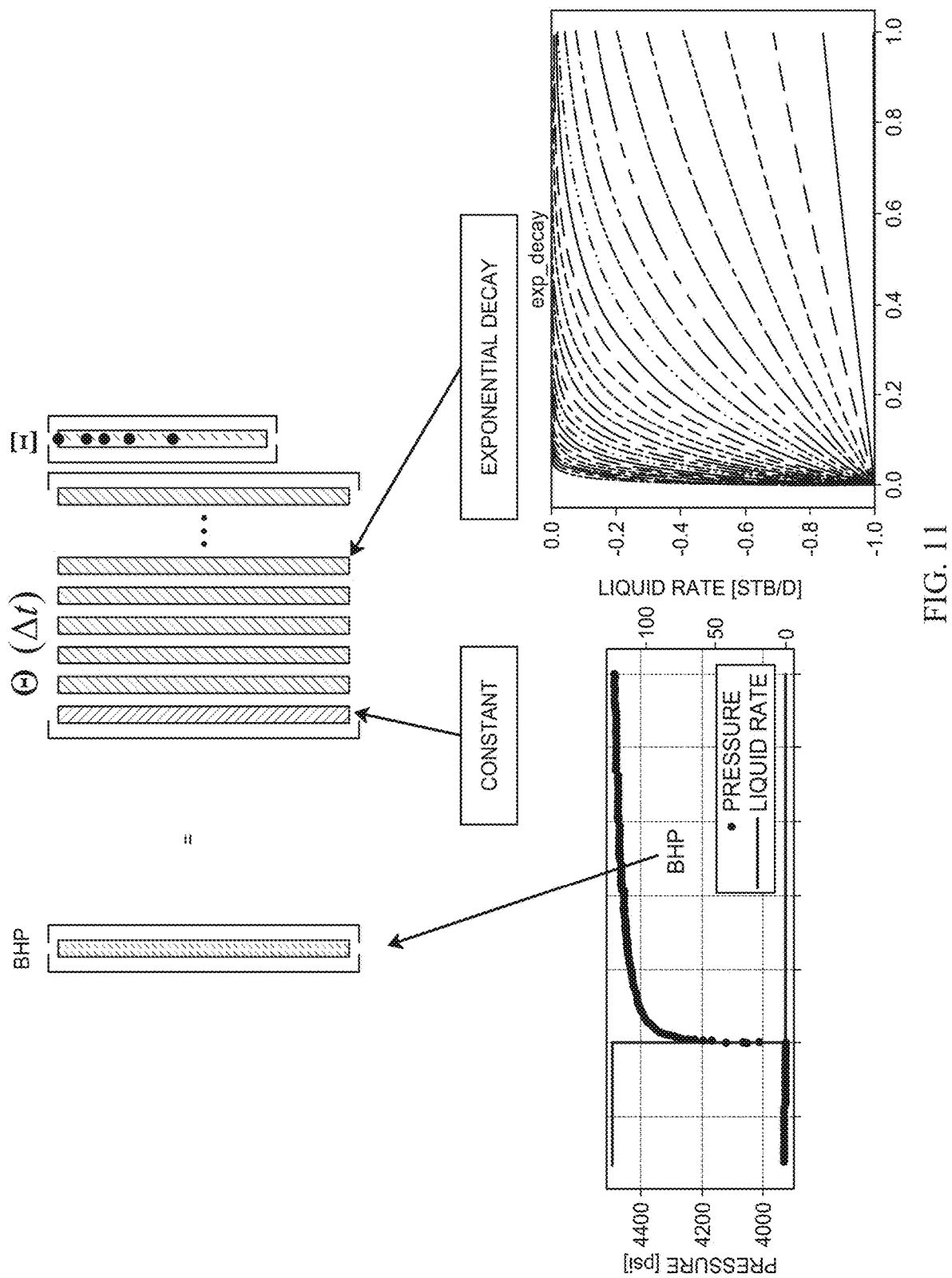
FIG. 11 is a schematic of an example framework of regression-based average reservoir pressure estimation with exponential decay functions.

The eigen expansion equation for pressure buildup in Eq. (4) has a constant term that describes the average reservoir pressure, and exponential decay terms that may generate the curvature of the pressure buildup behavior. Based on this equation, a regression problem may be formulated as shown in FIG. 11, which fits the model to the pressure buildup data. In the regression library, a constant term and hierarchy of exponential decay terms same as Eq. (4) may be included. Sampling different eigenvalues $\lambda_i$ may provide different shapes of decaying exponential functions. After solving the regression, the constant term in the regression library multiplied by its coefficient may provide the estimation of average reservoir pressure. The $L_2$ norm-regularized regression with non-negative coefficients constraint may be used for the optimization algorithm. Without any regularization and constraint for this problem, there is freedom of choice for recovering the pressure buildup behavior. Therefore, it may be required to add a non-negative coefficient constraint and regularization to obtain stable estimation performance of average reservoir pressure with modest regression coefficients.

The regression accuracy and reservoir pressure estimation performance may be further improved by including physics-based nonlinear functions in the regression formulation. In certain embodiments, one of the limitations of the framework shown in FIG. 11 may be that the exponential decay function might not be enough to recover a highly nonlinear dynamical system. Exponential decay functions are a solution form of linear differential equations, which describes the linear dynamical systems. Although nonlinear dynamical systems can be decomposed into infinite-dimensional linear operators, highly nonlinear dynamical systems cannot be decomposed into finite-dimensional linear modes with high accuracy in practical applications, where DMD has the same limitation.

Figure 12:
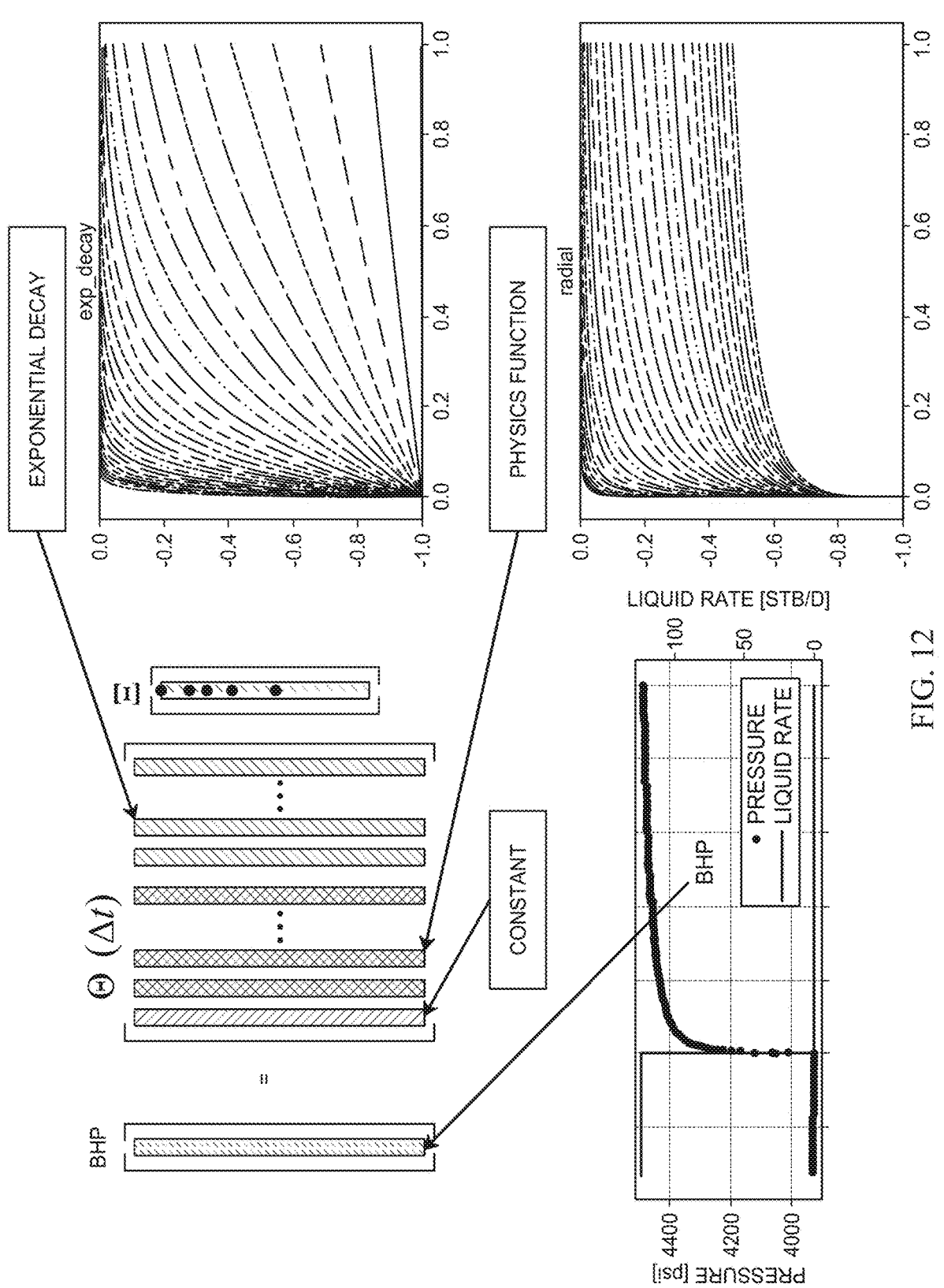
FIG. 12 is a schematic of an example framework of regression-based average reservoir pressure estimation with exponential decay functions and physics-based nonlinear functions.

FIG. 12 shows the rearranged formulation of average reservoir pressure estimation based on the concept of SINDy. In addition to the exponential decay function, the physics-based nonlinear functions may be included in the regression library, based on the analytical relationships between bottom-hole pressure and flowrate.

Figure 13:
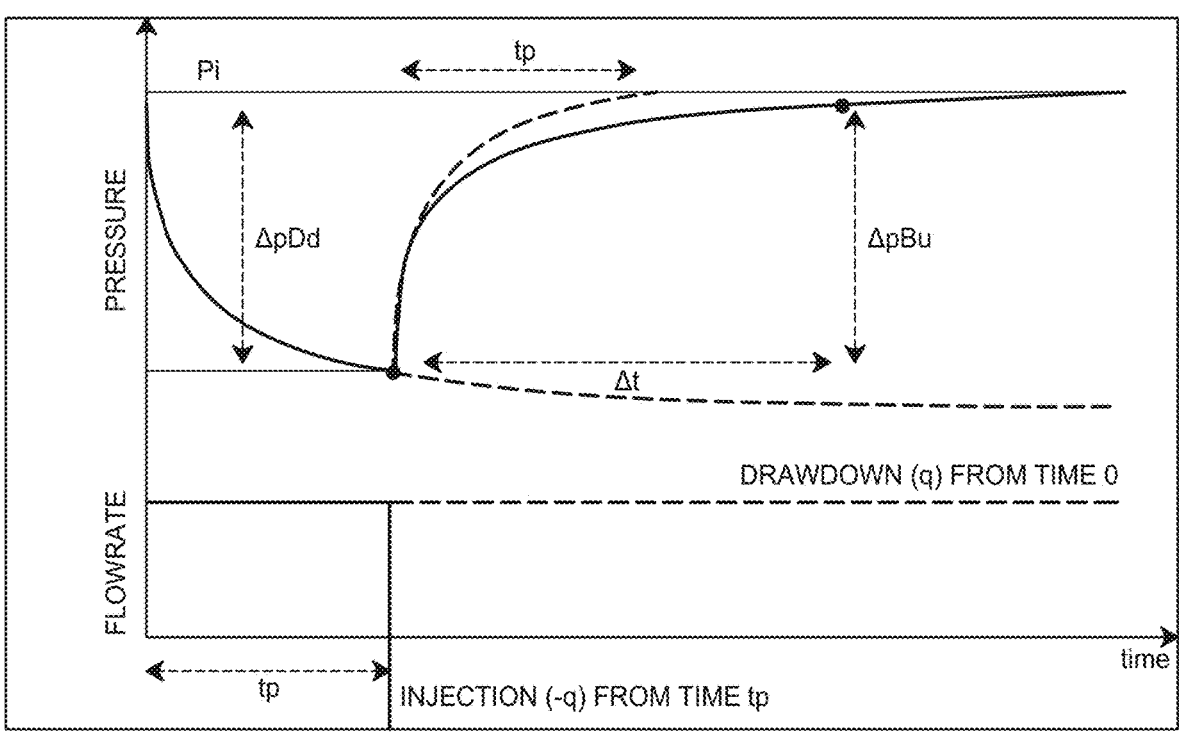
FIG. 13 is a plot representing a derivation of physics-based nonlinear functions for average reservoir pressure estimation.

As shown in FIG. 13, several analytical equations for pressure buildup behavior can be derived by the superposition theorem for various flow regimes such as radial, linear, bilinear, and spherical flow, etc.

$$\Delta P_{BU\_radial} = -m \ln\left(\frac{t_p}{\Delta t} + 1\right) \quad (33)$$

$$\Delta P_{BU\_linear} = m\left(\sqrt{t_p} + \sqrt{\Delta t} - \sqrt{t_p + \Delta t}\right) \quad (34)$$

$$\Delta P_{BU\_bilinear} = m\left(\sqrt[4]{t_p} + \sqrt[4]{\Delta t} - \sqrt[4]{t_p + \Delta t}\right) \quad (35)$$

$$\Delta P_{BU\_spherical} = m\left(\frac{1}{\sqrt{t_p}} + \frac{1}{\sqrt{\Delta t}} - \frac{1}{\sqrt{t_p + \Delta t}}\right) \quad (36)$$

where $t_p$ is production time, and $\Delta t$ is shut-in time.

By sampling different $t_p$ values, different shapes of non-linear functions may be generated. The $L_2$ norm regularized regression with non-negative coefficient constraint for the regression algorithm may be used to achieve a stable estimation performance with modest regression coefficients. The SINDy approach may improve the accuracy of estimates of average reservoir pressure compared to regular DMD and/or optDMD. The SINDy approach may provide physically interpretable results with closed form equations, which is an improvement over opaque machine learning models.

To demonstrate the benefits of the average reservoir pressure estimation workflows discussed above, the workflows were applied to several synthetic and field cases in the following Examples 1-5.

Example 1—Horner Equation

The first example involved applying the DMD-based average reservoir pressure estimation (with TDE) of FIG. 1 to an analytical reservoir model based on the Horner equation, which is given by:

$$P_{ws} = P_i - 162.6 \frac{qB\mu}{kh} \log\left[\frac{t_p + \Delta t}{\Delta t}\right] \quad (37)$$

where $P_i$ is initial reservoir pressure, q is shut-in flowrate, B is formation volume factor, $\mu$ is viscosity, k is permeability, h is reservoir height, $t_p$ is production time, and $\Delta t$ is shut-in time.

Figure 14:
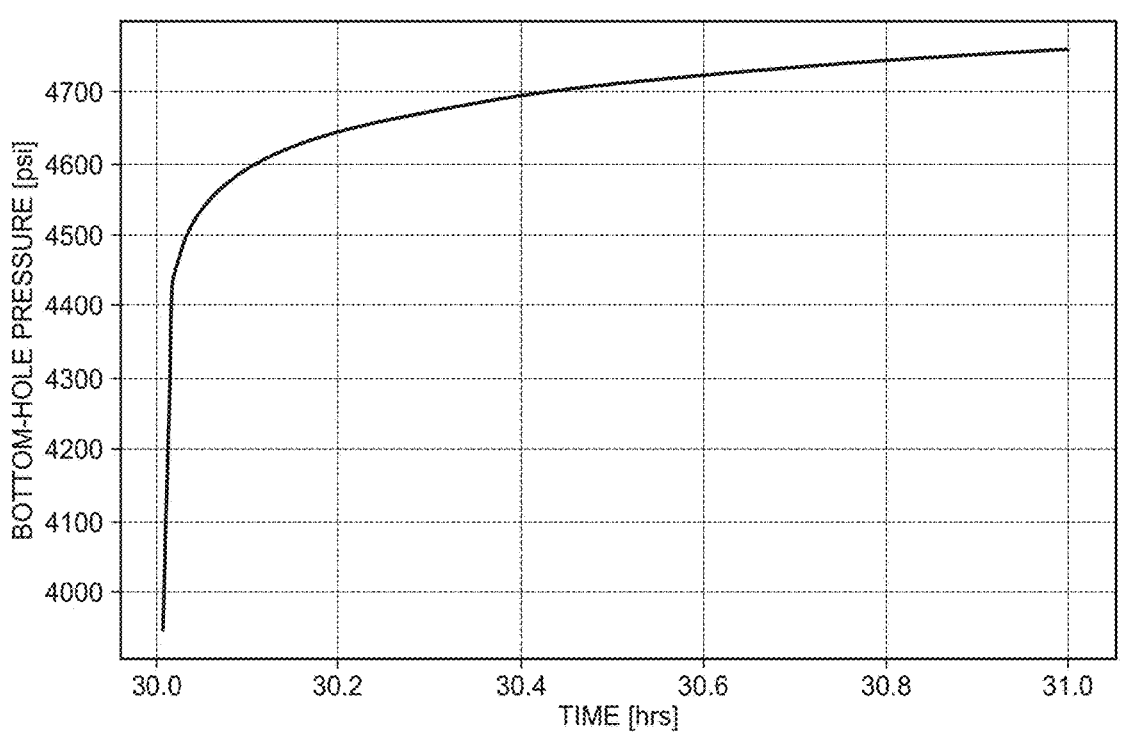
FIG. 14 is a plot of pressure buildup data of an analytical reservoir model.

The reservoir properties and the pressure buildup data for 1 hour (100 timesteps) are shown in FIG. 14 and Table 1.

TABLE 1

| Reservoir properties of analytical model based on Horner equation | |
| --- | --- |
| Porosity | 0.2 |
| Permeability (mD) | 20.0 |
| Reservoir height (ft) | 10.0 |
| Flowrate (stb/day) | 100.0 |
| Viscosity (cp) | 2.0 |
| Initial reservoir pressure (psi) | 5000.0 |
| Formation volume factor (RB/STB) | 1.0 |

Figures 15A, 15B:
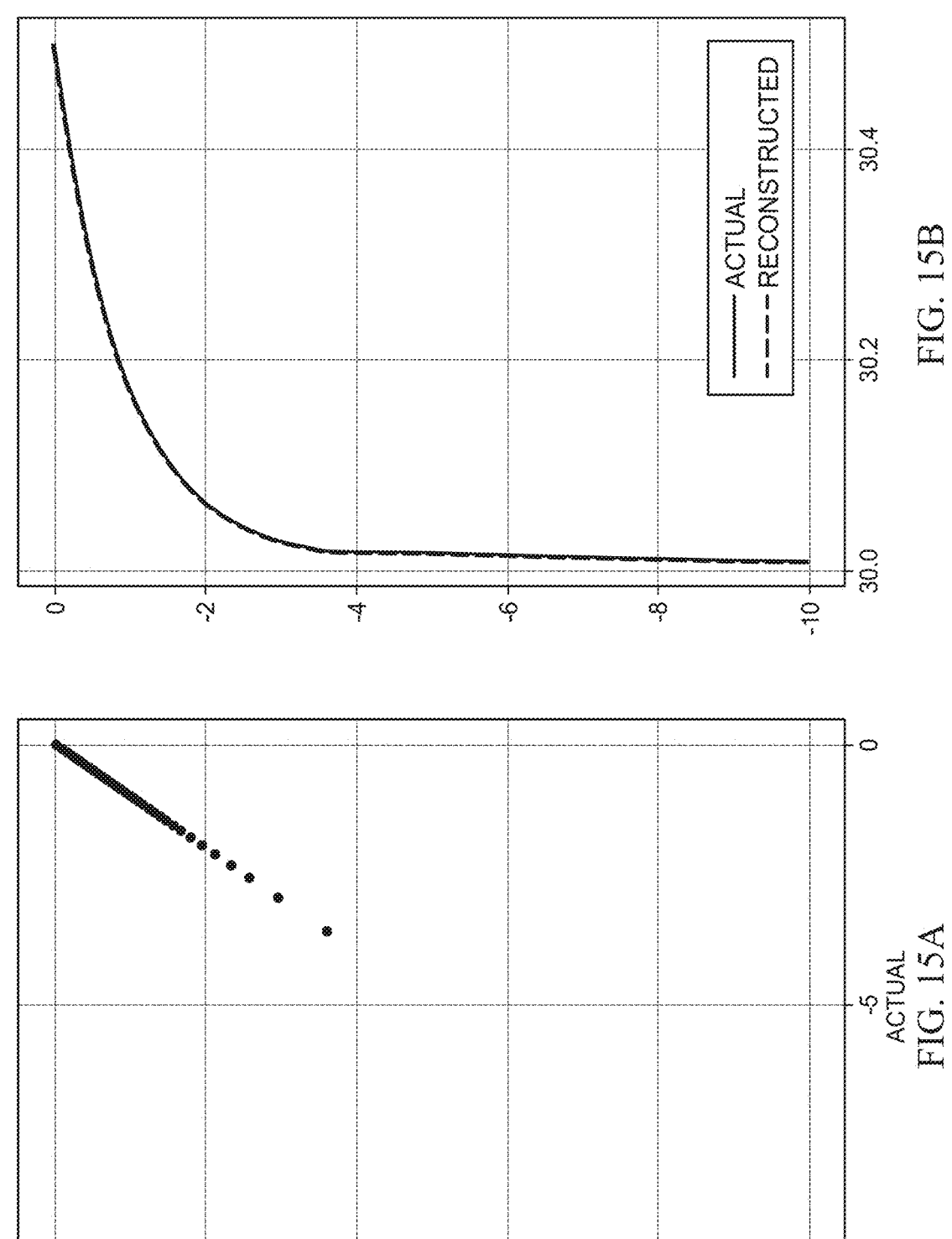
FIGS. 15A-15B are a set of plots of DMD implementation results for the reservoir model of FIG. 14.

The DMD (with TDE) method was used with 20 TDEs. FIGS. 15A and 15B show the reconstruction result of scaled pressure buildup data, and it provides great agreement for this case.

Figure 16A:
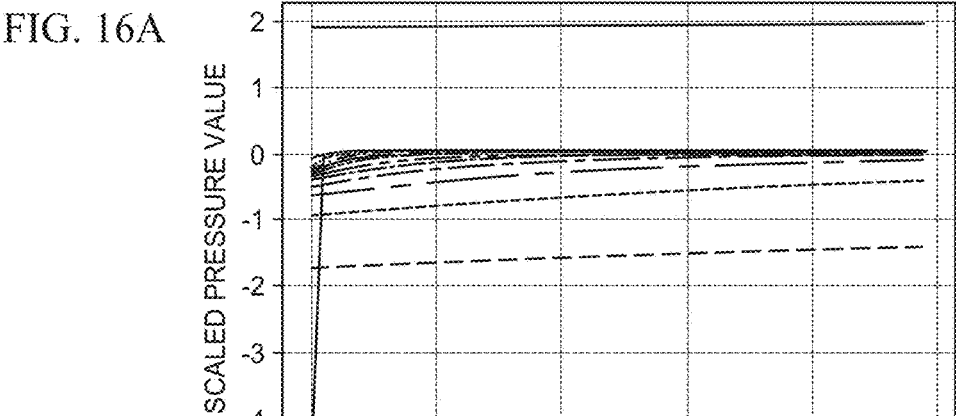
FIGS. 16A and 16B are a set of plots representing average reservoir pressure estimation results of the DMD-based method for the reservoir model of FIG. 14.
Figure 16B:
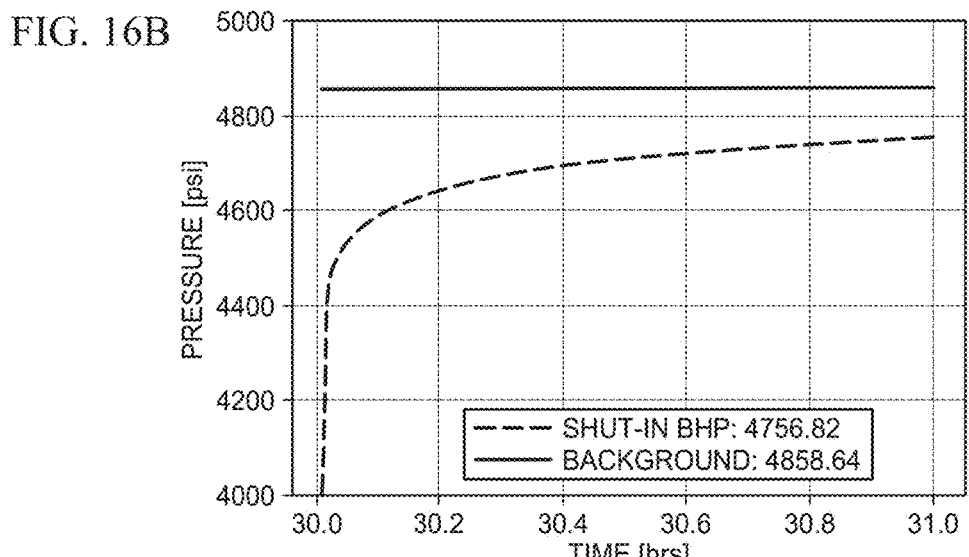

In a complex plane plot (not shown), DMD modes have stable background modes if the eigenvalues are close to the unit circle. Based on repeated DMD implementation, the most stable mode usually becomes a constant mode, and the constant mode provides the average reservoir pressure estimation. FIG. 16A shows the DMD decomposition result of scaled pressure buildup data. In the results, one mode provides a high constant value, which provides the estimation of average reservoir pressure. FIG. 16B shows the reservoir pressure estimation result. The shut-in BHP at the last timestep is 4,756.82 psi, and the estimated average reservoir pressure was 4,858.64 psi. As shown in Table 1, the initial reservoir pressure is 5,000.0 psi, and because the Homer equation describes the infinite acting radial flow, the true average reservoir pressure should also be 5,000.0 psi. Therefore, the DMD method (FIG. 1) provides a reasonable estimation of average reservoir pressure for the Homer Equation case with only 1 hour of pressure buildup data. More accurate estimation can be obtained with longer pressure buildup data.

Example 2—IARF Reservoir with Wellbore Storage

Figure 17:
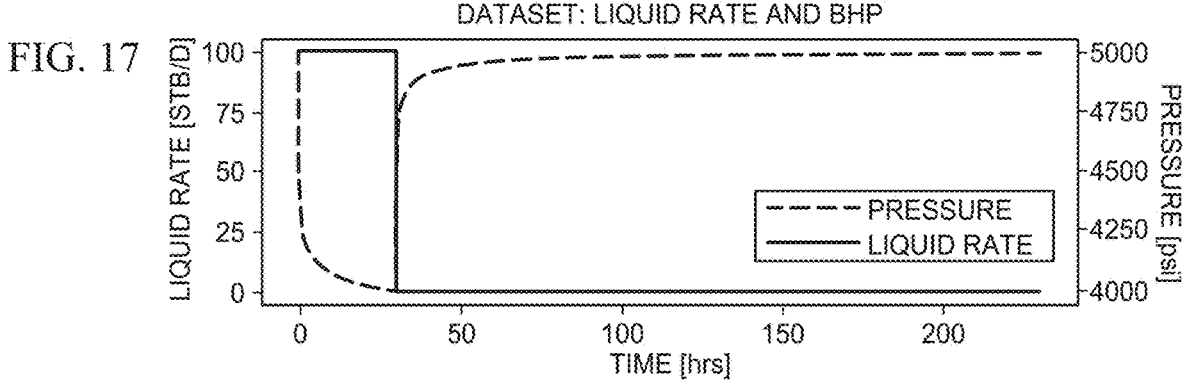
FIG. 17 is a plot of pressure buildup data of another analytical reservoir model.

The second example involved applying different average reservoir pressure estimations to an analytical reservoir model that has infinite acting radial flow (IARF) with wellbore storage built by using commercial software. FIG. 17 shows the pressure buildup data, and Table 2 summarizes the properties of this second example. The nonlinearity of the pressure buildup data is more significant than the case of the Homer equation due to the wellbore storage. The first 10 hours of pressure buildup data (100 timesteps) were used to estimate the average reservoir pressure.

TABLE 2

Properties of analytical radial reservoir model with IARF and wellbore storage

| | |
|---|---|
| Porosity | 0.2 |
| Permeability (mD) | 20.0 |
| Reservoir height (ft) | 10.0 |
| Flowrate (stb/day) | 100.0 |
| Viscosity (cp) | 2.0 |
| Initial reservoir pressure (psi) | 5000.0 |
| Formation volume factor (RB/STB) | 1.0 |
| Wellbore storage coefficient (bbl/psi) | 0.001 |

Figure 18A:
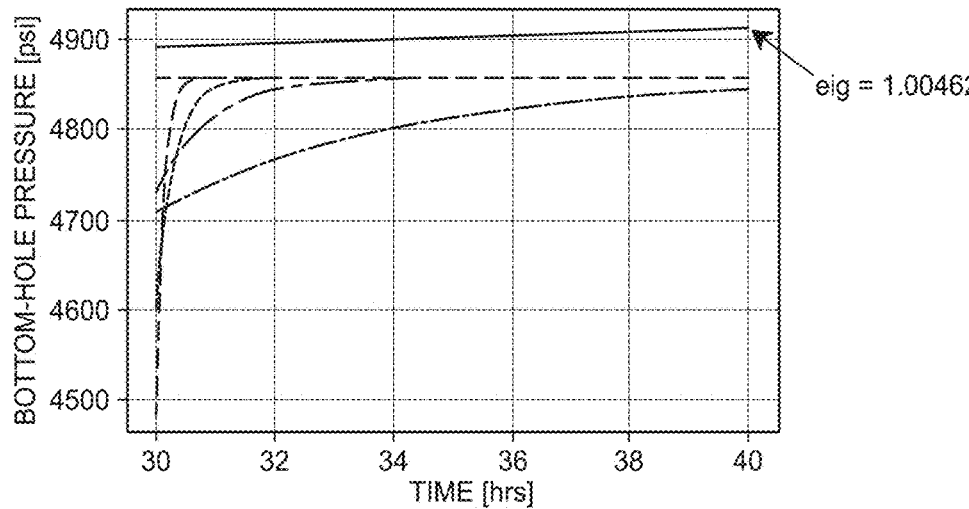
FIGS. 18A and 18B are a set of plots of DMD implementation results for the reservoir model of FIG. 17.
Figure 18B:
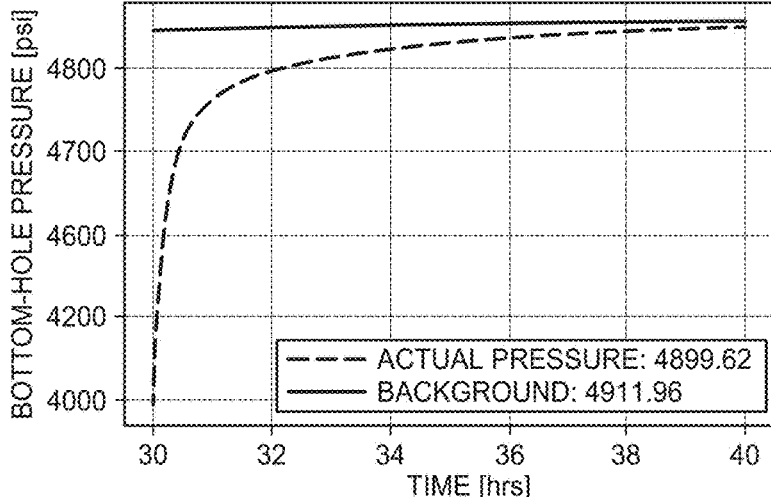

First, the DMD (with TDE) based average reservoir pressure estimation method (FIG. 1) was applied. FIGS. 18A and 18B show the decomposition results and estimation of average reservoir pressure with 50 TDEs. As shown in FIG. 18A, there is not a stable high constant mode, but instead, one line shows an increasing unstable mode. The eigenvalue of that mode was 1.00462, which means that the DMD mode continues increasing, and explodes eventually. The calculated average reservoir pressure using 10-hour buildup was 4,911.96 psi compared with the true reservoir pressure of 5,000 psi. Though the result was incidentally satisfactory, the unstable mode may, in certain embodiments, present practical challenges to work under all conditions.

Figure 19A:
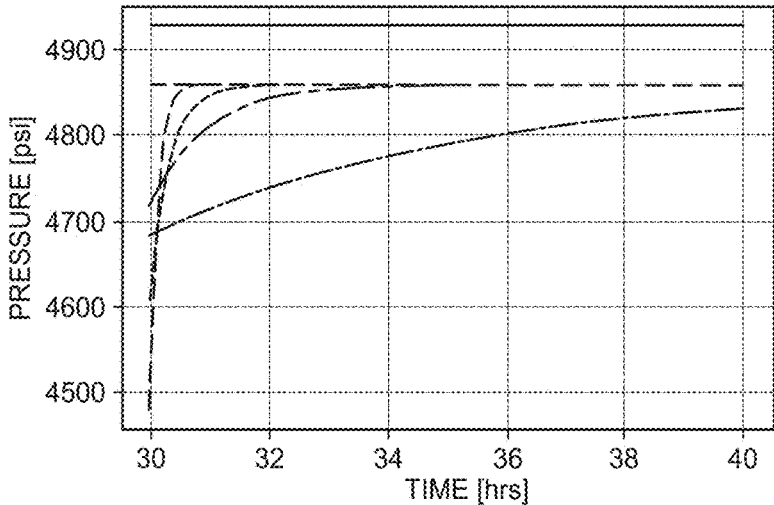
FIGS. 19A and 19B are a set of plots of optDMD implementation results for the reservoir model of FIG. 17.
Figure 19B:
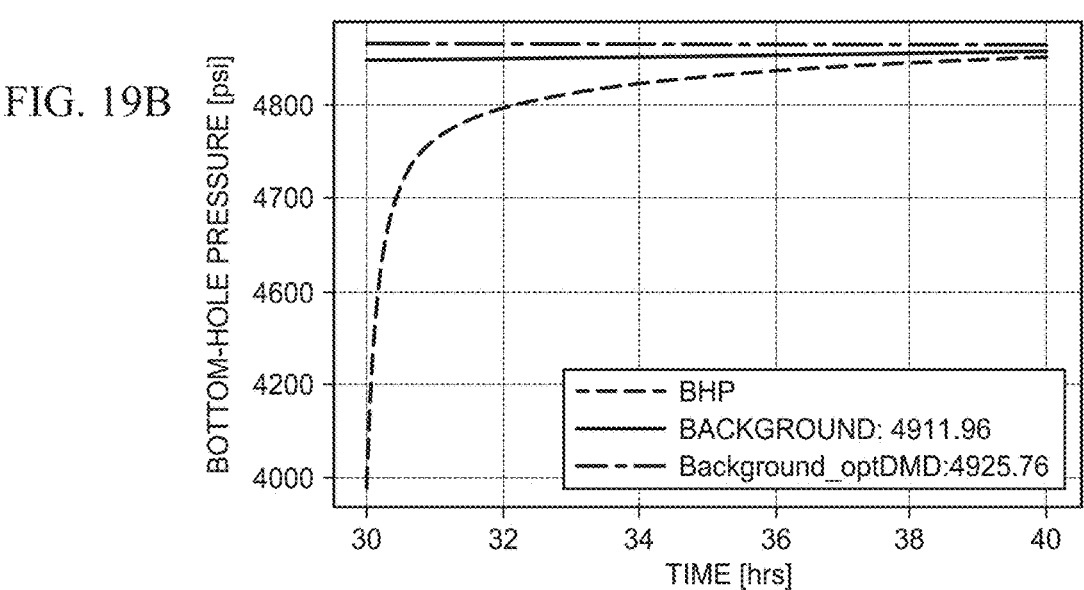

In order to obtain stable DMD modes, the optDMD-based average reservoir pressure estimation of FIG. 2 was tested. FIGS. 19A and 19B show the decomposition result from the optDMD method and the comparison of DMD and optDMD for average reservoir pressure estimation. The decomposition result shows that optDMD produced a constant mode, providing the average reservoir pressure. In this example, compared with DMD, optDMD slightly improved the reservoir pressure estimation performance.

Figure 20:
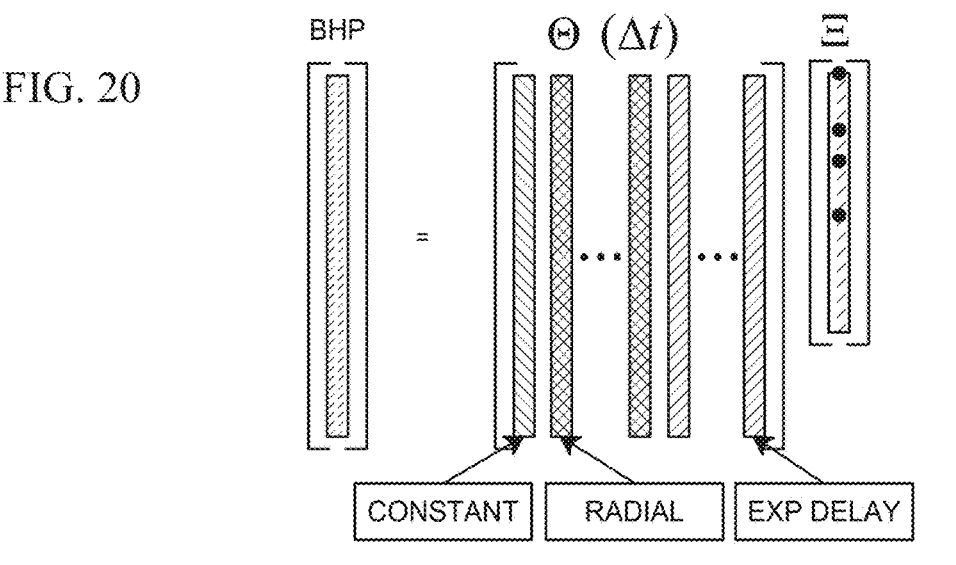
FIG. 20 is a schematic of an example framework of the SINDy formulation of reservoir pressure estimation for the reservoir model of FIG. 17.

Next, the SINDy-based average reservoir pressure estimation of FIG. 3 was applied with radial flow regime equations and exponential decay functions in the regression library, as illustrated in FIG. 20. As specified in Table 3, 2,001 candidate functions were proposed in the library in total by sampling $t_p$ and $\lambda$. The regularized and constraint regression model was fitted to the pressure buildup data with modest coefficient changes.

Figure 21:
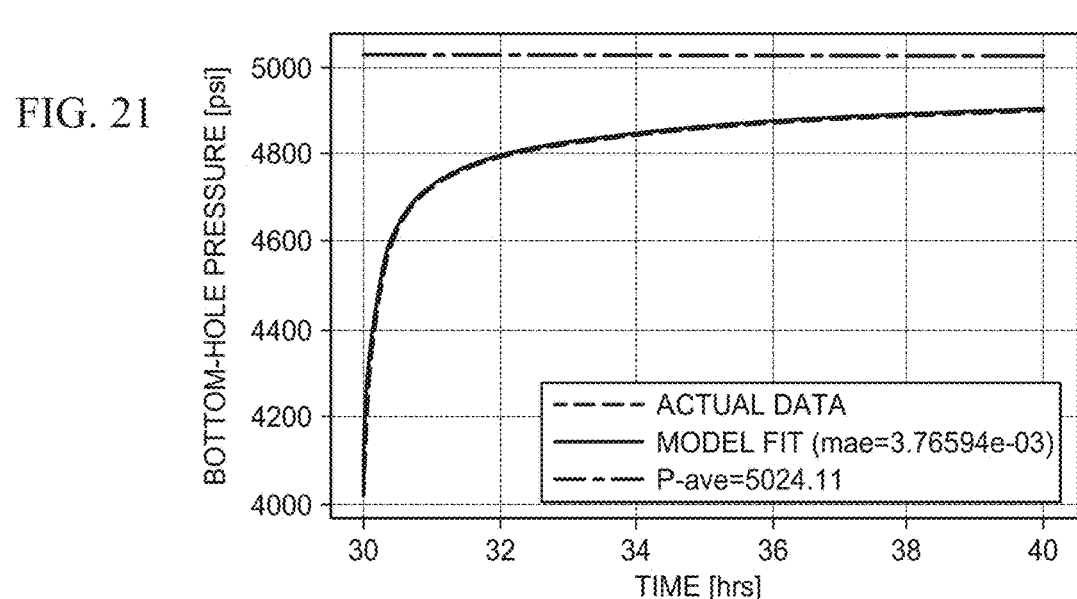
FIG. 21 is a plot of average reservoir pressure estimation results of the SINDy-based method for the reservoir model of FIG. 17.

FIG. 21 shows the reservoir pressure estimation result. The estimated average reservoir pressure was 5,024.11 psi, and true reservoir pressure was 5,000 psi. Compared with DMD and optDMD, the SINDy method greatly improved the estimation performance for this application.

TABLE 3

Parameters of SINDy average reservoir pressure estimation for analytical radial reservoir case

| | |
|---|---|
| Number of regression candidates | 2,001 |
| $t_p$ [hrs] sample range | 0.0~100.0 |
| $\lambda$ sample range | 0.0~100.0 |
| Shut-in length [hrs] | 10.0 |

Example 3—Two Perpendicular No-Flow Boundaries

Figure 22A:
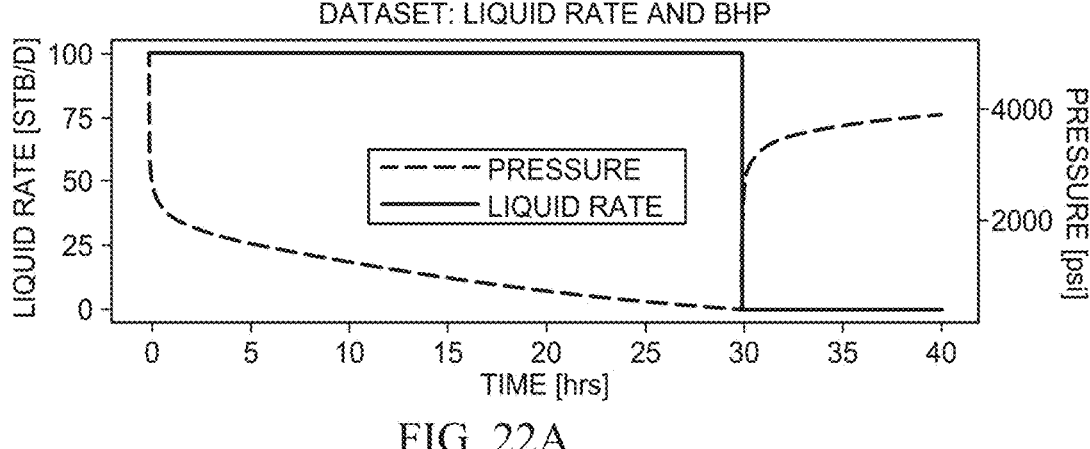
FIGS. 22A and 22B are a set of plots representing pressure buildup data and a reservoir map of another analytical reservoir model.
Figure 22B:
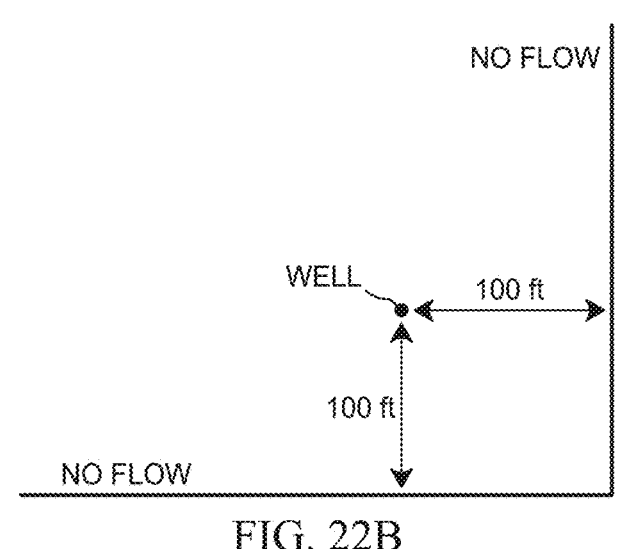

The third example involved applying the SINDy-based average reservoir pressure estimation of FIG. 3 to an analytical reservoir model that has two perpendicular no-flow boundaries. FIGS. 22A and 22B show the pressure buildup data and reservoir map with two perpendicular no-flow boundaries, and Table 4 summarizes the properties of this third example. The pressure buildup behavior was calculated using an analytical model from commercial software. The last 10 hours of shut-in pressure data were used for estimating the average reservoir pressure.

TABLE 4

Properties of reservoir case with two perpendicular faults

| | |
|---|---|
| Porosity | 0.2 |
| Permeability (mD) | 10.0 |
| Viscosity (cp) | 2.0 |
| Formation volume factor (RB/STB) | 1.0 |
| Total compressibility (1/psi) | 5.0E−6 |
| Flowrate (stb/day) | 100.0 |
| Initial reservoir pressure (psi) | 5,000.0 |
| Reservoir height (ft) | 10.0 |
| Wellbore radius (ft) | 0.32 |

Figure 23:
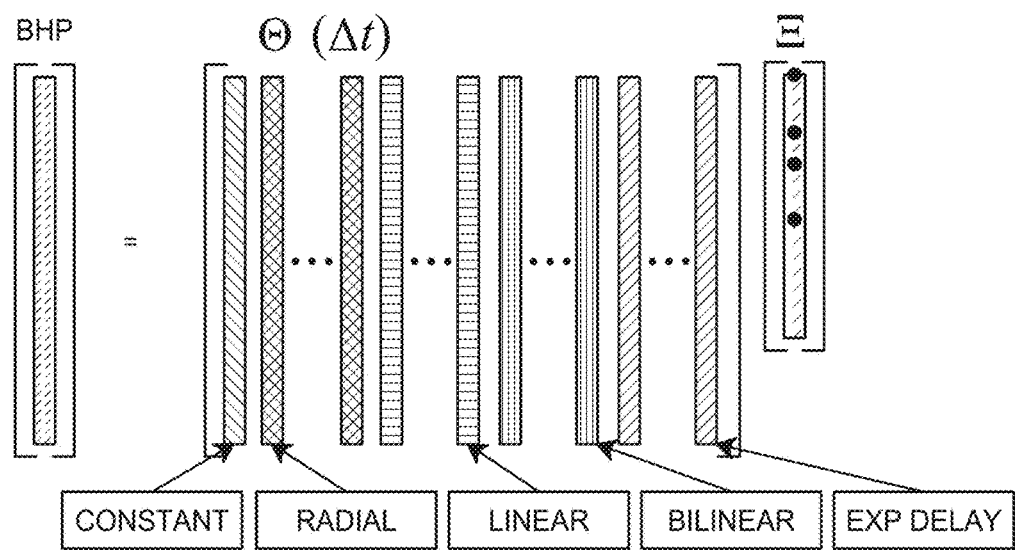
FIG. 23 is a schematic of an example framework of the SINDy formulation of reservoir pressure estimation for the reservoir model of FIGS. 22A and 22B.

FIG. 23 shows the formulation of the SINDy reservoir pressure estimation for this case. In order to account for complex physics, three different analytical relationships were used in this case—namely, radial flow, linear flow, and bilinear flow. For each flow regime, 1,000 candidate functions were generated by sampling different $t_p$ values. As specified in Table 5, there were 4,001 regression candidates sampling $t_p$ and $\lambda$ for this case.

TABLE 5

Parameters of SINDy average reservoir pressure estimation for heterogeneous reservoir case with two perpendicular faults

| | |
|---|---|
| Number of regression candidates | 4,001 |
| $t_p$ [hrs] sample range | 0.0~100.0 |
| $\lambda$ sample range | 0.0~100.0 |
| Shut-in length [hrs] | 10.0 |

Figure 24:
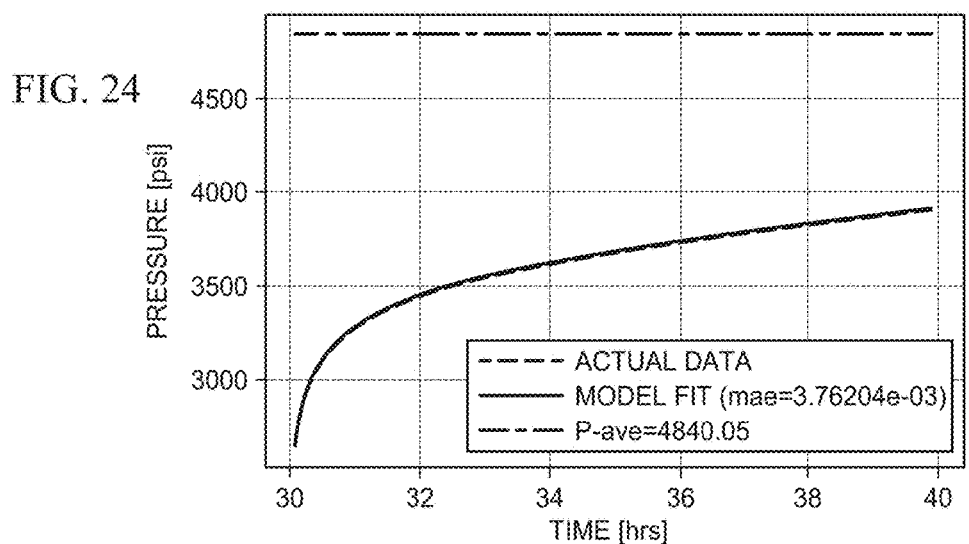
FIG. 24 is a plot of average reservoir pressure estimation results of the SINDy-based method for the reservoir model of FIGS. 22A and 22B.

FIG. 24 shows the estimated reservoir pressure, and Table 6 provides the comparison with other methods. The SINDy method significantly improved average reservoir pressure estimation error (3.2%) compared to these other methods (>10%).

TABLE 6

Comparison of average reservoir pressure estimation results.
True reservoir pressure = 5,000 [psi]

|  | Estimated Pressure [psi] | Error [%] |
| --- | --- | --- |
| Horner | 4,459.00 | 10.82 |
| Kuchuk | 4,262.57 | 14.75 |
| Crump | 4,270.15 | 14.60 |
| SINDy | 4,840.05 | 3.20 |

Example 4—Two Parallel Leaky Faults in a Bounded Reservoir

Figure 25A:
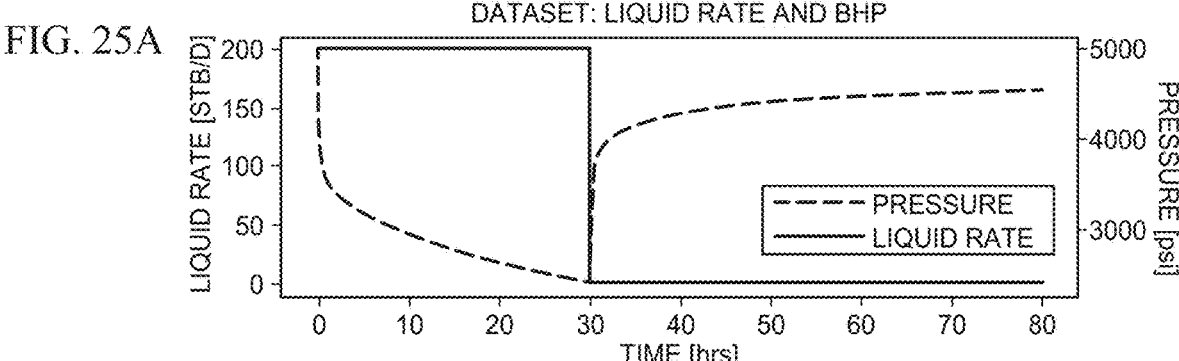
FIGS. 25A and 25B are a set of plots representing a synthetic reservoir model.
Figure 25B:
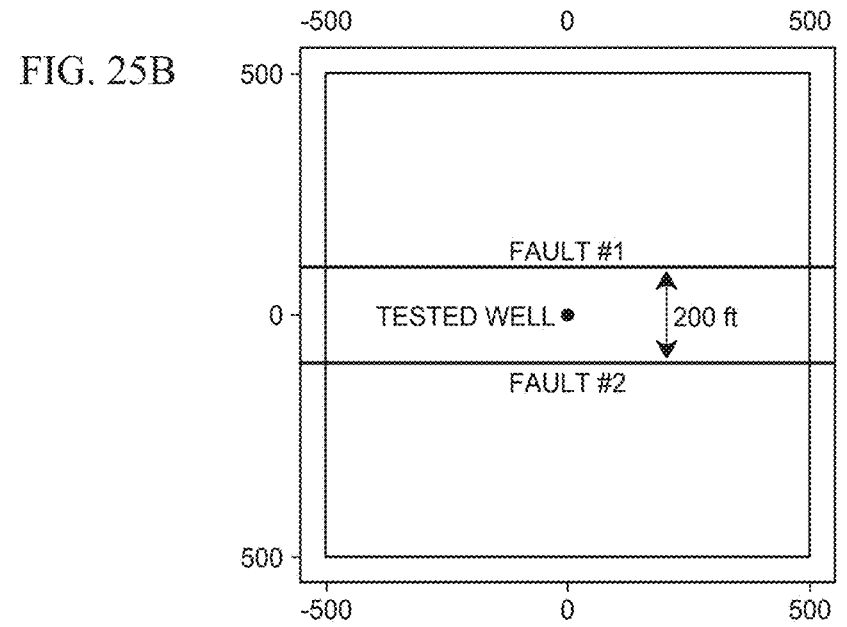

The fourth example involved applying the SINDy-based average reservoir pressure estimation of FIG. 3 to a more complex reservoir case, particularly an analytical reservoir model that has two parallel leaky faults and the well bounded within the two faults. FIGS. 25A and 25B show pressure buildup data and a reservoir map for this case. Traditional reservoir pressure estimation methods may not work well for highly heterogeneous reservoirs such as this. The reservoir properties are provided in Table 7 for this case.

TABLE 7

Properties of heterogeneous reservoir case with two leaky faults

| Porosity | 0.2 |
| --- | --- |
| Permeability (mD) | 20.0 |
| Viscosity (cp) | 2.0 |
| Formation volume factor (RB/STB) | 1.0 |
| Total compressibility (1/psi) | 5.0E−6 |
| Flowrate (stb/day) | 100.0 |
| Initial reservoir pressure (psi) | 5,000.0 |
| Reservoir height (ft) | 10.0 |
| Wellbore radius (ft) | 0.32 |
| Wellbore storage coefficient (bbl/psi) | 1.0E−3 |
| Fault leak coefficient | 0.01 |
| Fault leak coefficient | 0.01 |

The same SINDy formulation from Example 3 was used, as shown in FIG. 23 and Table 5 above. FIG. 26 provides the average reservoir pressure estimation result, and the comparison with other traditional methods is shown in Table 8. For this case again, the SINDy method provided the best estimation performance. The above results demonstrate that the SINDy method provides improved reservoir pressure estimation performance for complex reservoir cases.

TABLE 8

Comparison of average reservoir pressure estimation
results. True reservoir pressure = 4,859.64
[psi] (from material balance calculation)

|  | Estimated Pressure [psi] | Error [%] |
| --- | --- | --- |
| Horner | 4,678.00 | 3.74 |
| Kuchuk | 4,683.32 | 3.63 |
| Crump | 4,631.57 | 4.69 |
| SINDy | 4,784.51 | 1.54 |

Example 5—Offshore Field A (Gulf of Mexico)

The fifth example involved applying the optDMD-based average reservoir pressure estimation of FIG. 2 and the SINDy-based average reservoir pressure estimation of FIG. 3 to a field case (offshore field A in the Gulf of Mexico). FIG. 27 shows the pressure buildup data for this case. The latter half of the well history shows a long shut-in period. Since the truth case is not known here, only the first 10 hours of shut-in pressure data (1000 timesteps) were used to estimate the average reservoir pressure, which was confirmed to provide a close pressure value with the last timestep bottom hole pressure (BHP) data in the well history (8,429.5 psi).

Figure 28B:
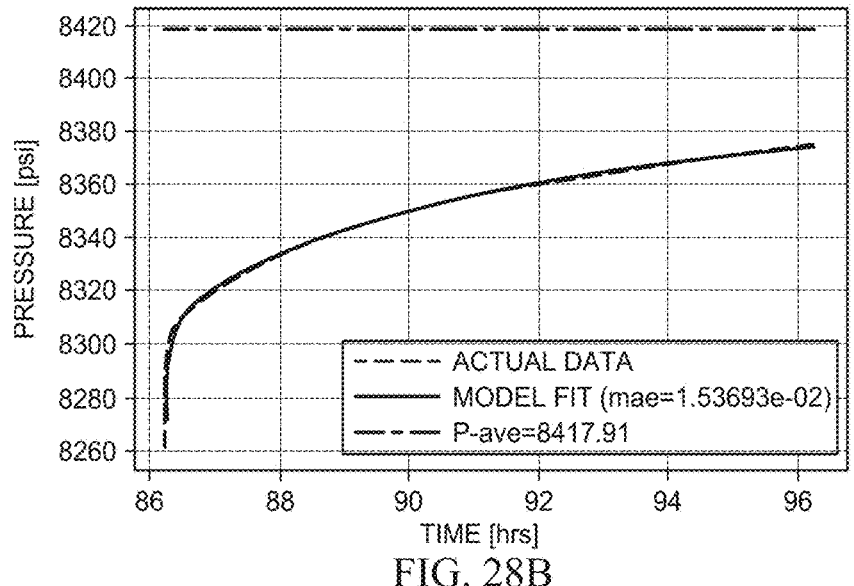

The formulation of the SINDy method was the same as in Example 3, which is shown in FIG. 23 and Table 5 above. FIGS. 28A and 28B show the reservoir pressure estimation result from the optDMD and SINDy methods. The DMD-TDE method with 500 TDEs estimated 8,365.43 psi (Relative error—0.76%, Absolute error—64 psi) and did not provide a reasonable estimation for this case because the pressure buildup data is much more nonlinear than the synthetic cases. The optimized DMD could provide a high constant stable mode and produced a reasonable estimation of 8,390.36 psi (Relative error—0.46%, Absolute error—39 psi). The SINDy method provided the best answer with 8,417.91 psi (Relative error—0.14%, Absolute error—12 psi), much closer to the shut-in BHP at the last timestep (8,429.5 psi).

Pressure Prediction

Pressure prediction may be useful in a variety of applications, including well performance analysis and estimation of productivity index. However, analytical approaches to pressure prediction such as pressure transient analysis (PTA) (i.e., "well testing") cannot make use of collected long-term well measurements under flowing conditions. Even with deconvolution, the PTA cannot handle the complexity of the model in fields with irregular reservoir geometry and/or high nonlinearity. On the other hand, numerical modeling approaches require updated geologic and fluid models and can be cost prohibitive.

The present disclosure provides machine learning systems and methodologies that may use high frequency flowrate and pressure measurements. These methods may utilize projection algorithms, physics-inspired features, time-delay embeddings, and/or dynamic mode decomposition (DMD) to map a nonlinear state problem onto a linear (or weakly nonlinear) space to obtain a robust and predictive reservoir model. A trained machine learning model may be used to generate ideal pressure buildup data by virtual shut-in simulation. As such, the disclosed methods may utilize all available well history and may not require clean shut-in data.

Figure 5:
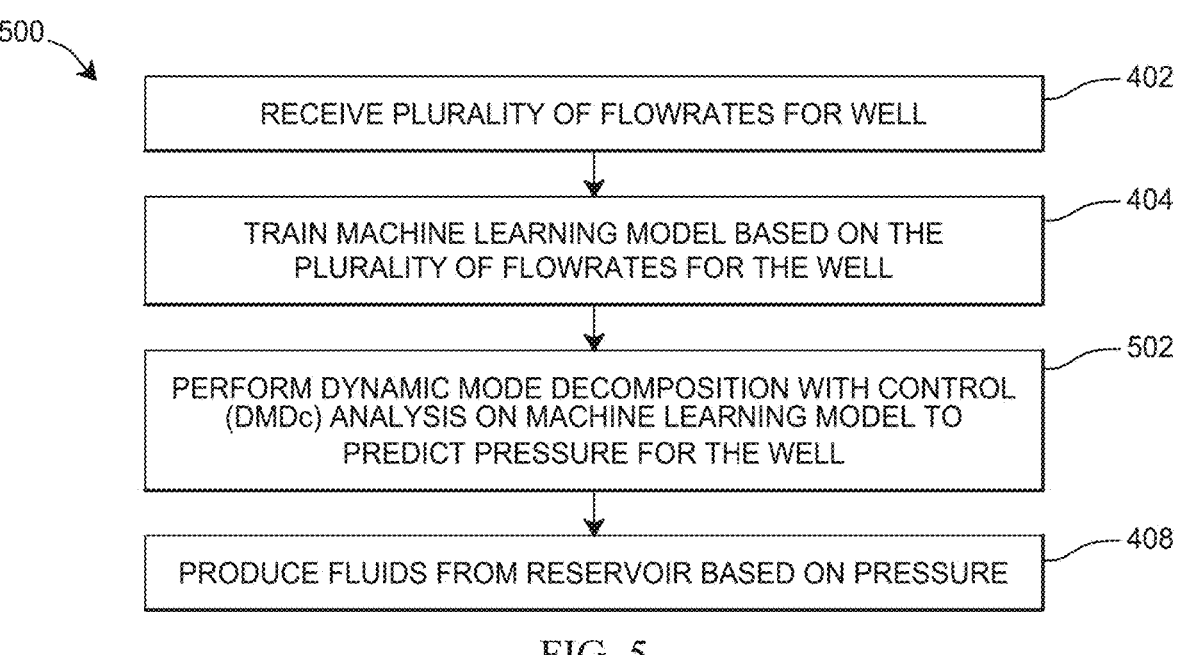
Figure 6:
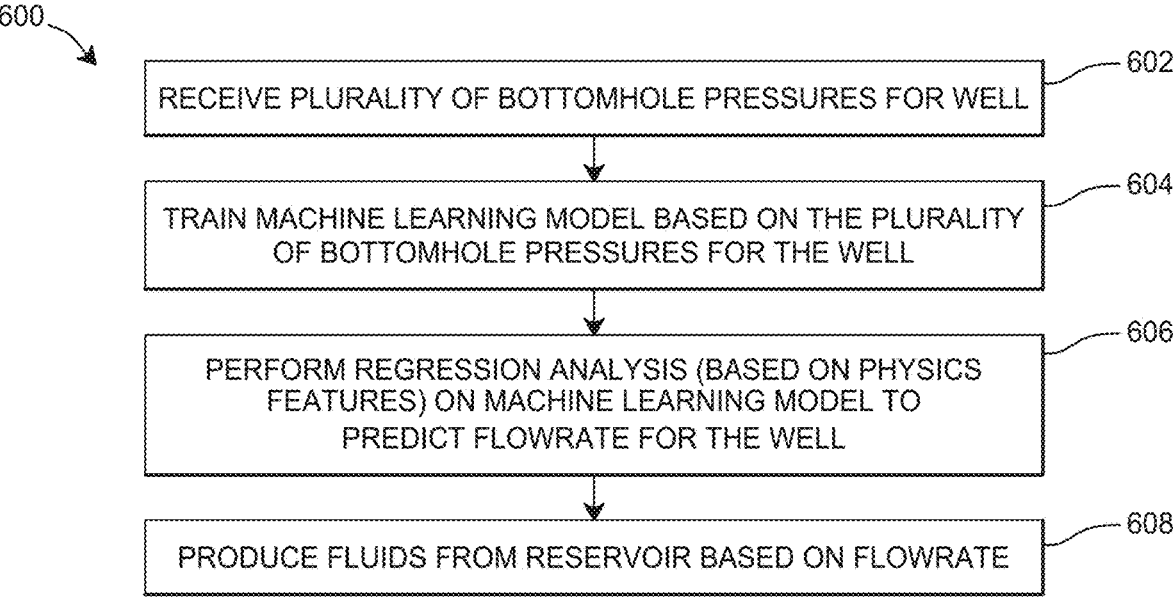
FIG. 6 is a flow chart of an example method to determine a flowrate for a well for a reservoir in a subterranean formation.

FIGS. 4 and 5 depict methods for predicting bottom-hole pressure from flowrate data. FIG. 6 depicts a method for predicting high-frequency flowrate from bottom-hole pressure data.

In each of the methods of FIGS. 4-6, it is assumed that access may be available to flowrate data or pressure data for sufficient duration to build a machine learning model. It is not necessary that the well would be shut-in during this period (as required for pressure transient analysis), and only routine variations in flowrate and pressure data may be available.

In certain embodiments, the machine learning-based reservoir model may be used in two different applications of interpreting high-frequency well data. The first option may be to use flowrate and time as inputs and label pressure measurement as a response variable (FIGS. 4 and 5); and subsequently, predict pressure from flowrate and time information (used for PI calculation). In the second option, flowrate may be predicted based on pressure and time information (FIG. 6) by reversing the model inputs and outputs (e.g., used for virtual metering).

For the pressure prediction case (FIGS. 4 and 5), the mathematical formulation of input (x) and output (y) is given by:

$$x^{(i)} = \begin{bmatrix} q^{(i)} \\ t^{(i)} \end{bmatrix}, \ y^{(i)} = \Delta p^{(i)}, \ i = 1, \dots, n \qquad (38)$$

For the flowrate prediction case (FIG. 6), the input (x) and output (y) data are given by:

$$x^{(i)} = \begin{bmatrix} p^{(i)} \\ t^{(i)} \end{bmatrix}, \ y^{(i)} = \Delta q^{(i)}, \ i = 1, \dots, n \qquad (39)$$

where p is pressure, q is flowrate, t is time, and n is number of timesteps.

An appropriate model $f$ may be determined to describe the relationships between x and y.

$$y^{(i)} = f\!\left(x^{(i)}\right) + \varepsilon^{(i)}, \ i = 1, \dots, n \qquad (40)$$

where $\varepsilon$ represents the irreducible error, which comes from measurement error and noise. Once the regression model is discovered from training data, that model can be used for future prediction.

Turning specifically to FIG. 4, a method 400 is provided for determining bottom-hole pressure in a well for a reservoir in a subterranean formation using a regression analysis based on physics-inspired features ("physics features").

At step 402, the method 400 may include receiving a plurality of flowrates for the well.

At step 404, the method 400 may include training a machine learning model based on the plurality of flowrates for the well (e.g., with Equations 38 and 40). The machine learning model may be trained via any desired type of machine learning algorithm including, but not limited to, artificial neural network, random forest, gradient boosting, support vector machine, or kernel density estimator.

At step 406, the method 400 may include performing a regression analysis on the machine learning model to predict a pressure for the well. At step 406, the regression analysis may be based on physics features.

For example, the model $f$ of Equation 40 may be discovered by using a regression framework, which has the form:

$$f\!\left(x^{(i)}\right) = \theta^{T} x^{(i)}, \ i = 1, \dots, n \qquad (41)$$

where $\theta$ is a vector of regression coefficients. This regression formulation may propose physics features to linearize the relationships between response and predictor variables to achieve robust and predictive models. The regression library for both the pressure prediction case and the flowrate prediction case is given in FIG. 29.

The regression library may include several candidate functions based on physical equations. For example:

$$\sum\nolimits_{j=1}^{i} q^{(j)}$$

represents cumulative production and can account for the effect of pressure deletion.

$$\sum\nolimits_{j=1}^{i} \left[q^{(j)} - q^{(j-1)}\right]\!\left[t^{(i)} - t^{(j-1)}\right]$$

represents wellbore storage and boundary effect.

$$\sum\nolimits_{j=1}^{i} \left[q^{(j)} - q^{(j-1)}\right]\log\!\left[t^{(i)} - t^{(j-1)}\right]$$

describes radial flow regime.

$$\sum\nolimits_{j=1}^{i} \left[q^{(j)} - q^{(j-1)}\right]\sqrt{t^{(i)} - t^{(j-1)}}$$

is based on the linear flow regime.

$$\sum\nolimits_{j=1}^{i} \left[q^{(j)} - q^{(j-1)}\right]\sqrt[4]{t^{(i)} - t^{(j-1)}}$$

represents bilinear flow.

$$\sum\nolimits_{j=1}^{i} \left[q^{(j)} - q^{(j-1)}\right]/\sqrt{t^{(i)} - t^{(j-1)}}$$

describes spherical flow regime.

The last three equations are smoothing functions to improve the regression accuracy. In certain embodiments, the regression algorithms may use one or more equations from the regression library. In some embodiments, the regression algorithms may pick up only the equations from the library necessary to recover the reservoir behavior properly.

As such, the physics features on which the regression is based may include, but are not limited to a wellbore storage and boundary effect; a radial flow regime; a linear flow regime; a bilinear flow; a spherical flow regime, and any combination thereof.

For example, in certain embodiments, the following types of regression algorithms may be used: linear regression, ridge regression, and lasso regression. In certain embodiments, the linear regression may utilize the least square method to obtain the global minimum based on the residual sum of squares.

$$J(\theta) = \sum_{i=0}^{n} \left[\theta^{T} x^{(i)} - y^{(i)}\right]^{2} \qquad (42)$$

In some embodiments, the ridge regression adds the $L_2$ norm regularization term in the objective function to avoid overfitting the model.

$$J(\theta) = \sum_{i=0}^{n} \left[\theta^{T} x^{(i)} - y^{(i)}\right]^{2} + \lambda \sum_{j=0}^{p} \theta_{j}^{2} \qquad (43)$$

where p is the number of coefficients, and $\lambda$ is the weight to decide the magnitude of regularization term.

In some embodiments, the lasso regression may include the $L_1$ norm regularization term in the objective function to avoid overfitting and select only dominant candidates and make others zero.

$$J(\theta) = \sum_{i=0}^{n} [\theta^T x^{(i)} - y^{(i)}]^2 + \lambda \sum_{j=0}^{p} |\theta_j| \tag{44}$$

The regression library may include several physical features, and the lasso regression may be used to identify the correct physics or dominant physics from the regression library by leveraging $L_1$ norm regularization.

In some embodiments, performing a regression analysis on the machine learning model to predict a pressure for the well may include performing a time-delay embeddings (TDE) analysis. Time-delay embeddings (TDE) may aim to reconstruct the dynamics of an unknown dynamical system from time series measurement, as introduced in FIG. 8. Given N timesteps of pressure buildup data, the snapshot data matrix may be built by stacking the time series vector m times with time offset. However, considering m past measurements, the relationships between pressure and flowrate may become linear or weakly nonlinear, such that the reconstruction is easier to perform. This methodology may be combined into the regression framework with physics features of step 406. Though rate superposition achieves a similar effect, TDE may improve model accuracy. Using the regression library shown in FIG. 29 and performing time-delay embeddings for each candidate function in the library so that the machine learning model can account for m past measurements, the regression accuracy may be improved.

At step 408, the method 400 may include producing fluids from the reservoir based, at least in part, on the predicted pressure for the well. For example, in some embodiments, the method 400 may include adjusting an amount of fluids being produced from certain portions of one or more wells based, at least in part, on the predicted pressure for the well. In some embodiments, the method 400 may include ceasing production of fluids to perform remedial actions on one or more wells based, at least in part, on the predicted pressure for the well.

FIG. 5 depicts a method 500 for determining bottom-hole pressure in a well for a reservoir in a subterranean formation using a dynamic mode decomposition with control (DMDc) analysis. The method 500 may include the steps 402, 404, and 408 described above with reference to FIG. 4.

At step 502, the method 500 may include performing a dynamic mode decomposition with control (DMDc) analysis on the machine learning model to predict a pressure for the well.

The DMDc is an extended version of DMD to incorporate the effect of external control on the state system. In actuated systems, DMD may be incapable of producing an input-output model. However, an input-output model may be needed for the bottom-hole pressure and flowrate interpretation described above. The DMDc method may discover the underlying dynamics by accounting for the effect of external control, and it quantifies its effect on the state of the system.

At step 502, the DMDc may be performed as follows. In DMDc formulation, the future state X' relies on information from the current state X and the current control input $\Upsilon$.

$$X' = AX + B\Upsilon \text{ where,} \tag{45}$$

-continued $$\Upsilon = \begin{bmatrix} | & | & | & | \\ u(t_1) & u(t_2) & \dots & u(t_m) \\ | & | & | & | \end{bmatrix} \tag{46}$$

X and X' have the same form as Eq. (5) and Eq. (6). For the pressure prediction case (FIG. 4) $\Upsilon^*$ includes the flowrate measurement, and for the flowrate prediction case (FIG. 6) $\Upsilon^*$ includes the pressure measurement. Eq. (45) can be written in matrix form as follows.

$$X' = [A \quad B]\begin{bmatrix} X \\ \Upsilon \end{bmatrix} = G\Omega \tag{47}$$

where $\Omega$ contains both state and control input information.

The singular value decomposition (SVD) of $\Omega$ can be written as:

$$\Omega \approx \tilde{U}\tilde{\Sigma}\tilde{V}^* = \begin{bmatrix} \tilde{U}_1 \\ \tilde{U}_2 \end{bmatrix}\tilde{\Sigma}\tilde{V}^* \tag{48}$$

where $\tilde{U}_1 \in \mathbb{R}^{n \times p}$ and $\tilde{U}_2 \in \mathbb{R}^{l \times p}$. The reduced-order truncation may be used to remedy the computational cost. Unlike DMD, the truncated left singular vectors $\tilde{U}$ that define the input space cannot be used to define the subspace on which the state evolves. Instead, a reduced-order subspace of the output subspace may be used. Therefore, the truncated singular value decomposition of X' with reduced order of r may be determined.

$$X' \approx \hat{E}\hat{\Sigma}\hat{V}^* \tag{49}$$

where $\hat{U} \in \mathbb{R}^{n \times r}$, $\hat{\Sigma} \in \mathbb{R}^{r \times r}$ and $\hat{V}^* \in \mathbb{R}^{r \times m-1}$.

The reduced order approximation of A and B can be computed as follows.

$$\tilde{A} = \hat{U}^* X' \hat{V}\hat{\Sigma}^{-1} \tilde{U}_1^* \hat{U} \tag{50}$$

$$\tilde{B} = \hat{U}^* X' \hat{V}\hat{\Sigma}^{-1} \tilde{U}_2^* \tag{51}$$

The dynamic modes of A can be computed by using eigenvalue decomposition $\tilde{A}W = W\Lambda$. Finally, the dynamic modes are given by:

$$\phi = X' \hat{V}\Sigma^{-1}\tilde{U}_1^* \hat{U}W \tag{52}$$

DMDc with time-delay embeddings (TDE) of the physics-inspired features as control inputs may be used for flowrate and pressure interpretation.

To demonstrate the prediction of bottom-hole pressure discussed above, various proposed machine learning reservoir models for pressure prediction from high-frequency flowrate measurements were validated for different synthetic and field cases in the following Examples 6-9.

Example 6—IARF Reservoir

Figure 30:
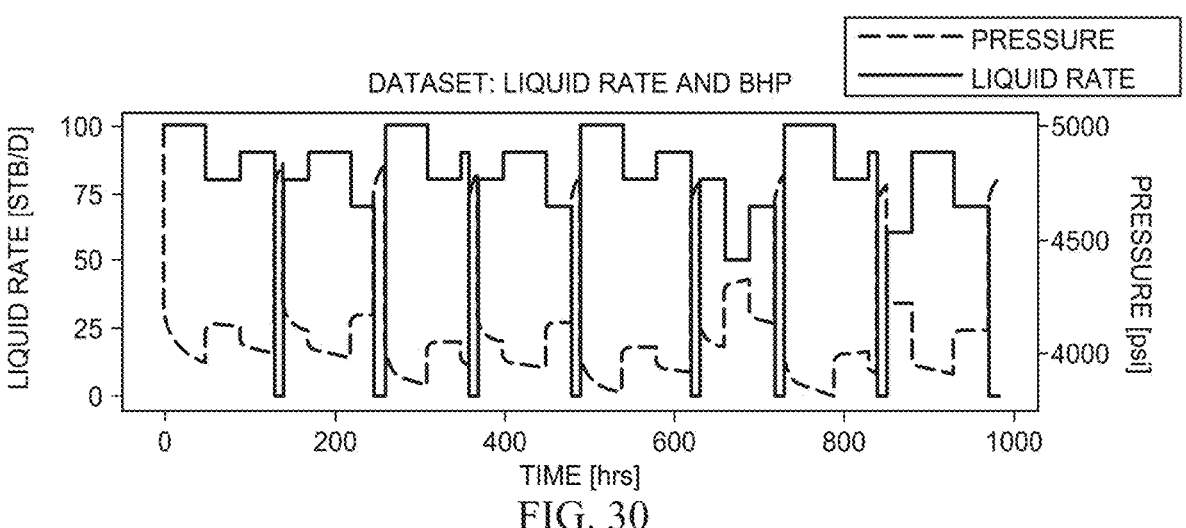
FIG. 30 is a plot representing a synthetic reservoir model and reservoir model training scheme.

In this example, several machine learning methods were tested for a simple analytical reservoir case generated from commercial software. This reservoir has infinite acting radial flow (IARF) without the effect of wellbore storage and skin. FIG. 30 shows the high-frequency liquid production rate and BHP measurement, and Table 9 provides the reservoir properties.

TABLE 9

| Properties of Synthetic reservoir model for validation of the various machine learning models | |
| --- | --- |
| Porosity | 0.2 |
| Permeability (mD) | 20.0 |
| Reservoir height (ft) | 10.0 |
| Total compressibility (psi$^{-1}$) | $5.0 \times 10^{-6}$ |
| Wellbore radius (ft) | 0.32 |
| Viscosity (cp) | 2.0 |
| Initial reservoir pressure (psi) | 5,000.0 |
| Formation volume factor (RB/STB) | 1.0 |

A machine learning reservoir model was built to predict pressure from a high-frequency flowrate measurement. The machine learning reservoir model used a moving window horizon of 5 days for the training and validation dataset, and the training was repeated every two days. 80% of the 5-day window data was used for model training, and the remaining 20% of the data was used for prediction to validate the machine learning model.

The following machine learning methods were tested to estimate BHP from flowrate and improve the regression accuracy:

Method 1—Linear regression with flowrate (using only flowrate for input data)

Method 2a—Linear regression with physics-inspired features

Method 2b—Ridge regression with physics-inspired features

Method 2c—Lasso regression with physics-inspired features

Method 3a—Linear regression with 600 TDEs of flowrate

Method 3b—Ridge regression with 100 TDEs of physics-inspired features

Method 4a—DMDc with flowrate

Method 4b—DMDc with physics-inspired features

Methods 2a-2c, 3a, and 3b are embodiments of the method 400 of FIG. 4.

Methods 4a and 4b are embodiments of the method 500 of FIG. 5.

Figures 31A, 31B:
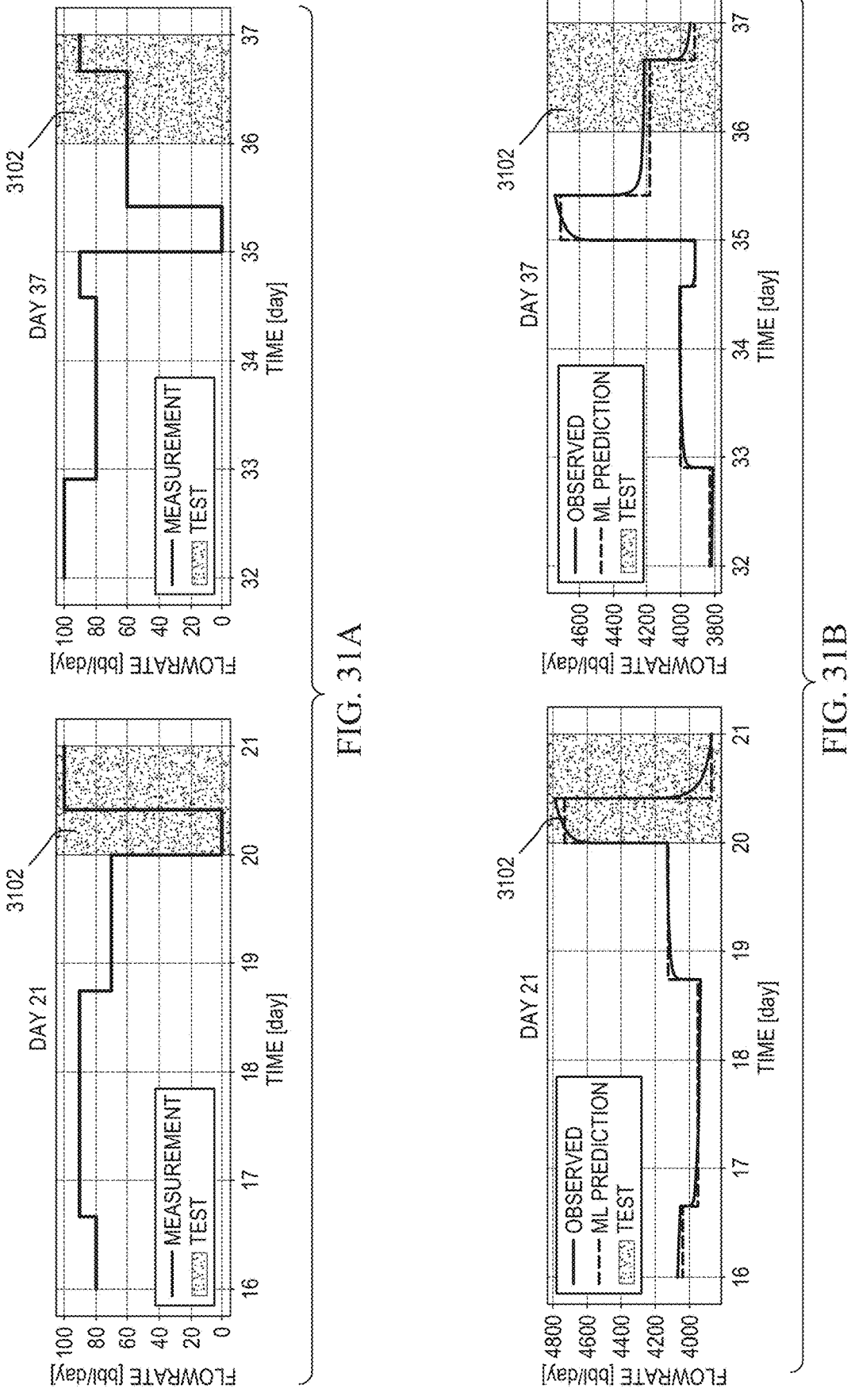
FIGS. 31A-31E are a series of plots of pressure prediction results of various machine learning methods for the reservoir model of FIG. 30.
Figures 31C, 31D, 31E:
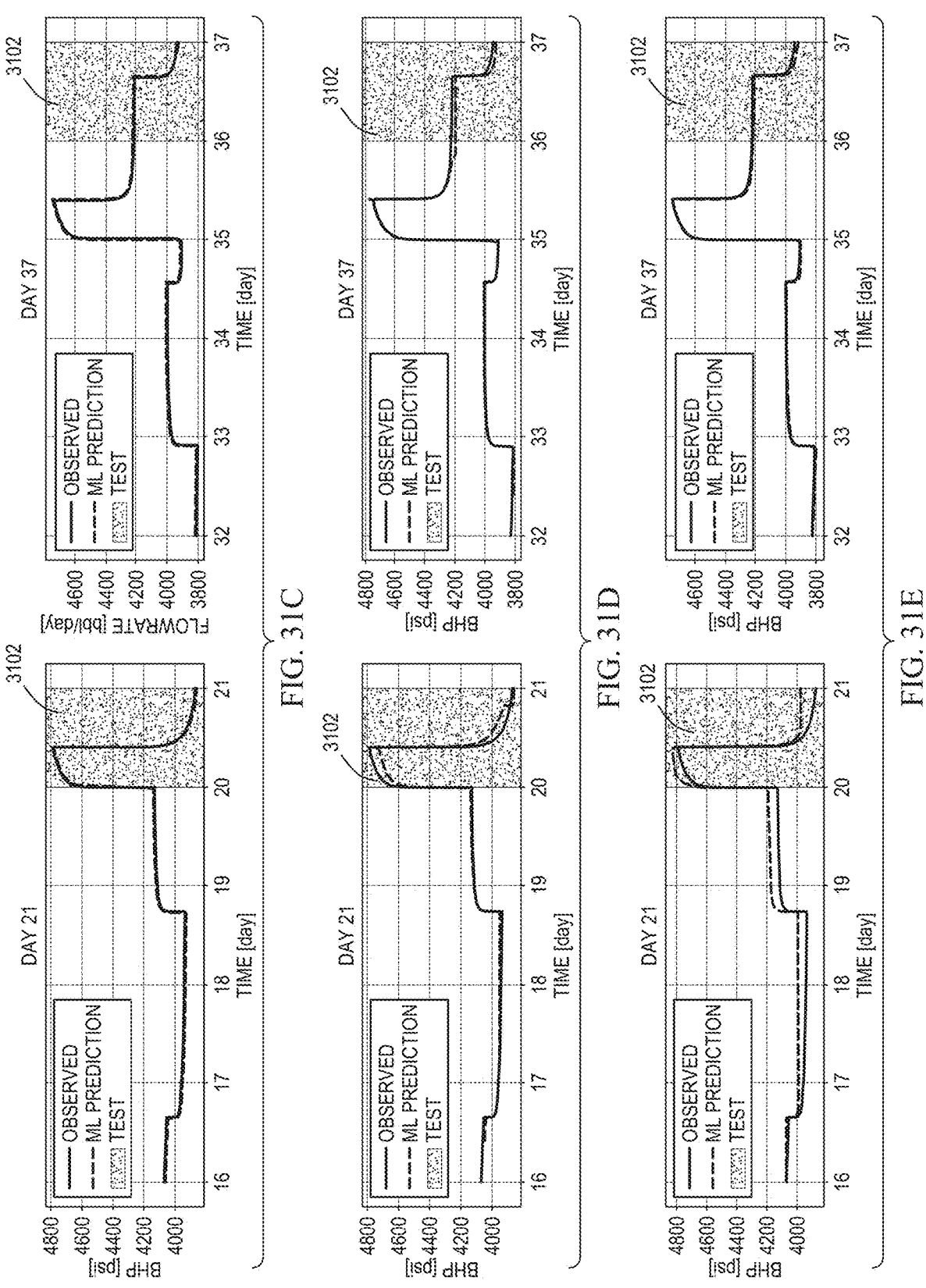
Figures 32A, 32B, 32C, 32D, 32E, 32F, 32G, 32H:
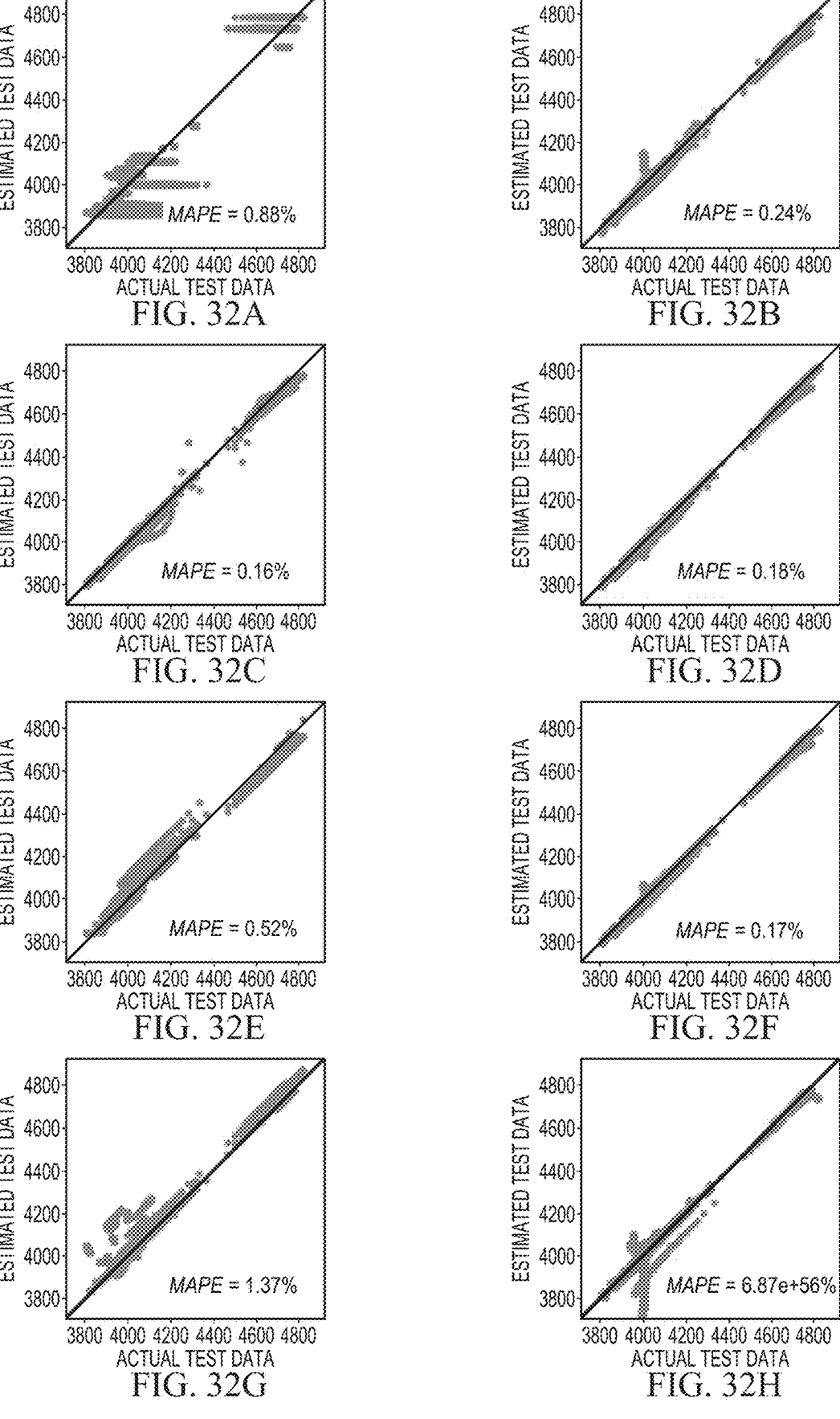
FIGS. 32A-32H are a series of plots comparing results of different machine learning algorithms for the reservoir model of FIG. 30.

FIG. 31A shows the flowrate measurement used for input data and FIGS. 31B-31E show the prediction results for the representative machine learning methods. The solid line in FIGS. 31B-31E represents the actual pressure measurement, and the dashed line is the model estimation. The sectioned window 3102 represents the blind test data. The training and blind prediction results are shown for two arbitrary 5-day time periods (starting on Day 21 and Day 37). FIG. 31B shows the prediction result from Method 1. Since Method 1 used linear regression with only flowrate for input data, it could not capture the curvatures (due to diffusion) of the pressure data. FIG. 31C shows the prediction result from Method 2a, which significantly improved the regression accuracy by including physics features. Ridge regression and lasso regression, though slightly more accurate, did not provide different results visually. FIG. 31D shows the prediction result from Method 3a. Although Method 3a still resulted in some prediction error, the regression accuracy was significantly improved compared to Method 1. FIG. 31E shows the prediction result from Method 4a. Again, the overall prediction accuracy was improved compared to Method 1.

FIGS. 32A-32H show the prediction performance of additional machine learning models using cross-plots of actual and estimated data along with their mean absolute percentage error (MAPE).

In summary, the proposed machine learning algorithms that project the regression problems into linear or weakly nonlinear space may improve the prediction accuracy. Using flowrate alone for linear regression was not sufficient in this example. Linear regression (Model 2a), ridge regression (Model 2b), and lasso regression (Model 2c) with physics features provided similar results—however, Model 2c provided a more efficient model. Linear regression with flowrate and 600 TDEs (Model 3a) resulted in substantially improved accuracy compared to Model 1. Additionally, adding ridge regularization and using physics features with fewer TDEs not only improved accuracy but also reduced overfitting. DMDc with flowrate (Model 4a) showed improvement over Model 1 but did not perform as well with physics features (Model 4b) due to overfitting.

Example 7—Closed Boundary Reservoir with Wellbore Storage and Skin

Figures 33A, 33B, 34A, 34B:
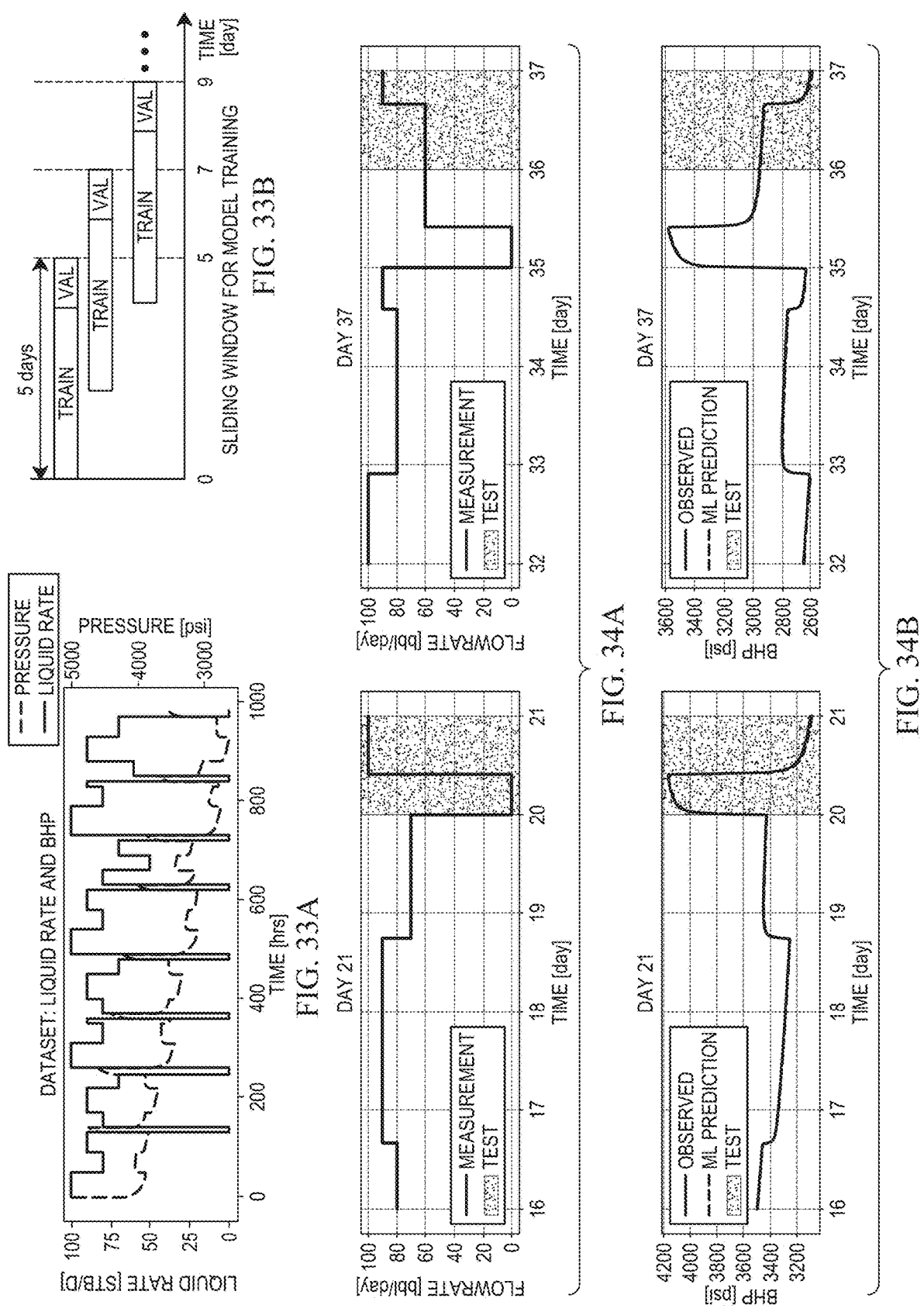
FIGS. 33A and 33B are a set of plots representing a synthetic reservoir model and reservoir model training scheme.
FIGS. 34A and 34B are a set of plots of pressure prediction results of various machine learning methods for the reservoir model of FIGS. 33A and 33B.
Figures 35A, 35B, 35C, 35D, 35E, 35F, 35G, 35H:
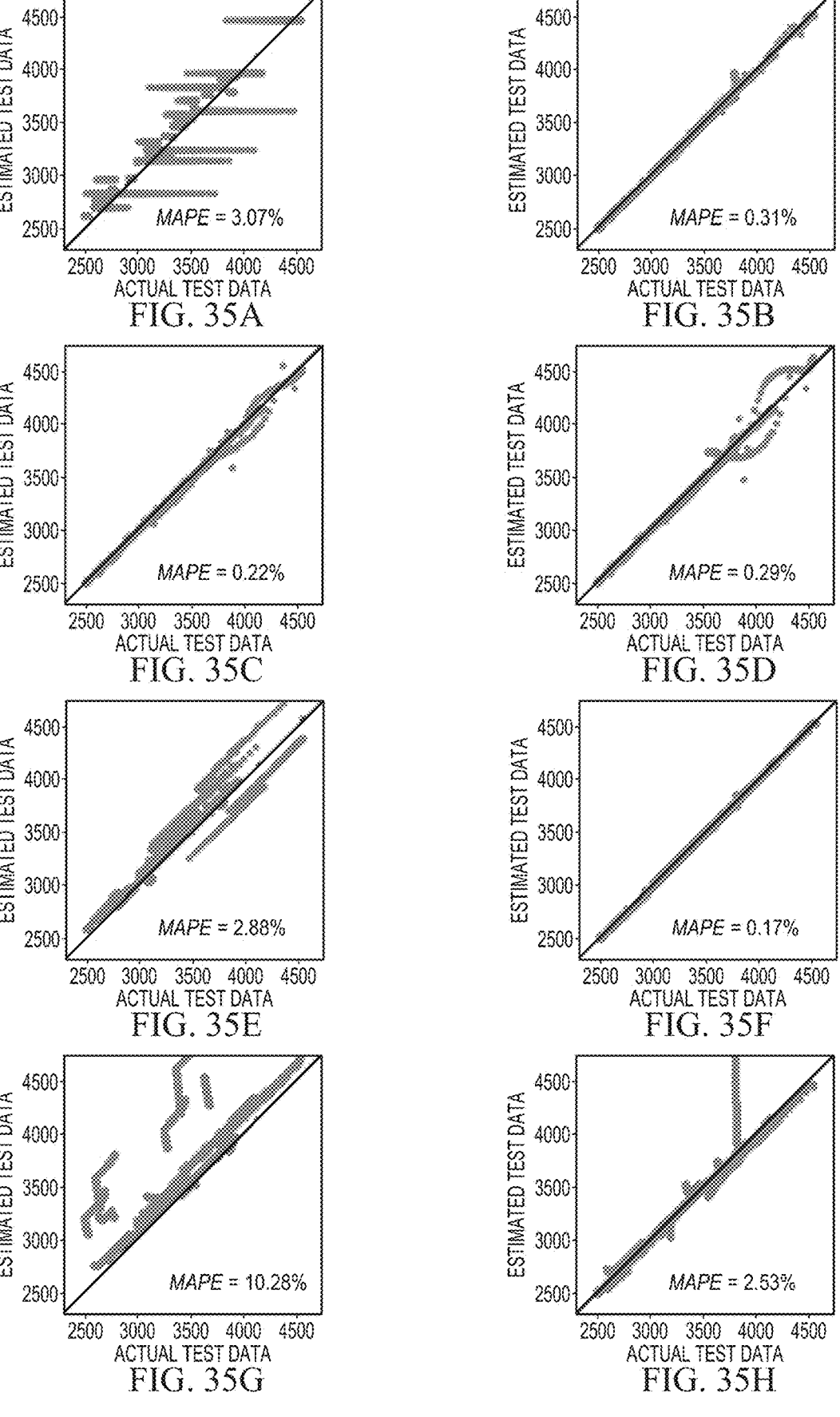
FIGS. 35A-35H are a series of plots comparing results of different machine learning algorithms for the reservoir model of FIGS. 33A and 33B.

In the next example, a closed boundary reservoir with wellbore storage and skin was used to generate synthetic data from a commercial simulator (FIG. 33A). The machine learning training scheme is shown in FIG. 33B. The reservoir properties of the analytical model are shown in Table 10. The same machine learning methods from Example 6 were used for testing purposes.

TABLE 10

| Properties of synthetic closed reservoir model for validation of the proposed machine learning | |
| --- | --- |
| Porosity | 0.2 |
| Permeability (mD) | 20.0 |
| Reservoir height (ft) | 10.0 |
| Total compressibility (psi$^{-1}$) | $5.0 \times 10^{-6}$ |
| Wellbore radius (ft) | 0.32 |
| Viscosity (cp) | 2.0 |
| Initial reservoir pressure (psi) | 5000.0 |
| Formation volume factor (RB/STB) | 1.0 |
| Reservoir radius (ft) | 600 |
| Wellbore storage coefficient (bbl/psi) | 0.001 |
| Skin factor | 1.0 |

FIG. 34A shows the flowrate measurement used for input data and FIG. 34B shows the prediction results for the machine learning method of Model 3b (from Example 6). FIGS. 35A-35H show the prediction performance of additional machine learning models using cross-plots of actual and estimated data along with their mean absolute percentage error (MAPE). The results are similar to Example 6, where machine learning models with physics features (Models 2a, 2b, and 2c) and TDEs (Models 3a and 3b) perform quite well.

Example 8—Offshore Field A (Gulf of Mexico)

Next, an offshore field case (Field A) from an heterogenous reservoir (FIG. 36) was considered. In this case, high frequency pressure and multiphase flowrate data was collected for almost 170 hours. The same machine learning methods from Examples 6 and 7 were used for testing purposes.

Figures 36, 37A, 37B:
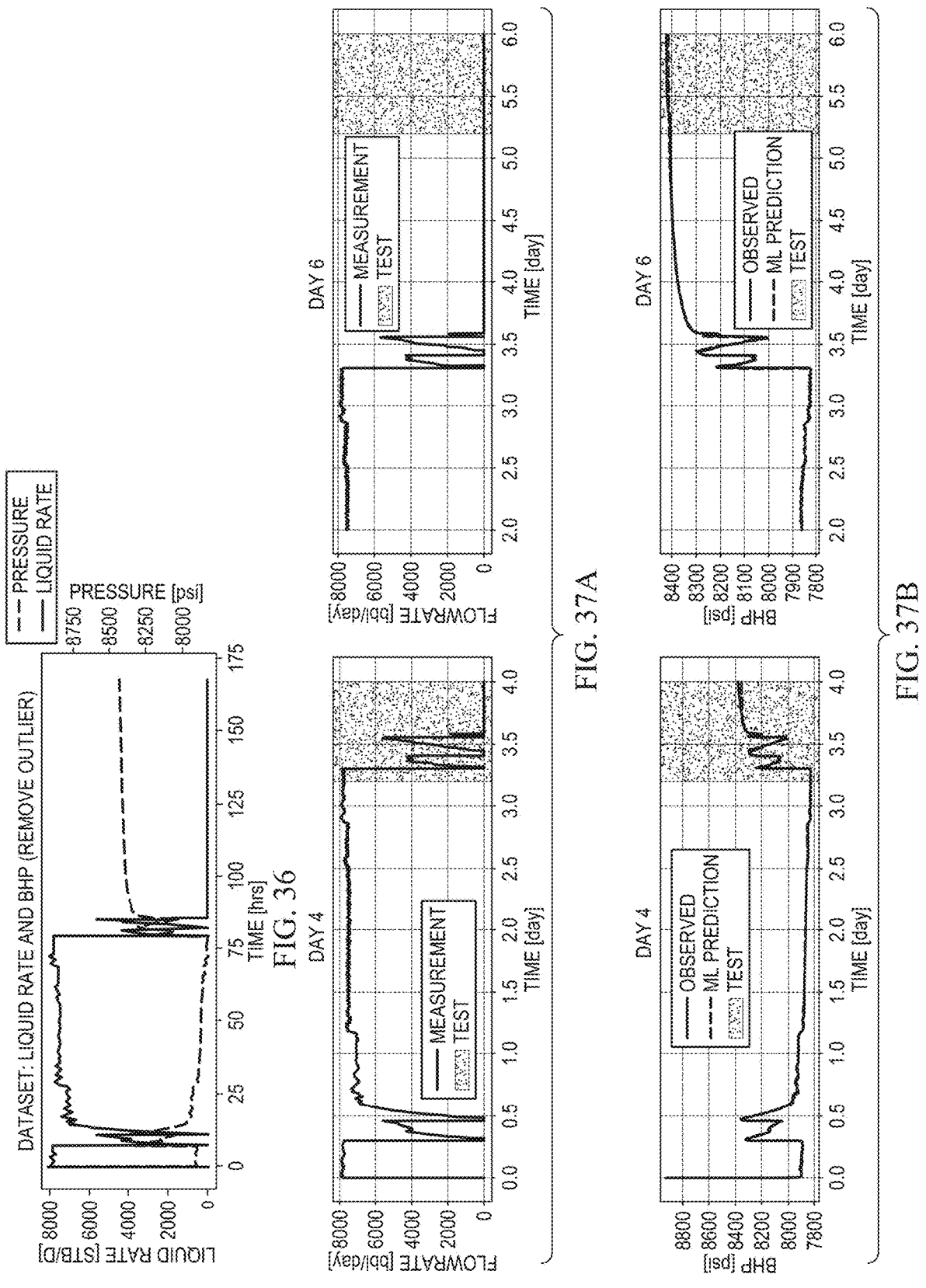
FIG. 36 is a plot representing an offshore field reservoir model and reservoir model training scheme.
FIGS. 37A and 37B are a set of plots of pressure prediction results of various machine learning methods for the reservoir model of FIG. 36.
Figures 38A, 38B, 38C, 38D, 38E, 38F, 38G, 38H:
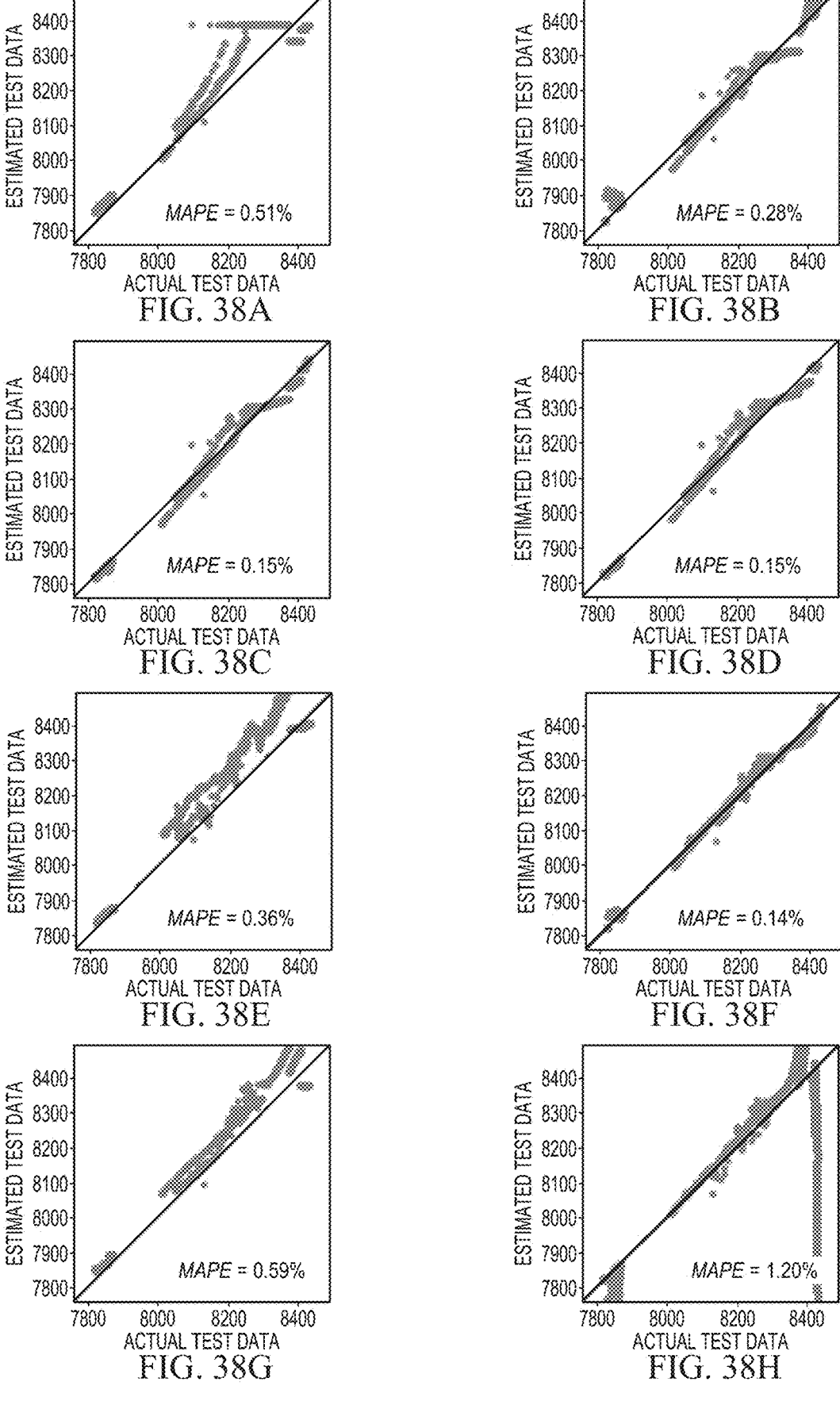
FIGS. 38A-38H are a series of plots comparing results of different machine learning algorithms for the reservoir model of FIG. 36.

FIG. 37A shows the flowrate measurement used for input data and FIG. 37B shows the prediction results for the machine learning method of Model 3b (from Example 6). FIGS. 38A-38H show the prediction performance of additional machine learning models using cross-plots of actual and estimated data along with their mean absolute percentage error (MAPE). The results are similar to those of Examples 6 and 7, in that the machine learning models with physics features (Model 2a, 2b, and 2c) and TDEs (Model 3a and 3b) perform quite well.

Example 9—Offshore Field B (Gulf of Mexico)

Figures 39, 40A, 40B:
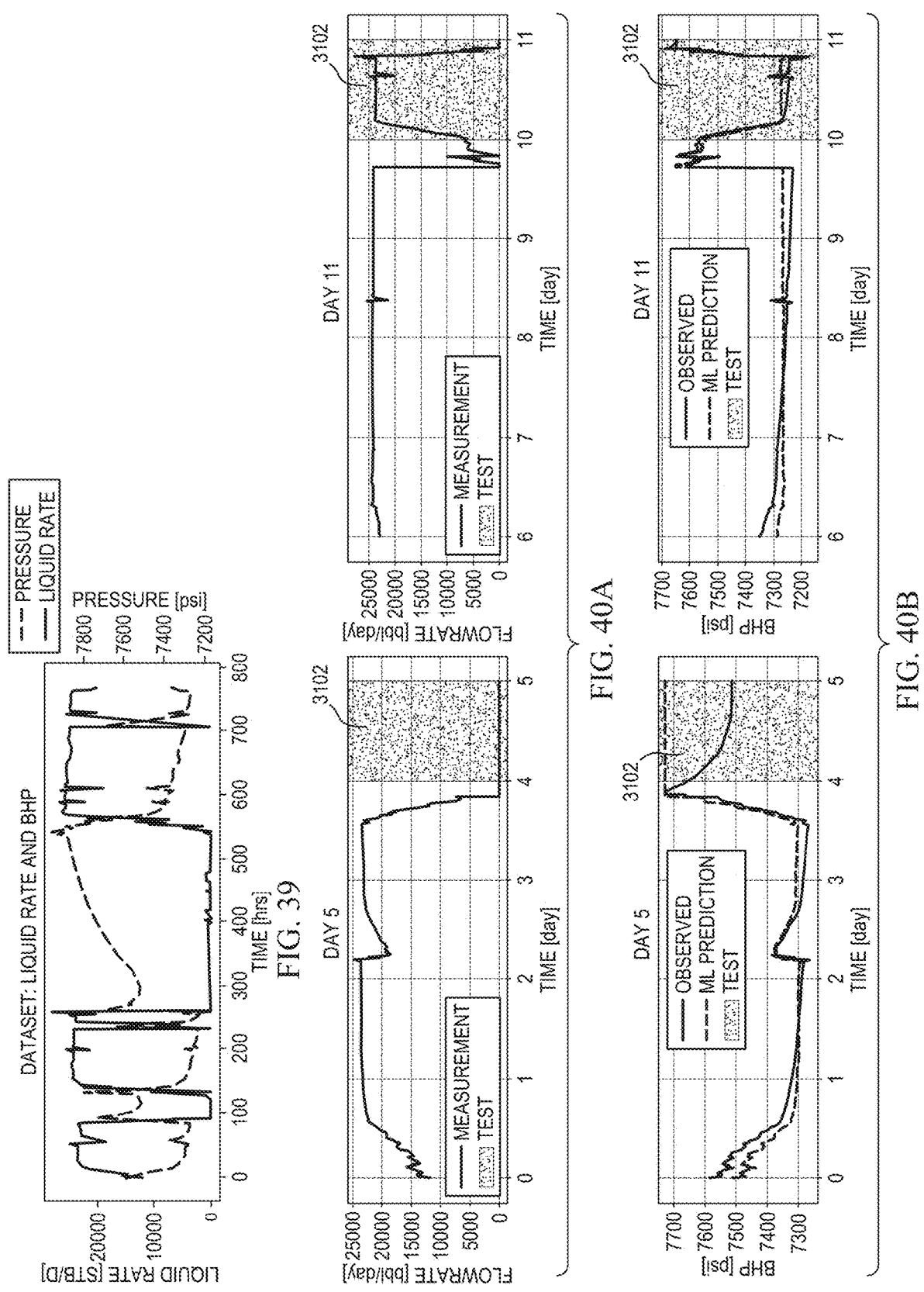
FIG. 39 is a plot representing an offshore field reservoir model and reservoir model training scheme.
FIGS. 40A-40E are a set of plots of pressure prediction results of various machine learning methods for the reservoir model of FIG. 39.
Figures 40C, 40D, 40E:
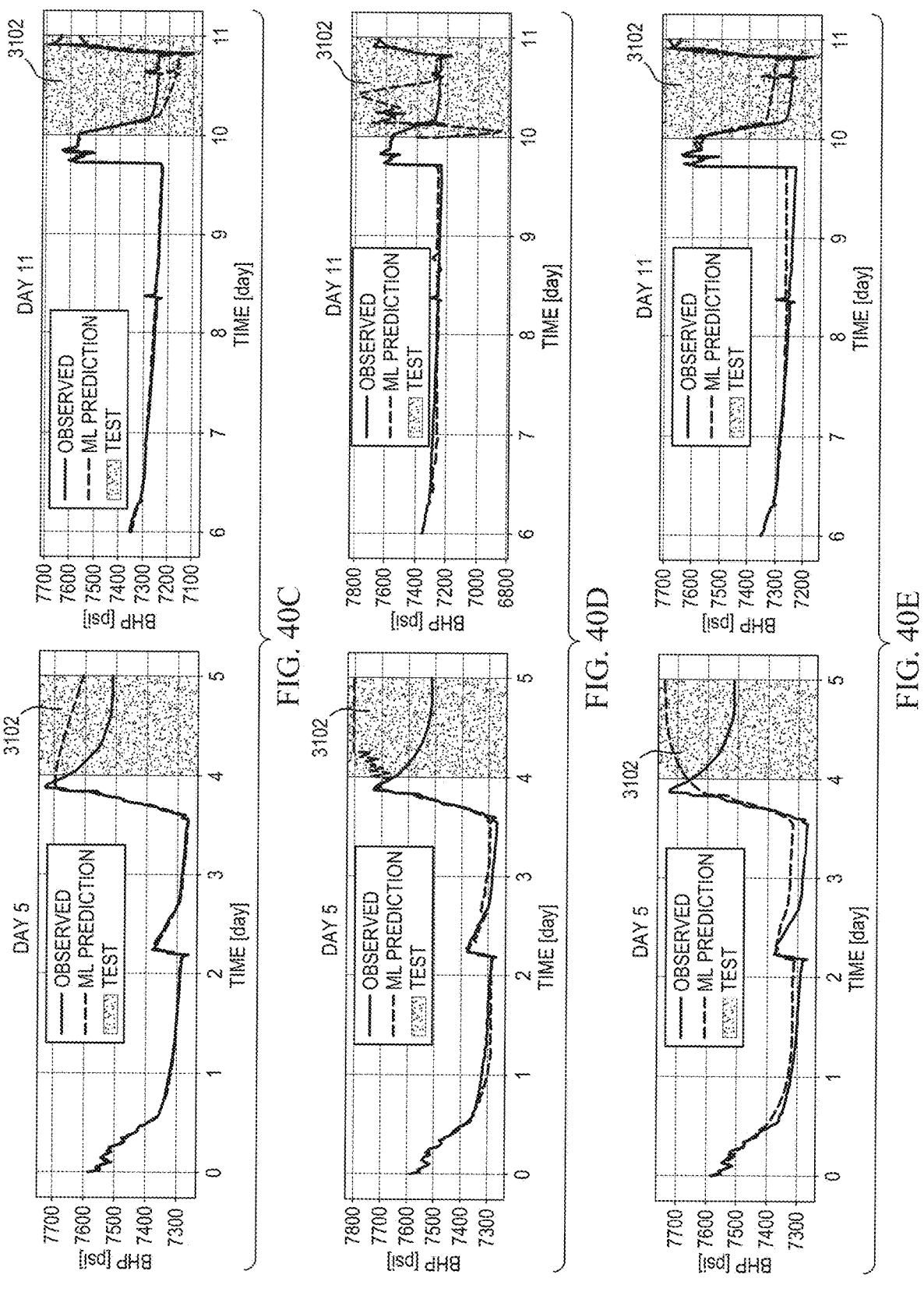
Figures 41A, 41B, 41C, 41D, 41E, 41F:
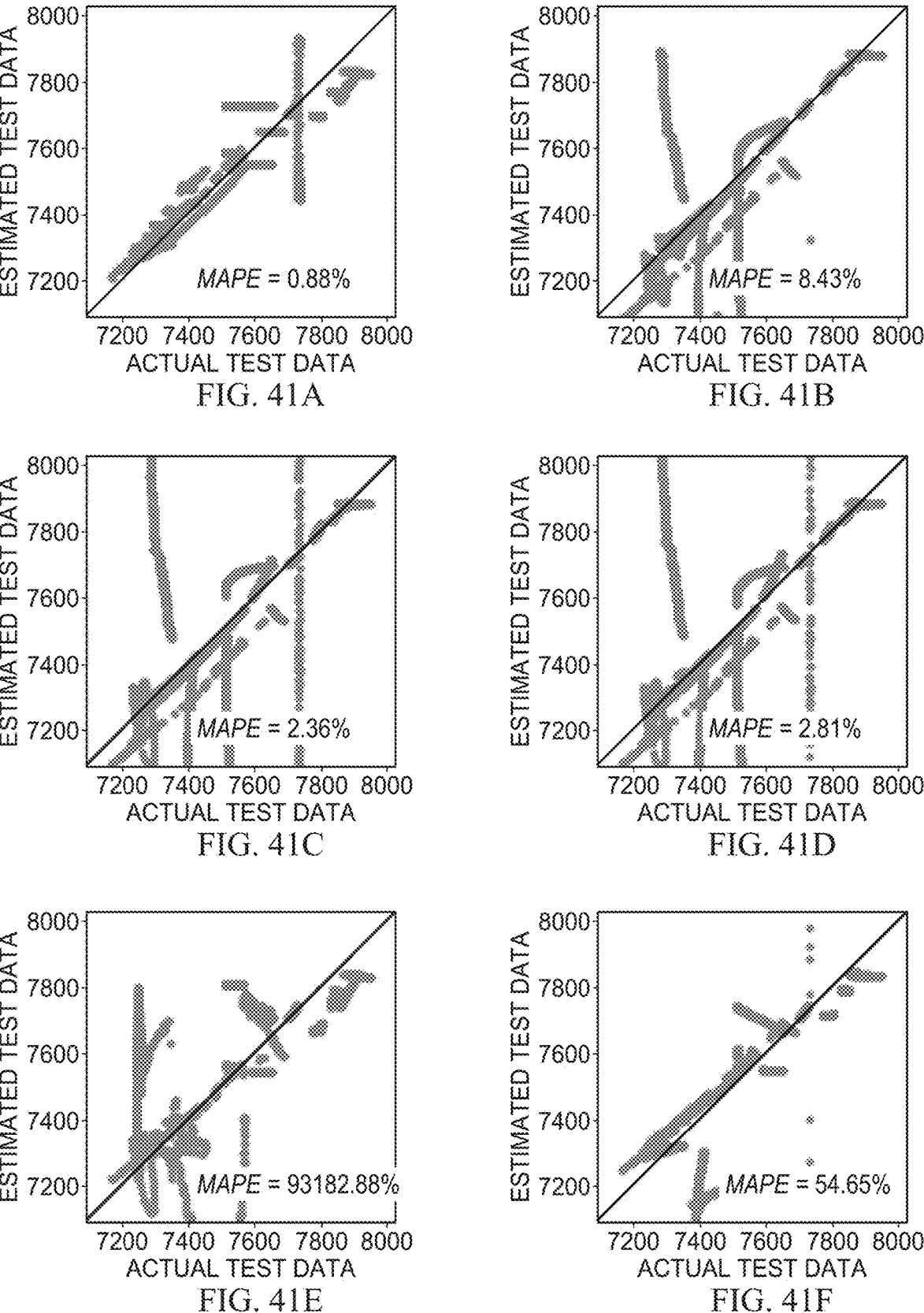
FIGS. 41A-41F are a series of plots comparing results of different machine learning algorithms for the reservoir model of FIG. 39.

Next, another offshore field case (Field B) from a complex reservoir was considered. In this case, high frequency pressure and liquid production rate data was collected for 1 month (FIG. 39). The pressure response shows some unexpected or anomalous behavior during the shut-in period. It was likely attributable to wellbore effects or other extraneous factors that are not representative of subsurface behavior. In such cases, it is expected that pressure prediction becomes challenging in the presence of measurement noise.

FIGS. 40A-40E show the flowrate measurement used for input data and the prediction results for representative machine learning methods. The solid line represents the actual pressure measurement, and the dashed line is the model estimation. The sectioned window 3102 represents the blind test data. The training and blind prediction results are shown for two arbitrary 5-day time periods (starting on Day 5 and Day 11). The prediction result of Day 5 didn't show reasonable agreement with the actual data because of anomalous pressure behavior during the shut-in, although most of machine learning predictions provided reasonable performance for Day 11.

FIGS. 41A-41F show the prediction performance of the various machine learning models. For this complex well history case, it was found that the simplest method (Method 1) produced the best prediction performance. Adding more features or utilizing more complex regression algorithms like DMDc caused overfitting and worsened the prediction performance. This indicates that, in certain embodiments, it may be desirable to use simple machine learning algorithms for complex field cases if some unrealistic or unexpected pressure and flowrate data are detected. In such cases, eliminating unreasonable or non-physical data periods using data validation or preprocessing algorithms may be desired. Estimation of Productivity Index In either of the methods 400 or 500 of FIG. 4 or 5 above, it may be desirable to use the predicted bottom-hole pressure for the well to determine a productivity index (PI) of the well. Well performance may be characterized by calculation of the PI to normalize surface operational effects and understand the true subsurface behavior. In several reservoirs, PI may change with time, and any degradation may lead to significant deferment or loss in hydrocarbon production. Therefore, detecting PI decline and arresting this decline early in time may be desirable for effective reservoir management.

For liquid systems, when both the reservoir and flowing BHP are above saturation pressure (i.e., undersaturated), the PI may be defined as a simple linear equation.

$$q_l = PI * (p_{avg} - p_{wf}) \tag{53}$$

If the reservoir is undersaturated, but the flowing bottom-hole pressure drops below saturation pressure (i.e., creates saturated conditions in the near-wellbore region), the following expression may be used:

$$q_l = PI * (p_{avg} - p_{sat}) + \left(\frac{PI * p_{sat}}{1.8}\right) * \left[1 - 0.2\frac{p_{wf}}{p_{sat}} - 0.8\left(\frac{p_{wf}}{p_{sat}}\right)^2\right] \tag{54}$$

Finally, when the reservoir is fully saturated (average reservoir pressure has depleted below saturation pressure), the PI may be represented as follows.

$$q_l = \left(\frac{PI * p_{avg}}{1.8}\right) * \left[1 - 0.2\frac{p_{wf}}{p_{avg}} - 0.8\left(\frac{p_{wf}}{p_{avg}}\right)^2\right] \tag{55}$$

For gas systems, a suitable inflow performance relationship (IPR) equation may be used such as C and n model with pressure, pressure squared, or pseudo-pressure.

$$q_g = C * [m(p_{avg}) - m(p_{wf})]^n \tag{56}$$

In the above equations, estimation of PI (or C and n) may be used to define well performance that can be used for nodal analysis and production optimization scenarios. Predictions Based on High Frequency Flowrate Data When high frequency flowrate is available, one well performance analysis workflow may be used for simultaneously estimating PI and average reservoir pressure as follows: first, a machine learning reservoir model may be developed to predict pressure from flowrate data. Then, a virtual shut-in simulation may be implemented by assigning zero flowrate into the trained machine learning model to generate the pressure buildup data virtually. Finally, the reservoir properties (including PI) may be estimated based on the virtual shut-in data. Average reservoir pressure may be estimated using the SINDy or optDMD method (described in the preceding sections), and PI may be computed by Eq. (57).

$$PI = \frac{q}{p_{avg} - p_{wf}} \tag{57}$$

The proposed reservoir surveillance workflow is illustrated in FIG. 42.

The overall reservoir surveillance workflow was validated for different synthetic and field cases in the following Examples 10 and 11. For the machine learning reservoir model, physics features were used for the regression library in the following examples based on its prediction performance in the case studies above.

Example 10—Closed Boundary, Circular Reservoir with Time-Varying Skin (Changing PI)

Figure 43A:
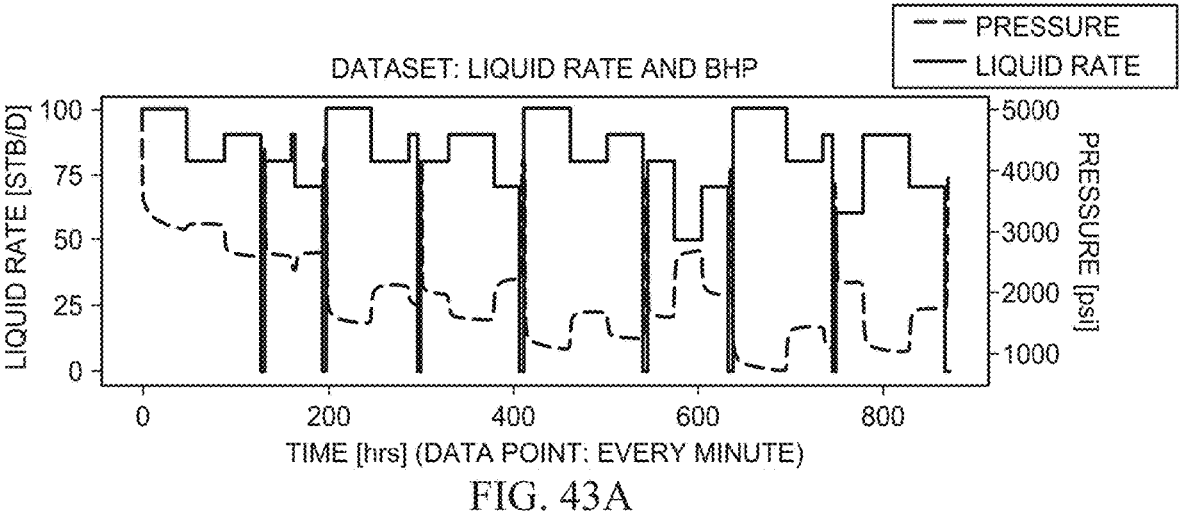
FIGS. 43A-43B are a set of plots representing a synthetic reservoir model and reservoir model training scheme.
Figure 43B:
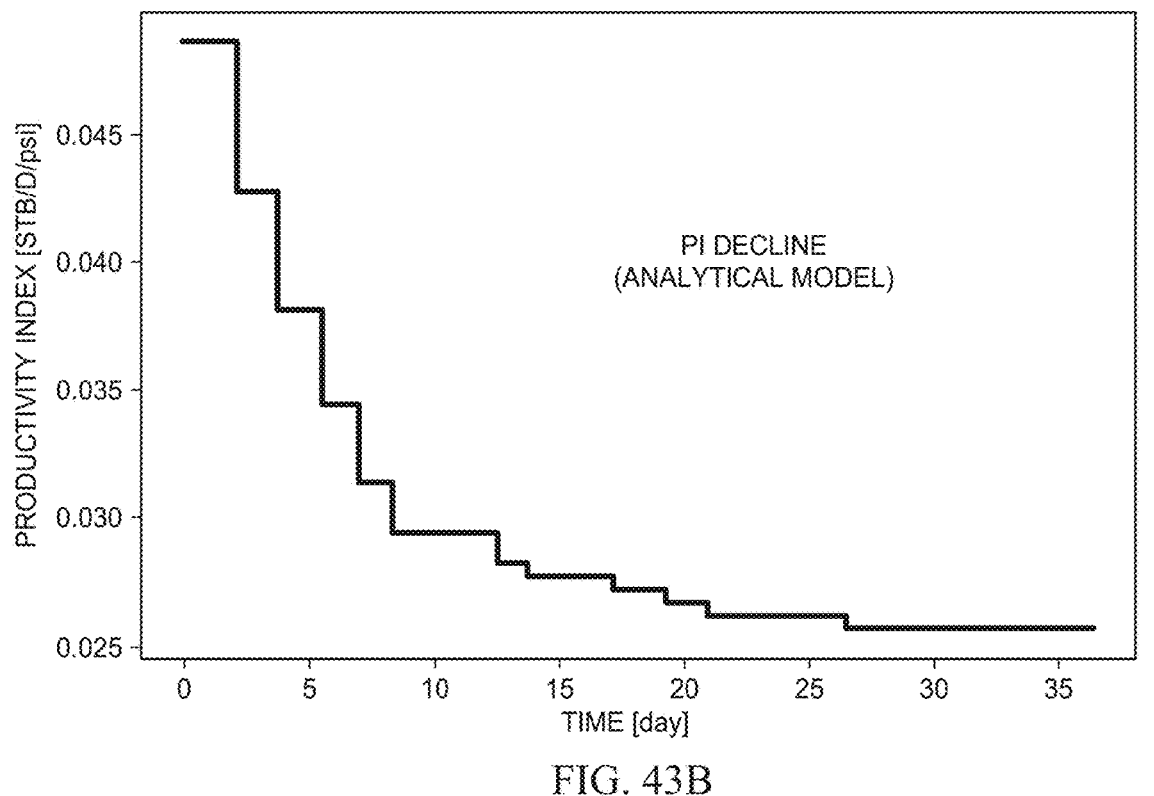

In Example 10, a synthetic application of PI and average reservoir pressure tracking was presented using data generated from a commercial simulator. FIG. 43A shows the high-frequency liquid production rate and pressure measurement, and Table 11 shows the reservoir properties. The well is bounded by a circular reservoir with finite volume and a closed boundary. A time-varying skin factor was assigned, which changes PI with time as shown in FIG. 43B.

TABLE 11

Properties of synthetic reservoir model for validation
of the well performance analysis workflow

| | |
|---|---|
| Porosity | 0.2 |
| Permeability (mD) | 20.0 |
| Reservoir height (ft) | 10.0 |
| Total compressibility (psi$^{-1}$) | $5.0 \times 10^{-6}$ |
| Wellbore radius (ft) | 0.32 |
| Viscosity (cp) | 2.0 |
| Initial reservoir pressure (psi) | 5,000.0 |
| Formation volume factor (RB/STB) | 1.0 |
| Cylindrical reservoir radius (ft) | 1,000.0 |
| Wellbore storage coefficient (STB/psi) | 0.001 |

Figures 44A, 44B:
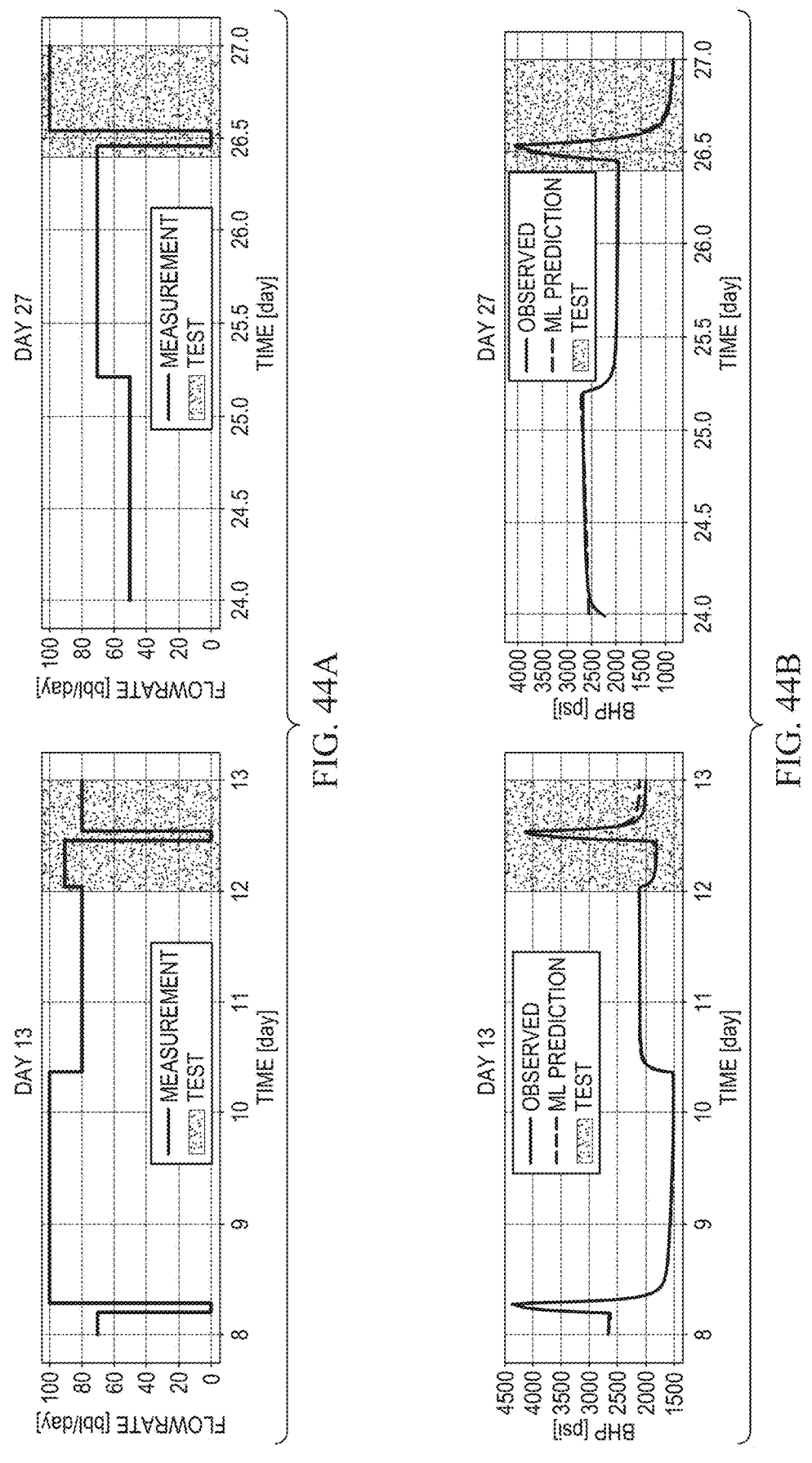
FIGS. 44A and 44B are a set of plots of pressure prediction results for the reservoir model of FIGS. 43A-43B.

A machine learning reservoir model was developed to predict pressure measurement from production flowrate measurement. Then, the trained model was used to simulate virtual shut-in and estimate both the PI and average reservoir pressure. The machine learning model used 3 days as a moving horizon window size for training and validation and repeated training every 2 days. The moving horizon window size was expanded backward if the data did not have enough information (i.e., data variance was smaller than a threshold value). Thus, PI and average reservoir pressure results were obtained every 2 days. Linear regression was used for the machine learning model, and physics features (from FIG. 29) were included in the regression library. FIGS. 44A and 44B show the pressure prediction results of two selected timeframes (day 13 and 27). The machine learning reservoir model provided training and testing (prediction) performance for each timeframe.

Figure 45:
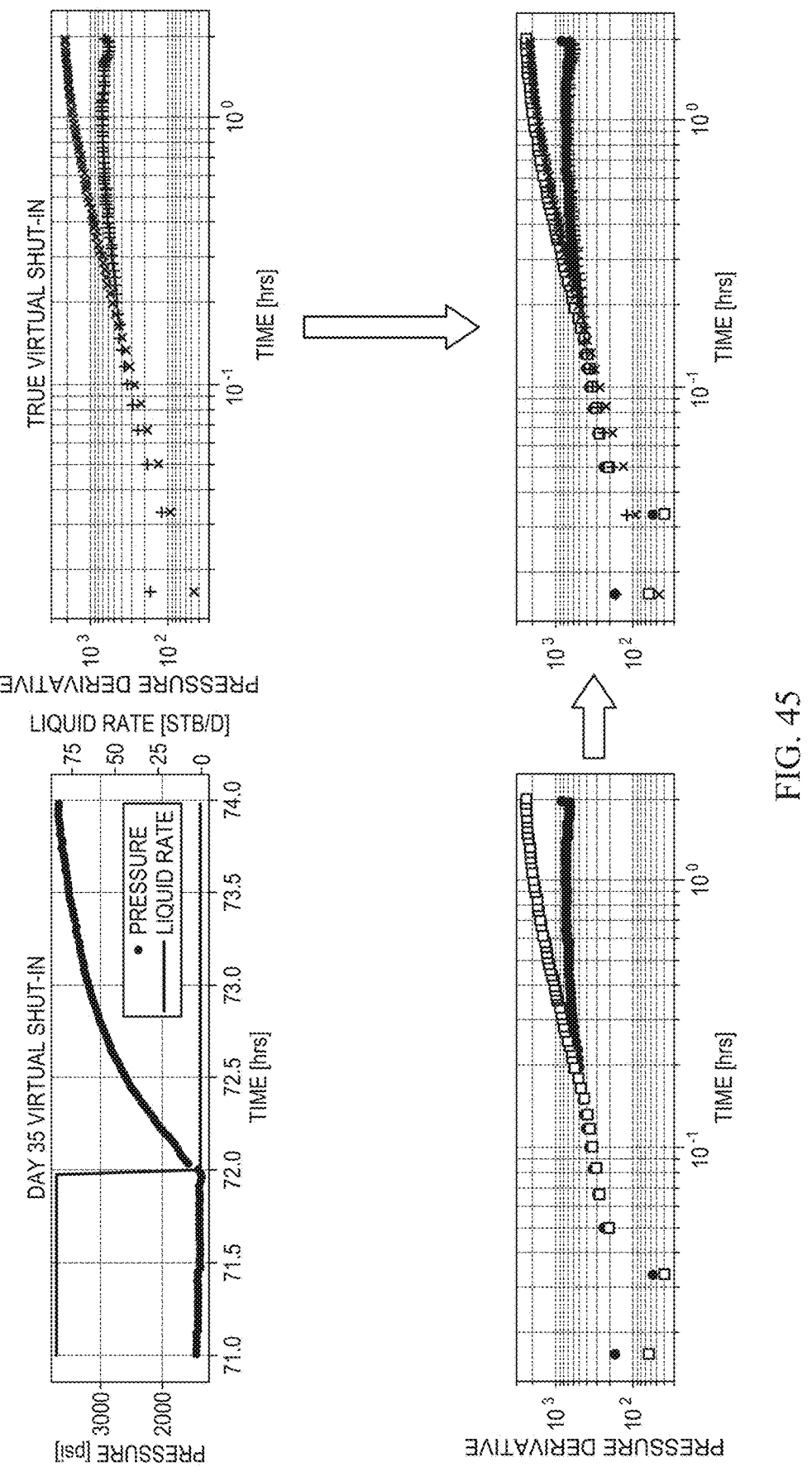
FIG. 45 is a flowchart depicting a virtual shut-in simulation for the reservoir model of FIGS. 43A-43B.

The virtual shut-in results of a selected timeframe (day 35) are shown in FIG. 45. The pressure derivative of the model result was compared with the actual shut-in data in the well history. The log-log plot (lower right in FIG. 45) shows that the two pressure derivative plots are almost identical, and the trained model provided an accurate virtual shut-in simulation. In other words, the machine learning reservoir model was not only able to match the absolute pressure but also is physically interpretable through traditional pressure transient analysis or flow regime analysis.

For the average reservoir pressure calculation, two different calculation methods were compared. The first method used the SINDy method discussed above. The second method assumed that the average reservoir pressure was given by virtual shut-in BHP after 2-hour buildup (FIG. 46), which is termed a pseudo calculation. These two methods were compared to illustrate the robustness of the machine learning method. Note that the buildup duration will need to be adjusted based on the expected hydraulic diffusivity of the reservoir. However, long prediction periods will introduce additional model error.

After estimating the average reservoir pressure, the PI was estimated using Eq. (57). FIGS. 47A and 47B show the tracking results of average reservoir pressure and PI. As shown, the two calculations correctly captured the trend of pressure decline for average reservoir pressure. Also, the SINDy method provided better estimation performance. Similarly, for PI tracking, the two methods accurately captured the trend of true PI decline, with the SINDy method providing closer estimation.

Example 11—Offshore Field A (Gulf of Mexico)

For this example, the high-frequency liquid production rate and BHP measurement of the field case shown in FIG.

48 was used. The machine learning model used a 4-day moving horizon window length for training and validation datasets, and the training was repeated every day. For the regression algorithm, a Lasso regression was used to avoid overfitting, and physics features (from FIG. 29) were used as candidate functions.

Figures 48, 49A, 49B:
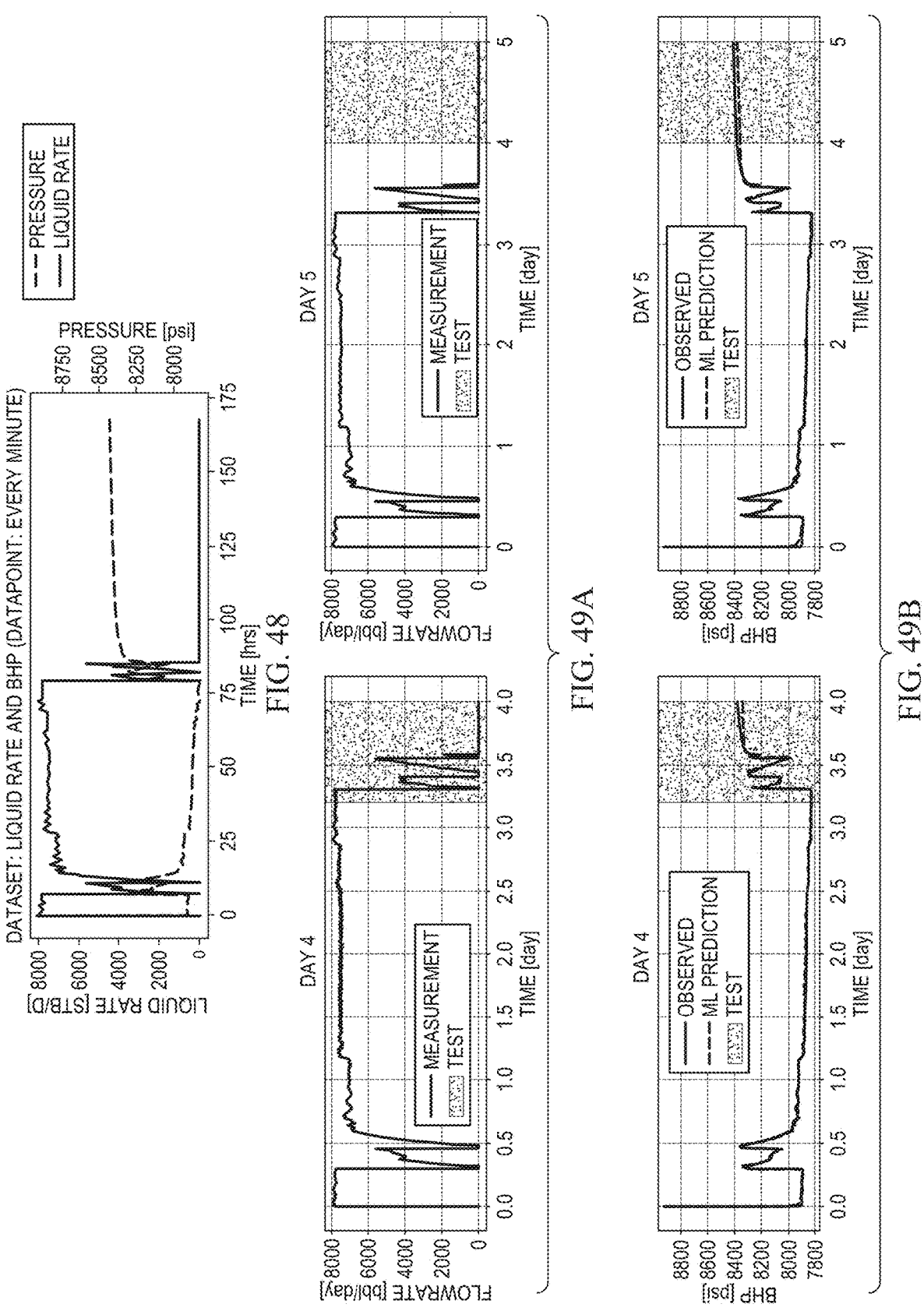
FIG. 48 is a plot representing an offshore field reservoir model and reservoir model training scheme.
FIGS. 49A and 49B are a set of plots of pressure prediction results for the reservoir model of FIG. 48.
Figures 51A, 51B, 52:
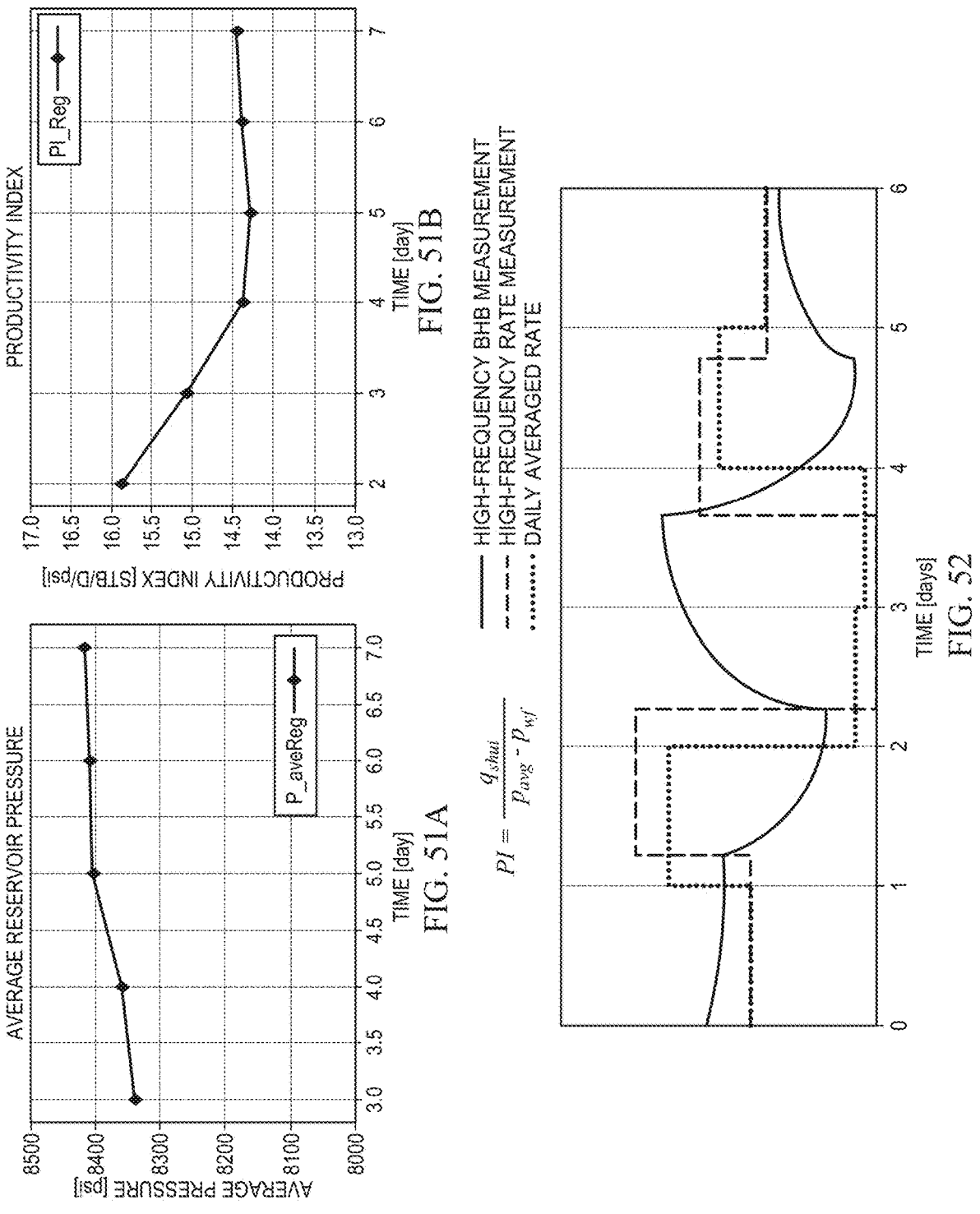
FIGS. 51A and 51B are plots of average reservoir pressure and productivity index results for the reservoir model of FIG. 48.
FIG. 52 is a plot representing high frequency pressure and daily flowrate measurements for a well.

FIGS. 49A and 49B provide the pressure prediction results of selected timeframes (days 4 and 5). As shown, the pressure predictions for the field case were very accurate. FIG. 50 shows the virtual shut-in simulation for selected timeframes (days 4 and 5). The virtual shut-in simulation provided physically consistent pressure buildup behavior that was used to estimate PI and average reservoir pressure. FIGS. 51A and 51B provide the tracking results of average reservoir pressure and PI. For this case, the SINDy method for average reservoir pressure estimation was used. The slight increase in average reservoir pressure is attributed to a strong aquifer, and the slight decline in the liquid productivity index was also observed in the field by manual analysis. For this field data, the true reservoir properties are unknown. However, the trend of reservoir pressure and PI is visible using the proposed reservoir surveillance workflow, which can be used for effective reservoir management.

Predictions Based on Daily Flowrate Measurements

When high-frequency flowrate measurements are not available, a modified workflow may be used instead. Access to high-frequency pressure measurements and daily production flowrate measurements may be assumed for the following applications. In this case, actual shut-ins may be used. FIG. 52 illustrates pressure and flowrate measurements for this type of application. The solid line is high-frequency pressure measurement, and the dashed line represents true high-frequency flowrate, which was not available for this case. The dotted line is the daily averaged flowrate measurement, which is available. Here, the average reservoir pressure may be estimated from actual shut-in data as described in the earlier section by extrapolating the buildup data. The daily flowrate (corrected for downtime) at the last time step prior to the shut-in is used to compute PI (illustrated in FIG. 52). The modified workflow was validated for different synthetic and field cases in the following Examples 12 and 13.

Example 12—Closed Boundary, Circular Reservoir with Time-Varying Skin (Changing PI)

In Example 12, a finite radial reservoir with a closed boundary and time-varying skin was used to generate data with a commercial simulator. The reservoir and well properties are shown in Table 12, and FIG. 53 provides the well measurement and the PI decline for this case. The high-frequency flowrate was converted to daily flowrate by averaging it for every day. The SINDy method for average reservoir pressure estimation was applied to the actual shut-in data in the history, and PI was estimated from the reservoir pressure. The estimated PI was compared between the high-frequency flowrate and daily flowrate cases to check if the assumption of shut-in flowrate for daily flowrate measurement cases was reasonable.

TABLE 12

Properties of synthetic reservoir model
for daily flowrate measurement

| | |
|---|---|
| Porosity | 0.2 |
| Permeability (mD) | 10.0 |

TABLE 12-continued

| Properties of synthetic reservoir model for daily flowrate measurement | |
|---|---|
| Reservoir height (ft) | 10.0 |
| Total compressibility (psi$^{-1}$) | 5.0 × 10$^{-6}$ |
| Wellbore radius (ft) | 0.32 |
| Viscosity (cp) | 2.0 |
| Initial reservoir pressure (psi) | 5,000.0 |
| Formation volume factor (RB/STB) | 1.0 |
| Cylindrical reservoir radius (ft) | 1,000.0 |
| Wellbore storage coefficient (STB/psi) | 0.001 |

FIGS. 54A and 54B show the trends of estimated average reservoir pressure and PI. For the average reservoir pressure, the SINDy method accurately captured the trend of pressure decline. For PI estimation, both flowrate measurement cases provided very similar estimation performance and captured the PI decline accurately. Based on the comparison, the assumption for shut-in flowrate for daily flowrate measurement case was reasonable for this application.

Example 13—Offshore Field C (Gulf of Mexico)

In Example 13, the PI tracking workflow was applied to a field case with 3 months of data. FIG. 55 shows the field well data of daily liquid flowrate measurement and high-frequency pressure measurement. From pressure data, six times well shut-in was detected, and these pressure buildup data were used for average reservoir pressure and PI tracking.

Figures 56A, 56B, 57:
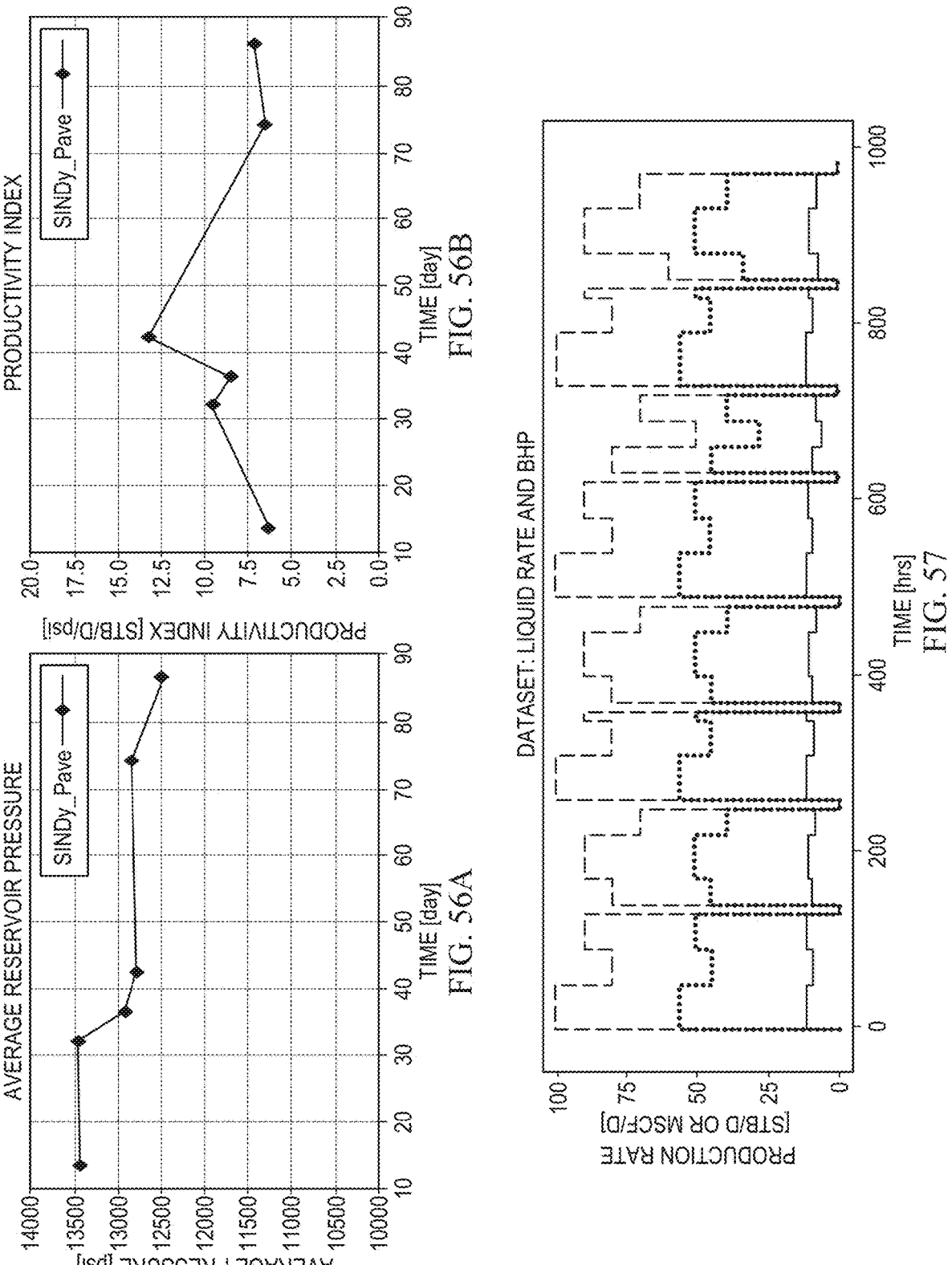
FIGS. 56A and 56B are a set of plots of average reservoir pressure and productivity index results for the reservoir model of FIG. 55.
FIG. 57 is a plot representing a synthetic reservoir model with multiphase production and reservoir model training scheme.

FIGS. 56A and 56B provide the calculated average reservoir pressure and PI results. For this field case, true reservoir pressure and PI were unknown. However, the well performance analysis workflow provided the trend of reservoir pressure and PI, which is useful for prudent reservoir management.

Virtual Metering

As described in the pressure prediction methodology, the machine learning reservoir model may be inverted to estimate production flowrate from high-frequency pressure measurements. In this section, virtual metering applications for multiphase production flowrate forecasting may be provided.

FIG. 6 depicts a method 600 for determining a flowrate for a well for a reservoir in a subterranean formation.

At step 602, the method may include receiving a plurality of bottomhole pressures for the well.

At step 604, the method may include training a machine learning model based on the plurality of bottomhole pressures for the well. The machine learning model may be trained via any desired type of machine learning algorithm including, but not limited to, artificial neural network, random forest, gradient boosting, support vector machine, kernel density estimator, and any combination thereof.

At step 606, the method may include performing a regression analysis on the machine learning model to predict a flowrate for the well, wherein the regression analysis is based on physics features.

Steps 604 and 606 follow the methodology presented in the pressure prediction process described above with reference to FIG. 4, but using high frequency pressure measurements as the input for predicting flowrates instead of vice versa. With known constant gas-oil ratio (GOR) and water cut assumptions, the multiphase flowrates for oil, gas, and water may be computed. In the method 600, the length of training data may be less than a week, and a constant GOR and water cut may be fair assumptions in such short time-frames.

At step 608, the method may include producing fluids from the reservoir based, at least in part, on the determined flowrate for the well. For example, in some embodiments, the method 600 may include adjusting an amount of fluids being produced from certain portions of one or more wells based, at least in part, on the determined flowrate for the well. In some embodiments, the method 600 may include ceasing production of fluids to perform remedial actions on one or more wells based, at least in part, on the determined flowrate for the well.

The overall flowrate prediction workflow was validated for different synthetic and field cases in the following Examples 14 and 15.

Example 14-2D Numerical, Closed Boundary Reservoir with Multiphase Flow

In Example 14, a closed boundary, 2D numerical reservoir with multiphase flow was considered. A commercial simulator was used to generate multiphase production flowrates as shown in FIG. 57. The reservoir model and the multiphase flow properties are shown in FIGS. 58A-58C and Table 13. For this case, a moving horizon window length of 5 days was used for training and validation and the training was repeated every 2 days. Lasso regression was applied with physics features.

TABLE 13

| Properties of synthetic reservoir case for multiphase virtual metering | |
|---|---|
| Porosity | 0.2 |
| Permeability (mD) | 20.0 |
| Reservoir height (ft) | 10.0 |
| Wellbore radius (ft) | 0.32 |
| Initial reservoir pressure (psi) | 5,000.0 |

Figure 59A:
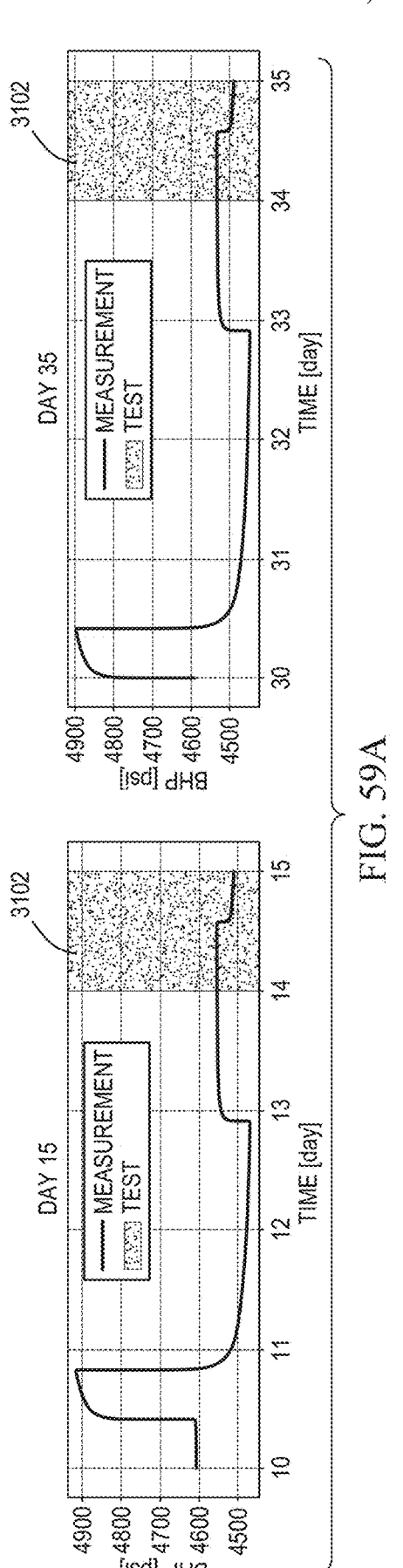

FIGS. 59A and 59B show the pressure data and multiphase production flowrate prediction results for selected timeframes (day 15 and 35). The sectioned window 3102 represents the prediction period, and the remaining window is the training period. The solid lines show the actual flowrate measurements, and the dashed lines represent the model estimation. There may be a solid line 5902 representing actual water flow, a dashed line 5904 representing predicted water flow, a solid line 5906 representing actual oil flow, a dashed line 5908 representing predicted oil flow, a solid line 5910 representing actual gas flow, and a dashed line 5912 representing predicted gas flow. As illustrated, there is agreement between the actual flowrate measurement and the machine learning prediction as the dashed lines overlap the solid lines. Thus, the machine learning model may be used for multiphase virtual metering for a simple synthetic reservoir case.

Example 15—Offshore Field D (Gulf of Mexico)

Figure 60:
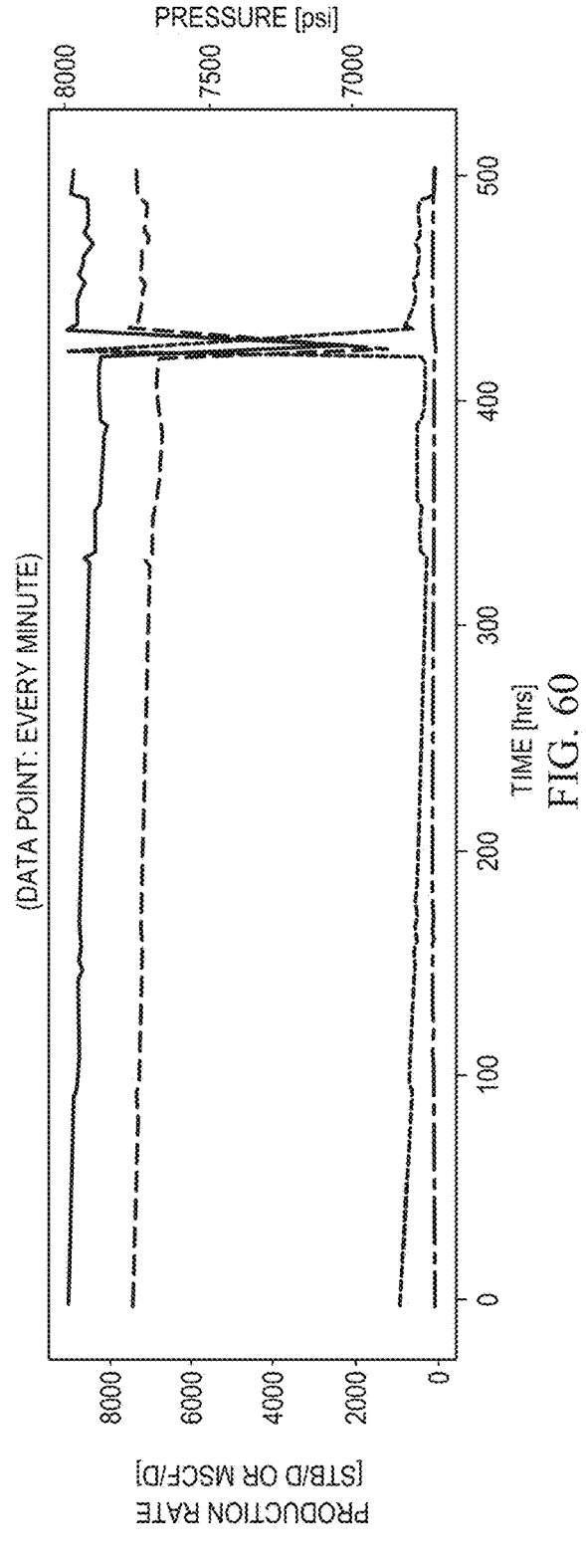
FIG. 60 is a plot representing an offshore field reservoir model and reservoir model training scheme.

In Example 15, FIG. 60 shows the high-frequency pressure measurement and multiphase production flowrate measurement from an offshore field. For this case a moving horizon window length of 5 days was used for training and validation, and training was repeated every 2 days. Lasso regression was applied using physics features.

Figure 61B:
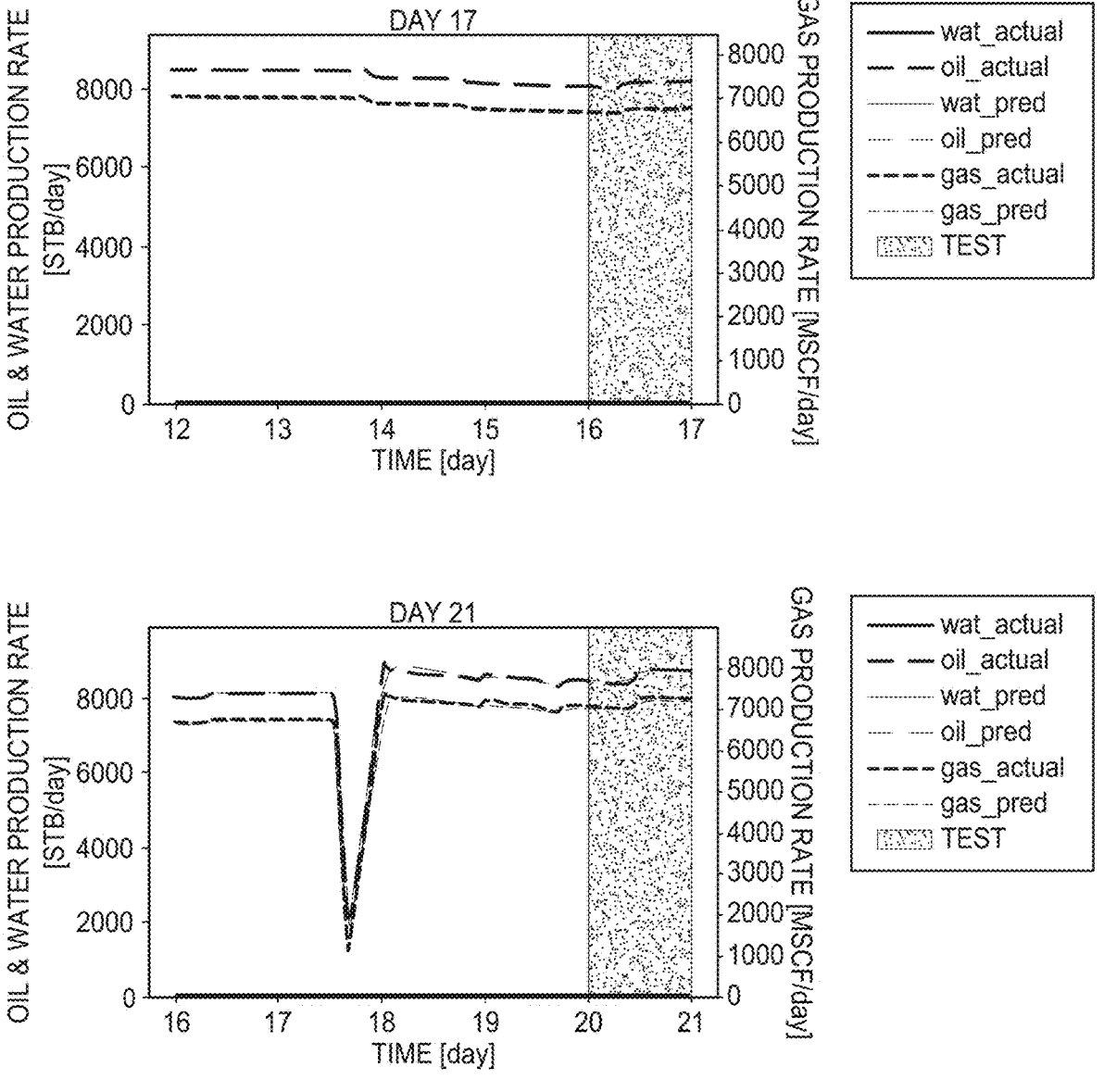

FIGS. 61A and 61B show the multiphase virtual metering results for two selected timeframes (day 17 and day 21). Like the previous example, a reasonable agreement was reached between the model estimation and the actual data.

The present disclosure presents robust and scalable reservoir surveillance workflows using hybrid physics and machine learning methods to characterize well performance (namely, productivity index and average reservoir pressure) and predict flowrates (or pressures) with routine field measurements of downhole pressure (or flowrates).

The background signal decomposition methods may be developed using dynamic mode decomposition (DMD), optimized DMD (optDMD), and sparse identification of nonlinear dynamics (SINDy) to extrapolate routine pressure buildup data for average reservoir pressure estimation, which can be applied in a practical and automated manner. The SINDy method may improve the reservoir pressure estimation performance compared to traditional methods for heterogeneous reservoir cases.

Several algorithms may be used as part of a comprehensive workflow for projecting nonlinear state problems onto linear or weakly nonlinear space—namely, physics features, time-delay embeddings (TDEs), and dynamic mode decomposition (DMD). These methods may improve the prediction accuracy for flowrate/pressure interpretation. For synthetic and field reservoir cases, prediction accuracy may be achieved for flowrate and/or pressure interpretation with input data containing TDEs of the physics-inspired features.

Virtual shut-in simulations may provide accurate pressure buildup behavior and may be used for estimating the average reservoir pressure and productivity index (PI), which offset the need for actual well shut-ins and associated production loss. The proposed reservoir surveillance workflow may track PI changes for synthetic reservoir cases.

For daily flowrate measurement cases, calculated PI using the last timestep daily flowrate may provide comparable estimation performance with the high-frequency flowrate measurement case. The workflow may provide reasonable results for synthetic and field cases.

Finally, the hybrid machine learning reservoir model may be applied to virtual metering for forecasting multiphase flowrates with promising results.

Figure 7:
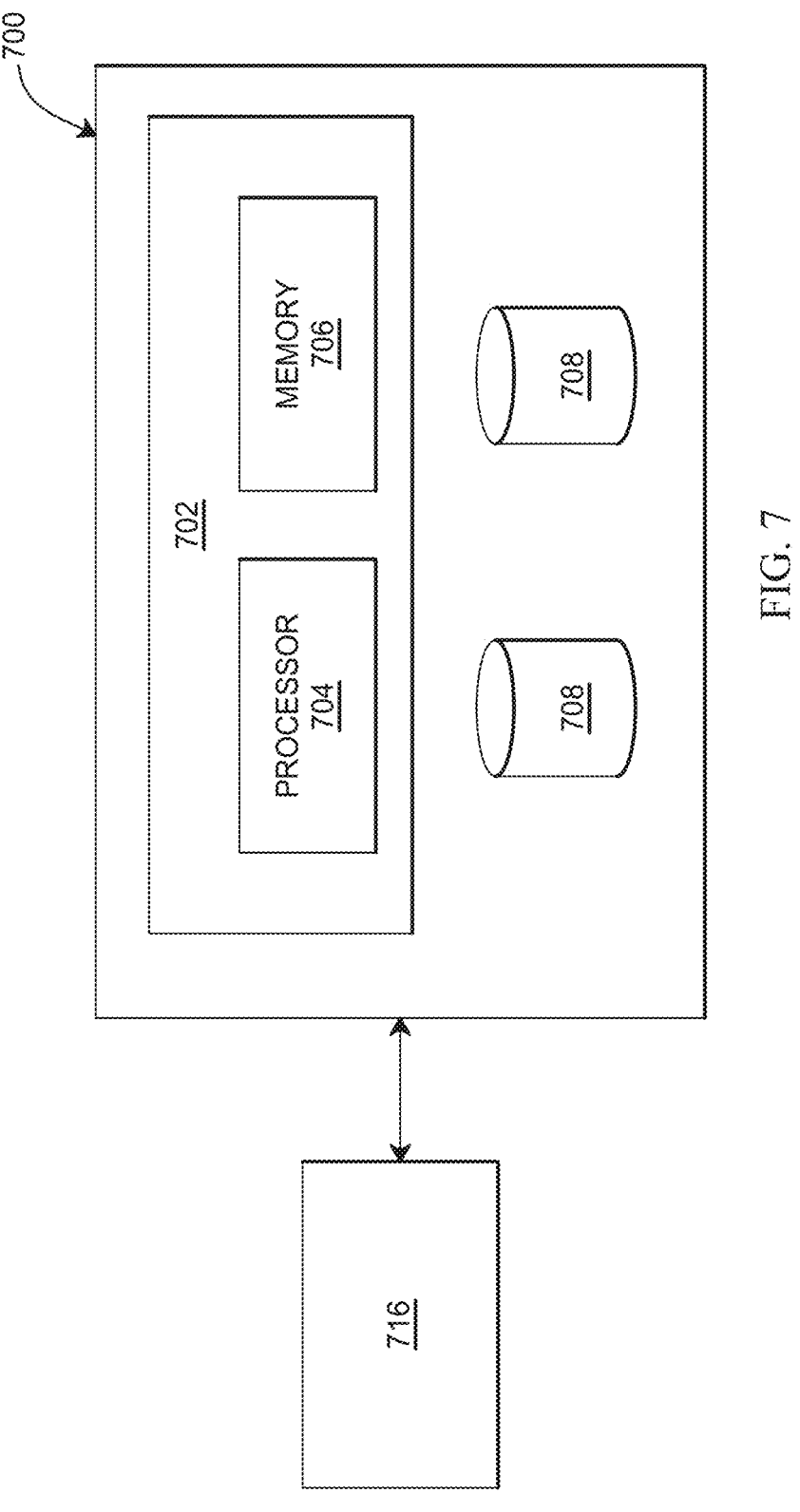
FIG. 7 is a block diagram showing an example information handling system in accordance with certain embodiments of the present disclosure.

FIG. 7 illustrates a block diagram of an exemplary control unit 700 in accordance with some embodiments of the present disclosure. In certain example embodiments, control unit 700 may be configured to create and maintain one or more databases 708 that include information concerning one or more reservoirs or reservoir models. In certain example embodiments, control unit 700 is configured to use information from database(s) 708 to train one or many machine learning algorithms, including, but not limited to, artificial neural network, random forest, gradient boosting, support vector machine, kernel density estimator, and any combination thereof. In some embodiments, control system 702 may include one more processors, such as processor 704. Processor 704 may include, for example, a microprocessor, microcontroller, digital signal processor (DSP), application specific integrated circuit (ASIC), or any other digital or analog circuitry configured to interpret and/or execute program instructions and/or process data. In some embodiments, processor 704 may be communicatively coupled to memory 706. Processor 704 may be configured to interpret and/or execute non-transitory program instructions and/or data stored in memory 706. Program instructions or data may constitute portions of software for carrying out estimations of reservoir or well performance characteristics, as described herein. Memory 706 may include any system, device, or apparatus configured to hold and/or house one or more memory modules; for example, memory 706 may include read-only memory, random access memory, solid state memory, or disk-based memory. Each memory module may include any system, device or apparatus configured to retain program instructions and/or data for a period of time (e.g., computer-readable non-transitory media).

Although control unit 700 is illustrated as including two databases 708, control unit 700 may contain any suitable number of databases and machine learning algorithms. Control unit 700 may be communicatively coupled to one or more displays 716 such that information processed by control system 702 may be conveyed to operators at or near the well or may be displayed at a location offsite.

Modifications, additions, or omissions may be made to FIG. 7 without departing from the scope of the present disclosure. For example, FIG. 7 shows a particular configuration of components for control unit 700. However, any suitable configurations of components may be used. For example, components of control unit 700 may be implemented either as physical or logical components. Furthermore, in some embodiments, functionality associated with components of control unit 700 may be implemented in special purpose circuits or components. In other embodiments, functionality associated with components of control unit 700 may be implemented in a general purpose circuit or components of a general purpose circuit. For example, components of control unit 700 may be implemented by computer program instructions.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method of determining average reservoir pressure for a subterranean formation, the method comprising:

shutting in a well in the subterranean formation;

measuring a plurality of buildup pressures during a period of time wherein the well is shut in via a downhole pressure gauge;

performing an eigen expansion of the plurality of buildup pressures to generate a plurality of eigenvalues;

determining an estimated average reservoir pressure by:

performing a dynamic mode decomposition (DMD) comprising determining background DMD mode and foreground DMD modes, wherein the background DMD mode corresponds to an eigenvalue that is nearest to a unit circle drawn in a complex plane and provides the estimated average reservoir pressure;

in response to determining that at least one of the plurality of eigenvalues is greater than 1.0 indicative of instability in the DMD, applying an optimized dynamic mode decomposition (optDMD); and performing a sparse identification of nonlinear dynamics (SINDy) analysis on the plurality of eigenvalues; and producing fluids from the well based, at least in part, on the estimated average reservoir pressure.

2. The method of claim 1, further comprising adjusting an amount of fluids being produced from certain portions of the well based, at least in part, on the estimated average reservoir pressure.

3. The method of claim 1, further comprising:

determining a productivity index (PI) and/or an inflow performance relationship (IPR) of the well based on the average reservoir pressure, wherein determining the PI of the well comprises determining an inflow performance relationship for gas systems; and producing the fluids from the reservoir based, at least in part, on the determined PI and/or IPR.

4. The method of claim 1, wherein the DMD for determining the average reservoir pressure uses DMD modes being eigenvectors of an operator A of an evolution equation X'=AX, wherein:

X is a matrix representing time-delay embeddings of bottom-hole pressure values, comprising M rows and N-M columns for N time points, with M being a number of time-delay embeddings, and M being greater than one;

X' is a matrix of time-delay embeddings containing predicted values for the bottom-hole pressure; and A is a best-fit linear operator that maps matrix X to matrix X'.

5. The method of claim 4, wherein M is selected to obtain the average reservoir pressure within a required error threshold.

6. The method of claim 4, wherein M is greater than 10.

7. A method of determining bottom-hole pressure in a well for a reservoir in a subterranean formation, the method comprising:

measuring, via one or more gauges, a plurality of flow-rates of fluids being produced from the well;

receiving the plurality of flowrates for the well;

training a machine learning model to determine the bottom-hole pressure for the well based on the plurality of flowrates for the well;

performing a virtual shut-in simulation via the trained machine learning model to determine the bottom-hole pressure for the well to avoid an actual shut-in of the well, wherein the virtual shut-in simulation is performed by an analysis on the machine learning model, the analysis comprising assigning a zero flow rate to the machine learning model to generate virtual pressure buildup data and performing a dynamic mode decomposition with control (DMDc) to formulate evolution of the bottom-hole pressure as a problem characterized by equation X'=AX+BY, wherein:

X is a matrix representing time-delay embeddings of bottom-hole pressure values;

X' is a matrix of time-delay embeddings comprising predicted values for the bottom-hole pressure;

A is a best-fit linear operator that maps matrix X to matrix X';

Y is a matrix of time-delay embeddings for flowrate data; and

B is a linear operator that represents an impact of flowrate embeddings matrix Y onto matrix X'; and adjusting production of fluids from the reservoir based, at least in part, on the determined bottom-hole pressure from the virtual shut-in simulation that avoided the actual shut-in of the well.

8. The method of claim 7, further comprising adjusting an amount of fluids being produced from the well based, at least in part, on the determined pressure for the well.

9. The method of claim 7, further comprising:

determining a productivity index (PI) and/or an inflow performance relationship (IPR) of the well based on an average reservoir pressure and the bottom-hole pressure, wherein determining the PI of the well comprises determining an inflow performance relationship for gas systems; and producing the fluids from the reservoir based, at least in part, on the determined PI and/or IPR.

10. A method of determining a flowrate for a well for a reservoir in a subterranean formation, the method comprising:

measuring, via one or more gauges, a plurality of bottom-hole pressures for the well while fluids are being produced from the well;

training a machine learning model to determine the flowrate for the well based, at least in part, on the plurality of the measured bottom-hole pressures for the well, wherein the machine learning model is represented by an evolution equation X'=AX+BY, wherein:

X is a matrix representing time-delay embeddings of the received plurality of flowrates;

X' is a matrix of time-delay embeddings comprising the received plurality of flowrates;

A is a best-fit linear operator that maps matrix X to matrix X';

Y is a matrix of time-delay embeddings for the plurality of the measured bottom-hole pressures; and B is a linear operator that quantifies an impact of matrix Y onto matrix X', wherein both the A and B linear operators are determined using dynamic mode decomposition with control (DMDc) based on matrices X', X comprising the received plurality flowrates, and the matrix Y comprising the plurality of the measured bottom-hole pressures;

performing a virtual metering simulation via the trained machine learning model to determine flowrates for multiphase production to avoid an actual shut-in of the well, taking as an input a matrix representing time-delay embeddings of known flowrates and a matrix of time-delay embeddings for the plurality of known bottom-hole pressures corresponding to the known flowrates;

determining a productivity index (PI) of the well based on an average reservoir pressure and at least one of the measured bottom-hole pressures, wherein determining the PI of the well comprises determining an inflow performance relationship for gas systems; and adjusting production of fluids from the reservoir based, at least in part, on the determined flowrates from the virtual metering simulation that avoided the actual shut-in of the well.

* * * * *